US007703951B2

(12) United States Patent
Piepgras et al.

(10) Patent No.: US 7,703,951 B2

(45) Date of Patent: Apr. 27, 2010

(54) MODULAR LED-BASED LIGHTING FIXTURES HAVING SOCKET ENGAGEMENT FEATURES

(75) Inventors: Colin Piepgras, Swampscott, MA (US); Tomas Mollnow, Somerville, MA (US); Michael Blackwell, Milton, MA (US); Brian Chemel, Marblehead, MA (US); Frederick Morgan, Quincy, MA (US); Kevin McCormick, Boston, MA (US); Michael A Bass, legal representative, Boston, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 354 days.

(21) Appl. No.: 11/419,995

(22) Filed: May 23, 2006

(65) Prior Publication Data

US 2006/0262544 A1 Nov. 23, 2006

Related U.S. Application Data

(60) Provisional application No. 60/683,587, filed on May 23, 2005, provisional application No. 60/729,870, filed on Oct. 24, 2005, provisional application No. 60/756,821, filed on Jan. 6, 2006, provisional application No. 60/745,353, filed on Apr. 21, 2006, provisional application No. 60/710,557, filed on Aug. 23, 2005, provisional application No. 60/714,795, filed on Sep. 8, 2005.

(51) Int. Cl.
*B60Q 1/06* (2006.01)

(52) U.S. Cl. ....................... 362/373; 362/294; 362/345; 362/800

(58) Field of Classification Search ................. 362/294, 362/800, 240, 249
See application file for complete search history.

(56) References Cited

U.S. PATENT DOCUMENTS 3,010,378 A 11/1961 Geocaris (Continued)

FOREIGN PATENT DOCUMENTS

JP 05012912 A 1/1993

OTHER PUBLICATIONS

Office Action from Co-Pending U.S. Appl. No. 11/010,840 dated Sep. 27, 2006.

(Continued)

*Primary Examiner*—Sandra L O'Shea
*Assistant Examiner*—Jessica L McMillan
(74) *Attorney, Agent, or Firm*—Robert V. Donahoe; Mark L. Beloborodov

(57) ABSTRACT

Modular lighting fixtures that allow convenient installation and removal of LED-based light-generating modules and controller modules. In one example, a modular lighting fixture includes a housing configured to be recessed into or disposed behind an architectural surface such as ceiling, wall, or soffit, in new or existing construction scenarios. The fixture housing includes a socket configured to facilitate one or more of a mechanical, electrical and thermal coupling of the light-generating module to the fixture housing. The ability to easily engage and disengage the LED-based light-generating module with the socket, without removing the fixture housing itself, allows for straightforward replacement of the light-generating module upon failure, or exchange with another module having different light-generating characteristics. Modular lighting controllers for such fixtures also may be easily installed in or removed from the fixture housing via the same access route by which the light-generating module is installed and removed.

63 Claims, 71 Drawing Sheets

U.S. PATENT DOCUMENTS

| | | | | |
|---|---|---|---|---|
| D207,930 | S | 6/1967 | Kotler | |
| 3,540,284 | A | 11/1970 | Sellers et al. | |
| 4,290,096 | A | 9/1981 | Szpur | |
| 4,479,115 | A | 10/1984 | Holzhauer | |
| 4,507,719 | A | 3/1985 | Quiogue | |
| 4,563,629 | A | 1/1986 | Keiper | |
| 4,598,347 | A * | 7/1986 | Peppers | 362/373 |
| 4,733,335 | A | 3/1988 | Serizawa et al. | |
| 4,760,508 | A * | 7/1988 | Russello et al. | 362/285 |
| 5,278,432 | A | 1/1994 | Ignatius et al. | |
| 5,337,225 | A | 8/1994 | Brookman | |
| 5,477,442 | A * | 12/1995 | Self | 362/368 |
| 5,548,499 | A | 8/1996 | Zadeh | |
| 5,690,424 | A | 11/1997 | Warshauer et al. | |
| 5,698,866 | A | 12/1997 | Doiron et al. | |
| 5,738,436 | A | 4/1998 | Cummings et al. | |
| 5,765,940 | A | 6/1998 | Levy | |
| 5,785,418 | A | 7/1998 | Hochstein | |
| 5,842,775 | A | 12/1998 | Roorda et al. | |
| 5,909,955 | A | 6/1999 | Roorda | |
| 6,009,650 | A | 1/2000 | Lamparter | |
| 6,016,038 | A | 1/2000 | Mueller et al. | |
| 6,045,240 | A | 4/2000 | Hochstein | |
| 6,059,421 | A | 5/2000 | White et al. | |
| 6,072,160 | A | 6/2000 | Bahl | |
| 6,078,257 | A | 6/2000 | Ferraro | |
| 6,150,774 | A | 11/2000 | Mueller et al. | |
| 6,166,491 | A | 12/2000 | Tsuchiya et al. | |
| 6,166,496 | A | 12/2000 | Lys et al. | |
| 6,211,626 | B1 | 4/2001 | Lys et al. | |
| 6,220,722 | B1 | 4/2001 | Begemann | |
| 6,292,901 | B1 | 9/2001 | Lys et al. | |
| 6,318,886 | B1 | 11/2001 | Stopa et al. | |
| 6,340,868 | B1 | 1/2002 | Lys et al. | |
| 6,357,893 | B1 | 3/2002 | Belliveau | |
| 6,367,949 | B1 | 4/2002 | Pederson | |
| 6,450,661 | B1 | 9/2002 | Okumura | |
| 6,459,919 | B1 | 10/2002 | Lys et al. | |
| 6,478,838 | B2 | 11/2002 | McSweeney et al. | |
| D468,051 | S | 12/2002 | Gaskins et al. | |
| D470,613 | S | 2/2003 | Huang | |
| D470,970 | S | 2/2003 | Huang | |
| D471,657 | S | 3/2003 | Huang | |
| 6,528,954 | B1 | 3/2003 | Lys et al. | |
| 6,548,967 | B1 | 4/2003 | Dowling et al. | |
| D474,559 | S | 5/2003 | Huang | |
| 6,561,689 | B1 | 5/2003 | Kidd et al. | |
| 6,568,826 | B1 | 5/2003 | Kotovsky | |
| 6,577,080 | B2 | 6/2003 | Lys et al. | |
| 6,578,986 | B2 | 6/2003 | Swaris et al. | |
| 6,580,228 | B1 | 6/2003 | Chen et al. | |
| 6,608,453 | B2 | 8/2003 | Morgan et al. | |
| 6,624,597 | B2 | 9/2003 | Dowling et al. | |
| 6,626,556 | B2 | 9/2003 | Galli | |
| 6,632,006 | B1 * | 10/2003 | Rippel et al. | 362/366 |
| 6,654,172 | B2 | 11/2003 | Pond et al. | |
| D484,270 | S | 12/2003 | Yiu | |
| 6,712,486 | B1 | 3/2004 | Popovich et al. | |
| 6,717,376 | B2 | 4/2004 | Lys et al. | |
| 6,720,745 | B2 | 4/2004 | Mueller et al. | |
| 6,774,584 | B2 | 8/2004 | Lys et al. | |
| 6,777,891 | B2 | 8/2004 | Lys et al. | |
| 6,781,329 | B2 | 8/2004 | Morgan et al. | |
| 6,787,999 | B2 | 9/2004 | Stimac et al. | |
| 6,788,011 | B2 | 9/2004 | Mueller et al. | |
| 6,801,003 | B2 | 10/2004 | Schanberger et al. | |
| 6,806,659 | B1 | 10/2004 | Mueller et al. | |
| 6,814,464 | B2 | 11/2004 | Galli | |
| 6,822,269 | B2 | 11/2004 | Horiuchi et al. | |
| 6,840,654 | B2 | 1/2005 | Guerrieri et al. | |
| 6,851,831 | B2 | 2/2005 | Karlicek, Jr. | |
| 6,864,513 | B2 | 3/2005 | Lin et al. | |
| 6,869,204 | B2 | 3/2005 | Morgan et al. | |
| 6,880,956 | B2 | 4/2005 | Zhang | |
| 6,883,929 | B2 | 4/2005 | Dowling | |
| 6,888,322 | B2 | 5/2005 | Dowling et al. | |
| 6,897,624 | B2 | 5/2005 | Ducharme et al. | |
| 6,936,978 | B2 | 8/2005 | Morgan et al. | |
| 6,965,205 | B2 | 11/2005 | Piepgras et al. | |
| 6,967,448 | B2 | 11/2005 | Morgan et al. | |
| 6,969,954 | B2 | 11/2005 | Lys | |
| 6,974,233 | B1 | 12/2005 | Aubrey | |
| 6,974,234 | B2 | 12/2005 | Galli | |
| 6,975,079 | B2 | 12/2005 | Lys et al. | |
| 7,031,920 | B2 | 4/2006 | Dowling et al. | |
| 7,038,398 | B1 | 5/2006 | Lys et al. | |
| 7,038,399 | B2 | 5/2006 | Lys et al. | |
| 7,042,172 | B2 | 5/2006 | Dowling et al. | |
| 7,055,994 | B2 | 6/2006 | Martin | |
| 7,132,804 | B2 * | 11/2006 | Lys et al. | 315/292 |
| 7,148,632 | B2 | 12/2006 | Berman et al. | |
| 2002/0038157 | A1 | 3/2002 | Dowling et al. | |
| 2002/0048169 | A1 | 4/2002 | Dowling et al. | |
| 2002/0070688 | A1 | 6/2002 | Dowling et al. | |
| 2002/0074559 | A1 | 6/2002 | Dowling et al. | |
| 2002/0078221 | A1 | 6/2002 | Blackwell et al. | |
| 2002/0130627 | A1 | 9/2002 | Morgan et al. | |
| 2002/0145394 | A1 | 10/2002 | Morgan et al. | |
| 2002/0145869 | A1 | 10/2002 | Dowling | |
| 2002/0152045 | A1 | 10/2002 | Dowling et al. | |
| 2002/0158583 | A1 | 10/2002 | Lys et al. | |
| 2002/0176259 | A1 | 11/2002 | Ducharme | |
| 2003/0011538 | A1 | 1/2003 | Lys et al. | |
| 2003/0028260 | A1 | 2/2003 | Blackwell | |
| 2003/0053310 | A1 | 3/2003 | Sommers | |
| 2003/0057884 | A1 | 3/2003 | Dowling et al. | |
| 2003/0057887 | A1 | 3/2003 | Dowling et al. | |
| 2003/0076281 | A1 | 4/2003 | Morgan et al. | |
| 2003/0100837 | A1 | 5/2003 | Lys et al. | |
| 2003/0133292 | A1 | 7/2003 | Mueller et al. | |
| 2003/0147254 | A1 | 8/2003 | Yoneda et al. | |
| 2003/0185005 | A1 | 10/2003 | Sommers et al. | |
| 2003/0189826 | A1 | 10/2003 | Yoon | |
| 2003/0189828 | A1 | 10/2003 | Coushaine | |
| 2003/0203188 | A1 | 10/2003 | Bunyan | |
| 2003/0222587 | A1 | 12/2003 | Dowling et al. | |
| 2004/0027832 | A1 | 2/2004 | Hyder | |
| 2004/0036006 | A1 | 2/2004 | Dowling | |
| 2004/0052076 | A1 | 3/2004 | Mueller et al. | |
| 2004/0090191 | A1 | 5/2004 | Mueller et al. | |
| 2004/0090787 | A1 | 5/2004 | Dowling et al. | |
| 2004/0105261 | A1 | 6/2004 | Ducharme et al. | |
| 2004/0105264 | A1 | 6/2004 | Spero | |
| 2004/0116039 | A1 | 6/2004 | Mueller et al. | |
| 2004/0120148 | A1 | 6/2004 | Morris et al. | |
| 2004/0130909 | A1 | 7/2004 | Mueller et al. | |
| 2004/0178751 | A1 | 9/2004 | Mueller et al. | |
| 2004/0212320 | A1 | 10/2004 | Dowling et al. | |
| 2004/0212993 | A1 | 10/2004 | Morgan et al. | |
| 2004/0228124 | A1 | 11/2004 | Reiff et al. | |
| 2005/0073838 | A1 * | 4/2005 | Haugaard et al. | 362/225 |
| 2005/0099824 | A1 | 5/2005 | Dowling et al. | |
| 2005/0111231 | A1 | 5/2005 | Crodian et al. | |
| 2005/0116667 | A1 | 6/2005 | Mueller et al. | |
| 2005/0151489 | A1 | 7/2005 | Lys et al. | |
| 2005/0169002 | A1 | 8/2005 | Steen et al. | |
| 2005/0195602 | A1 | 9/2005 | Pan | |
| 2005/0207159 | A1 | 9/2005 | Maxik | |
| 2005/0213352 | A1 | 9/2005 | Lys et al. | |
| 2005/0213353 | A1 | 9/2005 | Lys | |
| 2005/0218838 | A1 | 10/2005 | Lys | |
| 2005/0218870 | A1 | 10/2005 | Lys | |
| 2005/0219872 | A1 | 10/2005 | Lys | |
| 2005/0225976 | A1 | 10/2005 | Zampini et al. | |

| | | | |
|---|---|---|---|
| 2005/0231133 | A1 | 10/2005 | Lys |
| 2005/0236029 | A1 | 10/2005 | Dowling |
| 2005/0236998 | A1 | 10/2005 | Mueller |
| 2005/0237746 | A1 | 10/2005 | Yiu |
| 2005/0253533 | A1 | 11/2005 | Lys et al. |
| 2005/0275626 | A1 | 12/2005 | Mueller |
| 2005/0276053 | A1 | 12/2005 | Nortrup |
| 2006/0002110 | A1 | 1/2006 | Dowling |
| 2006/0012987 | A9 | 1/2006 | Ducharme |
| 2006/0016960 | A1 | 1/2006 | Morgan |
| 2006/0022214 | A1 | 2/2006 | Morgan |
| 2006/0050509 | A9 | 3/2006 | Dowling |
| 2006/0076908 | A1 | 4/2006 | Morgan |
| 2006/0098077 | A1 | 5/2006 | Dowling |
| 2006/0098438 | A1 | 5/2006 | Ouderkirk et al. |
| 2006/0104058 | A1 | 5/2006 | Chemel et al. |

OTHER PUBLICATIONS

Office Action from Co-Pending U.S. Appl. No. 11/010,840 dated May 17, 2007.

* cited by examiner

MODULAR LED-BASED LIGHTING FIXTURES HAVING SOCKET ENGAGEMENT FEATURES

CROSS-REFERENCES TO RELATED APPLICATIONS

This application claims priority under 35 U.S.C. §119(e) to the following U.S. Provisional Applications:

Ser. No. 60/683,587, entitled "LED Modules for Low Profile Lighting Applications," filed on May 23, 2005;

Ser. No. 60/729,870, entitled "Spider Interconnect and Hospital Gown Socket Concept," filed on Oct. 24, 2005;

Ser. No. 60/756,821, entitled "Spider Interconnect and Hospital Gown Socket Concept," filed on Jan. 6, 2006; and Ser. No. 60/745,353, entitled "Modular Lighting Assembly Methods and Apparatus," filed on Apr. 21, 2006.

Each of the foregoing applications hereby is incorporated herein by reference.

This application also claims priority under 35 U.S.C. §119 (e) to the following U.S. Provisional Applications:

Ser. No. 60/710,557 filed Aug. 23, 2005, entitled "Methods and Apparatus for Dissipating Heat From Lighting Devices;" and Ser. No. 60/714,795 filed Sep. 8, 2005, entitled "Lighting Pendant."

FIELD OF THE DISCLOSURE

The present disclosure relates generally to modular lighting apparatus and methods of assembly, installation and replacement of such apparatus. In various aspects, methods and apparatus according to the disclosure facilitate ease of manufacture, installation and replacement of modular lighting apparatus components as well as thermal efficiency during operation. In one aspect, such lighting apparatus and methods employ LED-based light sources to provide visible light in a variety of environments and for a variety of lighting applications.

BACKGROUND

LED-based lighting fixtures are employed for a variety of illumination applications. In some cases, the lighting fixture may include a controller, one or more LED-based light sources, and may further include one or more components to facilitate heat dissipation, in one incorporated unit. To replace any one element of such an incorporated unit may require either replacement of the entire lighting fixture or repair by a skilled technician. Additionally, physically exchanging new LED-based light sources for the existing LED-based light sources can be difficult if different LED-based lighting assemblies are desired, or if the existing LED-based source(s) fail.

Recessed lighting is a popular lighting option for both new construction and remodeling. With recessed lighting, the majority of a lighting fixture is disposed substantially behind or recessed into an architectural surface or feature, such as a ceiling (or wall, or soffit). The lighting fixture typically includes a housing (sometimes commonly referred to as a "can"), a bulb such as an incandescent, fluorescent or halogen bulb, and some means for electrically connecting the fixture to a source of operating power. With new construction, the fixture is typically supported by hangars attached to joists. When remodeling, to reduce the amount of ceiling (or other architectural surface) that is removed, the fixture may be inserted through a ceiling hole and attached to the drywall forming the ceiling, wherein the ceiling hole provides a light exit aperture for light generated by the fixture's bulb.

SUMMARY

Various embodiment of the present disclosure are directed to modular lighting fixtures that allow convenient installation and removal of LED-based light-generating modules as well as controller modules that may be employed to control the light-generating modules. In one example, a modular lighting fixture includes a housing that is configured to be recessed into or otherwise disposed behind an architectural surface such as ceiling, wall, or soffit, in new or existing construction scenarios. The fixture housing includes a socket configured to facilitate one or more of a mechanical, electrical and thermal coupling of the light-generating module to the fixture housing. The ability to easily engage and disengage the LED-based light-generating module with the socket, without removing the fixture housing itself, allows for straightforward replacement of the light-generating module upon failure, or exchange with another module having different light-generating characteristics. Modular lighting controllers (also referred to as "controller modules") for such fixtures also may be easily installed in or removed from the fixture housing, in some instances via the same access route by which the light-generating module is installed and removed.

Thus, according to various aspect of the disclosure, modular lighting fixtures are provided in which a single housing may accommodate different LED-based light-generating modules that may be switched in and out of the housing. In this regard, light-generating modules according to various embodiments of the present disclosure may mimic the ease of installation and replacement of conventional incandescent, fluorescent or halogen light bulbs in that a new light-generating module can be inserted into the housing without changes to the fixture. A new light-generating module may be inserted, for example, when a previous light-generating module stops working or an improved or different light-generating module is desired.

As indicated above, according to one aspect of the disclosure, a socket or other attachment element facilitates the attachment of a light-generating module to a housing of a lighting fixture. In addition to providing a mechanical connection between the light-generating module and the lighting fixture, the socket also may provide an electrical connection and/or a thermal connection. For example, the socket may include electrical connections that provide drive signals and operating power to a light-generating module when the light-generating module is inserted into or otherwise coupled to the socket. According to another aspect of the disclosure, a socket or other attachment element may facilitate thermal diffusion in at least two manners. First, the socket may be configured to interact with the light-generating module so that the light-generating module achieves a thermal connection with the housing or other component of the lighting fixture. Second, the socket itself may be thermally conductive and help to transfer heat to the housing and/or directly to surrounding air (e.g., via a front light-exit face of the light-generating module).

According to another aspect of the disclosure, a removable light-generating module is itself configured to facilitate heat transfer away from the light sources present in the module. The heat transfer is achieved in some embodiments by using a thermally conductive chassis for the light-generating module to facilitate transfer of heat away from a front side (light exit face) of the light-generating module. In some embodiments, a thermally conductive base plate is attached to a rear side of the light-generating module to facilitate transfer of heat to a housing or other part of a lighting fixture, in some cases via the socket.

According to another aspect of the disclosure, the engagement and disengagement of a light-generating module with the socket of a lighting fixture is accomplished via a simple rotating motion. In this regard, installing and removing an LED-based light-generating module from a modular lighting fixture may have a familiar feel similar to the process of changing a conventional incandescent light bulb.

In particular, in one exemplary implementation, the socket is configured as a collar with screw-type threads, and the module is configured so as to be attachable to and detachable from a socket via a threaded grip ring that is placed over the module and engages with the threads on the socket via rotation, thereby "sandwiching" the module between the grip ring and socket. According to another aspect of the disclosure, a removable light-generating module includes a number of hexagonally-shaped LED subassemblies. In some embodiments, the grip ring is rotatable relative to the module so that the orientation of the LED subassemblies is not affected by the rotation of the grip ring (i.e., the module itself does not rotate in the socket as the grip ring is rotated). Additionally, the relative rotation of the grip ring may allow a connector to be directly mounted to light-generating module without concern for the effects of twisting on the connector.

In other embodiments, no grip ring is used to secure the light-generating module to the socket, and electrical connections between the light-generating module and the socket are achieved through connections of post (or threads) on the light-generating module and corresponding threads (or posts) on the socket. That is to say, electrical contacts may be provided on the engagement elements themselves in some embodiments.

According to another aspect of the disclosure, a controller module may be used in connection with a light-generating module in a lighting fixture implementation. According to another aspect of the disclosure, a controller module may have a physical structure that is configured for installation in a specific type of lighting fixture housing. For example, a controller module may have one or more rounded edges to facilitate placement or removal of the controller module from a recessed lighting fixture which is not itself removable from an architectural feature such as a ceiling.

In one embodiment, a controller module itself may have an internal modular construction. More specifically, the controller module may be configured for interchangeability of components that are used for receiving input control signals and/or data at a "front-end" input interface (e.g., coupled to a user interface, control network, sensor, etc.). The controller module further may be configured for interchangeability of components that are used for outputting control signals and/or data and/or power at a "back-end" output interface to the light-generating module. In this regard, the controller module may be flexible in its ability to communicate with various light-generating modules and/or networks, computers, or other controllers without the need for numerous hardware and/or software components being simultaneously present within the controller module. Such a configuration may save on space and/or cost when producing controller modules for modular lighting fixtures and other applications.

According to another aspect, a light-generating module for a modular lighting fixture may be configured with some nominal data storage and processing capability for providing information to a controller associated with the lighting fixture and packaged as a separate controller module of the fixture. For example, the light-generating module may provide information on one or more of the type of light sources present in the light-generating module, their power requirements, operating temperature, operating time or temperature history, calibration parameters and the like, so that a separate controller module may provide appropriate drive signals and operating power to the light-generating module.

According to another aspect of the disclosure, a controller module is configured to receive information, data and or control signals from a light-generating module relating to some operating parameter or characteristic associated with the light-generating module. The controller module may be programmed to alter its outgoing control signals and/or power output to the light-generating module based on the information received from the light-generating module. For example, the light-generating module may indicate to the controller the voltage or current levels desired for operation of that particular light-generating module, and the controller may provide the appropriate voltage and current levels based on that information.

According to another aspect of the disclosure, a battery or other auxiliary power source is provided in an LED lighting fixture such that the LED lighting fixture may be used for emergency lighting in addition to its primary lighting purpose.

In sum, as discussed in greater detail below, one embodiment of the present disclosure is directed to a light-generating apparatus comprising an LED assembly, a plurality of optical components, and a chassis coupled to the LED assembly and including a plurality of chambers in which the plurality of optical components respectively are held. The LED assembly comprises an assembly substrate and a plurality of LED subassemblies coupled to the assembly substrate. Each LED subassembly of the plurality of LED subassemblies forms at least one of a mechanical connection, an electrical connection, and a first thermal connection to the assembly substrate. The chassis is configured such that each optical component of the plurality of optical components is disposed in an optical path of a corresponding one of the plurality of LED subassemblies.

Another embodiment is directed to a light-generating apparatus comprising a thermally conductive chassis through which light exits from the apparatus, an LED assembly to generate the light, and a thermally conductive base plate. The LED assembly is disposed between the thermally conductive base plate and the thermally conductive chassis. The LED assembly and the thermally conductive chassis form a first thermal connection to facilitate first heat dissipation from the LED assembly via the thermally conductive chassis. The LED assembly and the thermally conductive base plate form a second thermal connection to facilitate second heat dissipation from the LED assembly via the thermally conductive base plate.

Another embodiment is directed to a light-generating apparatus comprising a circular chassis and a circular printed circuit board substrate coupled to the circular chassis. The circular printed circuit board substrate includes at least one chip-on-board LED module.

Another embodiment is directed to a lighting control apparatus, comprising at least one connection mechanism configured to permit a modular installation and removal of at least a first circuit board including input circuitry configured to receive at least one input signal including information relating to lighting, and a second circuit board including output circuitry configured to output at least one lighting control signal that is based at least in part on the information included in the at least one input signal. The at least one connection mechanism provides at least one electrical connection between the first circuit board and the second circuit board when both the first and second circuit boards are coupled to the at least one connection mechanism.

Another embodiment is directed to a modular lighting fixture, comprising a fixture housing having at least one thermally conductive portion, and a socket mounted to the at least one thermally conductive portion of the fixture housing. The socket is configured to facilitate a thermal conduction path between a light-generating module installed in the socket and the at least one thermally conductive portion of the fixture housing.

Another embodiment is directed to a modular lighting fixture, comprising a fixture housing having at least one light exit aperture, a socket mounted to the fixture housing and accessible via the at least one light exit aperture, a light-generating module installed in and removable from the socket via the at least one light exit aperture, and a controller module to control the light-generating module. The controller module is disposed in the fixture housing and accessible via the at least one light exit aperture to facilitate installation and removal of the controller module.

Another embodiment is directed to a modular lighting fixture, comprising a fixture housing, a socket mounted to the fixture housing, a light-generating module installed in and removable from the socket, and a controller module to control the light-generating module, the controller module disposed in or proximate to the fixture housing. The light-generating module is configured to provide information to the controller module relating to at least one characteristic of the light generating module, and the controller module is configured to control the light-generating module based at least in part on the information provided by the light-generating module.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term “color” is used interchangeably with the term “spectrum.” However, the term “color” generally is used to refer primarily to a property of radiation that is perceivable by an observer (although this usage is not intended to limit the scope of this term). Accordingly, the terms “different colors” implicitly refer to multiple spectra having different wavelength components and/or bandwidths. It also should be appreciated that the term “color” may be used in connection with both white and non-white light.

The term “color temperature” generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a “warmer feel,” while higher color temperatures generally indicate white light having a more significant blue component or a “cooler feel.” By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term “lighting fixture” is used herein to refer to an apparatus including one or more light sources of same or different types. A given lighting fixture may have any one of a variety of mounting arrangements for the light source(s), enclosure/housing arrangements and shapes, and/or electrical and mechanical connection configurations. Additionally, a given lighting fixture optionally may be associated with (e.g., include, be coupled to and/or packaged together with) various other components (e.g., control circuitry) relating to the operation of the light source(s). An “LED-based lighting fixture” refers to a lighting fixture that includes one or more LED-based light sources as discussed above, alone or in combination with other non LED-based light sources. A “multi-channel” lighting fixture refers to an LED-based or non LED-based lighting fixture that includes at least two light sources configured to respectively generate different spectrums of radiation, wherein each different source spectrum may be referred to as a “channel” of the multi-channel lighting fixture.

The term “controller” is used herein generally to describe various apparatus relating to the operation of one or more light sources. A controller can be implemented in numerous ways (e.g., such as with dedicated hardware) to perform various functions discussed herein. A “processor” is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as “memory,” e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms “program” or “computer program” are used herein in a generic sense to refer to any type of computer code (e.g., software or microcode) that can be employed to program one or more processors or controllers.

The term “addressable” is used herein to refer to a device (e.g., a light source in general, a lighting fixture, a controller or processor associated with one or more light sources or lighting fixtures, other non-lighting related devices, etc.) that is configured to receive information (e.g., data) intended for multiple devices, including itself, and to selectively respond to particular information intended for it. The term “addressable” often is used in connection with a networked environment (or a “network,” discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be “addressable” in that it is configured to selectively exchange data with (i.e., receive data from and/or transmit data to) the network, based, for example, on one or more particular identifiers (e.g., “addresses”) assigned to it.

The term “network” as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The following patents and patent applications are hereby incorporated herein by reference:

U.S. Pat. No. 6,016,038, issued Jan. 18, 2000, entitled "Multicolored LED Lighting Method and Apparatus;"

U.S. Pat. No. 6,211,626, issued Apr. 3, 2001 to Lys et al, entitled "Illumination Components;"

U.S. Pat. No. 6,548,967, issued Apr. 15, 2003, entitled "Universal Lighting Network Methods and Systems;"

U.S. patent application Ser. No. 09/675,419, filed Sep. 29, 2000, entitled "Systems and Methods for Calibrating Light Output by Light-Emitting Diodes;"

U.S. patent application Ser. No. 10/245,788, filed Sep. 17, 2002, entitled "Methods and Apparatus for Generating and Modulating White Light Illumination Conditions;"

U.S. patent application Ser. No. 10/325,635, filed Dec. 19, 2002, entitled "Controlled Lighting Methods and Apparatus;" and U.S. patent application Ser. No. 11/010,840, filed Dec. 13, 2004, entitled "Thermal Management Methods and Apparatus for Lighting Devices."

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Various embodiments of the present disclosure are described below, including certain embodiments relating particularly to LED-based light sources. It should be appreciated, however, that the present disclosure is not limited to any particular manner of implementation, and that the various embodiments discussed explicitly herein are primarily for purposes of illustration. For example, the various concepts discussed herein may be suitably implemented in a variety of environments involving LED-based light sources, other types of light sources not including LEDs, environments that involve both LEDs and other types of light sources in combination, and environments that involve non-lighting-related devices alone or in combination with various types of light sources.

Figure 1:
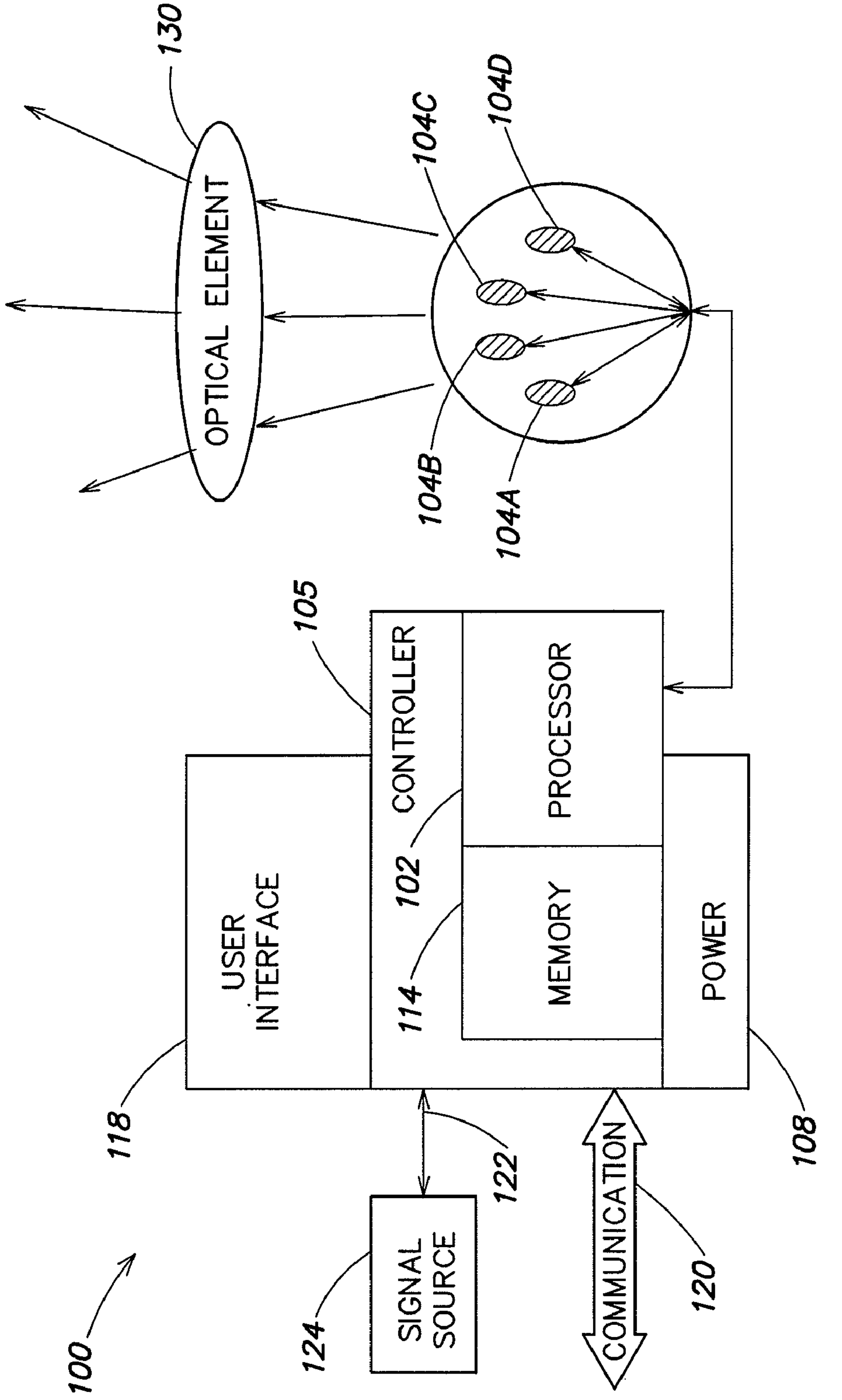
FIG. 1 is a diagram illustrating a lighting fixture according to one embodiment of the disclosure.

FIG. 1 illustrates one example of various components that may constitute a lighting fixture 100 according to one embodiment of the present disclosure. Some general examples of LED-based lighting fixtures including components similar to those that are described below in connection with FIG. 1 may be found, for example, in U.S. Pat. No. 6,016,038, issued Jan. 18, 2000 to Mueller et al., entitled "Multicolored LED Lighting Method and Apparatus," and U.S. Pat. No. 6,211,626, issued Apr. 3, 2001 to Lys et al, entitled "Illumination Components," which patents are both hereby incorporated herein by reference.

In various embodiments of the present disclosure, the lighting fixture 100 shown in FIG. 1 may be used alone or together with other similar lighting fixtures in a system of lighting fixtures (e.g., as discussed further below in connection with FIG. 2). Used alone or in combination with other lighting fixtures, the lighting fixture 100 may be employed in a variety of applications including, but not limited to, interior or exterior space (e.g., architectural) lighting and illumination in general, direct or indirect illumination of objects or spaces, theatrical or other entertainment-based/special effects lighting, decorative lighting, safety-oriented lighting, lighting associated with (or illumination of) displays and/or merchandise (e.g. for advertising and/or in retail/consumer environments), combined lighting or illumination and communication systems, etc., as well as for various indication, display and informational purposes.

In one embodiment, the lighting fixture 100 shown in FIG. 1 may include one or more light sources 104A, 104B, 104C, and 104D (shown collectively as 104), wherein one or more of the light sources may be an LED-based light source that includes one or more light emitting diodes (LEDs). In one aspect of this embodiment, any two or more of the light sources may be adapted to generate radiation of different colors (e.g. red, green, blue); in this respect, as discussed above, each of the different color light sources generates a different source spectrum that constitutes a different "channel" of a "multi-channel" lighting fixture. Although FIG. 1 shows four light sources 104A, 104B, 104C, and 104D, it should be appreciated that the lighting fixture is not limited in this respect, as different numbers and various types of light sources (all LED-based light sources, LED-based and non-LED-based light sources in combination, etc.) adapted to generate radiation of a variety of different colors, including essentially white light, may be employed in the lighting fixture 100, as discussed further below.

As shown in FIG. 1, the lighting fixture 100 also may include a controller 105 that is configured to output one or more control signals to drive the light sources so as to generate various intensities of light from the light sources. For example, in one implementation, the controller 105 may be configured to output at least one control signal for each light source so as to independently control the intensity of light (e.g., radiant power in lumens) generated by each light source; alternatively, the controller 105 may be configured to output one or more control signals to collectively control a group of two or more light sources identically. Some examples of control signals that may be generated by the controller to control the light sources include, but are not limited to, pulse modulated signals, pulse width modulated signals (PWM), pulse amplitude modulated signals (PAM), pulse code modulated signals (PCM) analog control signals (e.g., current control signals, voltage control signals), combinations and/or modulations of the foregoing signals, or other control signals. In one aspect, particularly in connection with LED-based sources, one or more modulation techniques provide for variable control using a fixed current level applied to one or more LEDs, so as to mitigate potential undesirable or unpredictable variations in LED output that may arise if a variable LED drive current were employed. In another aspect, the controller 105 may control other dedicated circuitry (not shown in FIG. 1) which in turn controls the light sources so as to vary their respective intensities.

In general, the intensity (radiant output power) of radiation generated by the one or more light sources is proportional to the average power delivered to the light source(s) over a given time period. Accordingly, one technique for varying the intensity of radiation generated by the one or more light sources involves modulating the power delivered to (i.e., the operating power of) the light source(s). For some types of light sources, including LED-based sources, this may be accomplished effectively using a pulse width modulation (PWM) technique.

In one exemplary implementation of a PWM control technique, for each channel of a lighting fixture a fixed predetermined voltage $V_{source}$ is applied periodically across a given light source constituting the channel. The application of the voltage $V_{source}$ may be accomplished via one or more switches, not shown in FIG. 1, controlled by the controller 105. While the voltage $V_{source}$ is applied across the light source, a predetermined fixed current $I_{source}$ (e.g., determined by a current regulator, also not shown in FIG. 1) is allowed to flow through the light source. Again, recall that an LED-based light source may include one or more LEDs, such that the voltage $V_{source}$ may be applied to a group of LEDs constituting the source, and the current $I_{source}$ may be drawn by the group of LEDs. The fixed voltage $V_{source}$ across the light source when energized, and the regulated current $I_{source}$ drawn by the light source when energized, determines the amount of instantaneous operating power $P_{source}$ of the light source ($P_{source}=V_{source}\cdot I_{source}$) As mentioned above, for LED-based light sources, using a regulated current mitigates potential undesirable or unpredictable variations in LED output that may arise if a variable LED drive current were employed.

According to the PWM technique, by periodically applying the voltage $V_{source}$ to the light source and varying the time the voltage is applied during a given on-off cycle, the average power delivered to the light source over time (the average operating power) may be modulated. In particular, the controller 105 may be configured to apply the voltage $V_{source}$ to a given light source in a pulsed fashion (e.g., by outputting a control signal that operates one or more switches to apply the voltage to the light source), preferably at a frequency that is greater than that capable of being detected by the human eye (e.g., greater than approximately 100 Hz). In this manner, an observer of the light generated by the light source does not perceive the discrete on-off cycles (commonly referred to as a "flicker effect"), but instead the integrating function of the eye perceives essentially continuous light generation. By adjusting the pulse width (i.e. on-time, or "duty cycle") of on-off cycles of the control signal, the controller varies the average amount of time the light source is energized in any given time period, and hence varies the average operating power of the light source. In this manner, the perceived brightness of the generated light from each channel in turn may be varied.

As discussed in greater detail below, the controller 105 may be configured to control each different light source channel of a multi-channel lighting fixture at a predetermined average operating power to provide a corresponding radiant output power for the light generated by each channel. Alternatively, the controller 105 may receive instructions (e.g., "lighting commands") from a variety of origins, such as a user interface 118, a signal source 124, or one or more communication ports 120, that specify prescribed operating powers for one or more channels and, hence, corresponding radiant output powers for the light generated by the respective channels. By varying the prescribed operating powers for one or more channels (e.g., pursuant to different instructions or lighting commands), different perceived colors and brightness levels of light may be generated by the lighting fixture.

In one embodiment of the lighting fixture 100, as mentioned above, one or more of the light sources 104A, 104B, 104C, and 104D shown in FIG. 1 may include a group of multiple LEDs or other types of light sources (e.g., various parallel and/or serial connections of LEDs or other types of light sources) that are controlled together by the controller 105. Additionally, it should be appreciated that one or more of the light sources may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared. LEDs having a variety of spectral bandwidths (e.g., narrow band, broader band) may be employed in various implementations of the lighting fixture 100.

In another aspect of the lighting fixture 100 shown in FIG. 1, the lighting fixture 100 may be constructed and arranged to produce a wide range of variable color radiation. For example, in one embodiment, the lighting fixture 100 may be particularly arranged such that controllable variable intensity (i.e., variable radiant power) light generated by two or more of the light sources combines to produce a mixed colored light (including essentially white light having a variety of color temperatures). In particular, the color (or color temperature) of the mixed colored light may be varied by varying one or more of the respective intensities (output radiant power) of the light sources (e.g., in response to one or more control signals output by the controller 105). Furthermore, the controller 105 may be particularly configured to provide control signals to one or more of the light sources so as to generate a variety of static or time-varying (dynamic) multi-color (or multi-color temperature) lighting effects. To this end, in one embodiment, the controller may include a processor 102 (e.g., a microprocessor) programmed to provide such control signals to one or more of the light sources. In various aspects, the processor 102 may be programmed to provide such control signals autonomously, in response to lighting commands, or in response to various user or signal inputs.

Thus, the lighting fixture 100 may include a wide variety of colors of LEDs in various combinations, including two or more of red, green, and blue LEDs to produce a color mix, as well as one or more other LEDs to create varying colors and color temperatures of white light. For example, red, green and blue can be mixed with amber, white, UV, orange, IR or other colors of LEDs. Such combinations of differently colored LEDs in the lighting fixture 100 can facilitate accurate reproduction of a host of desirable spectrums of lighting conditions, examples of which include, but are not limited to, a variety of outside daylight equivalents at different times of the day, various interior lighting conditions, lighting conditions to simulate a complex multicolored background, and the like. Other desirable lighting conditions can be created by removing particular pieces of spectrum that may be specifically absorbed, attenuated or reflected in certain environments.

As shown in FIG. 1, the lighting fixture 100 also may include a memory 114 to store various information. For example, the memory 114 may be employed to store one or more lighting commands or programs for execution by the processor 102 (e.g., to generate one or more control signals for the light sources), as well as various types of data useful for generating variable color radiation (e.g., calibration information, discussed further below). The memory 114 also may store one or more particular identifiers (e.g., a serial number, an address, etc.) that may be used either locally or on a system level to identify the lighting fixture 100. In various embodiments, such identifiers may be pre-programmed by a manufacturer, for example, and may be either alterable or non-alterable thereafter (e.g., via some type of user interface located on the lighting fixture, via one or more data or control signals received by the lighting fixture, etc.). Alternatively, such identifiers may be determined at the time of initial use of the lighting fixture in the field, and again may be alterable or non-alterable thereafter.

One issue that may arise in connection with controlling multiple light sources in the lighting fixture 100 of FIG. 1, and controlling multiple lighting fixtures 100 in a lighting system (e.g., as discussed below in connection with FIG. 2), relates to potentially perceptible differences in light output between substantially similar light sources. For example, given two virtually identical light sources being driven by respective identical control signals, the actual intensity of light (e.g., radiant power in lumens) output by each light source may be measurably different. Such a difference in light output may be attributed to various factors including, for example, slight manufacturing differences between the light sources, normal wear and tear over time of the light sources that may differently alter the respective spectrums of the generated radiation, etc. For purposes of the present discussion, light sources for which a particular relationship between a control signal and resulting output radiant power are not known are referred to as "uncalibrated" light sources.

The use of one or more uncalibrated light sources in the lighting fixture 100 shown in FIG. 1 may result in generation of light having an unpredictable, or "uncalibrated," color or color temperature. For example, consider a first lighting fixture including a first uncalibrated red light source and a first uncalibrated blue light source, each controlled in response to a corresponding lighting command having an adjustable parameter in a range of from zero to 255 (0-255), wherein the maximum value of 255 represents the maximum radiant power available (i.e., 100%) from the light source. For purposes of this example, if the red command is set to zero and the blue command is non-zero, blue light is generated, whereas if the blue command is set to zero and the red command is non-zero, red light is generated. However, if both commands are varied from non-zero values, a variety of perceptibly different colors may be produced (e.g., in this example, at very least, many different shades of purple are possible). In particular, perhaps a particular desired color (e.g., lavender) is given by a red command having a value of 125 and a blue command having a value of 200.

Now consider a second lighting fixture including a second uncalibrated red light source substantially similar to the first uncalibrated red light source of the first lighting fixture, and a second uncalibrated blue light source substantially similar to the first uncalibrated blue light source of the first lighting fixture. As discussed above, even if both of the uncalibrated red light sources are controlled in response to respective identical commands, the actual intensity of light (e.g., radiant power in lumens) output by each red light source may be measurably different. Similarly, even if both of the uncalibrated blue light sources are controlled in response to respective identical commands, the actual light output by each blue light source may be measurably different.

With the foregoing in mind, it should be appreciated that if multiple uncalibrated light sources are used in combination in lighting fixtures to produce a mixed colored light as discussed above, the observed color (or color temperature) of light produced by different lighting fixtures under identical control conditions may be perceivably different. Specifically, consider again the "lavender" example above; the "first lavender" produced by the first lighting fixture with a red command having a value of 125 and a blue command having a value of 200 indeed may be perceivably different than a "second lavender" produced by the second lighting fixture with a red command having a value of 125 and a blue command having a value of 200. More generally, the first and second lighting fixtures generate uncalibrated colors by virtue of their uncalibrated light sources.

In view of the foregoing, in one embodiment of the present disclosure, the lighting fixture 100 includes calibration means to facilitate the generation of light having a calibrated (e.g., predictable, reproducible) color at any given time. In one aspect, the calibration means is configured to adjust (e.g., scale) the light output of at least some light sources of the lighting fixture so as to compensate for perceptible differences between similar light sources used in different lighting fixtures.

For example, in one embodiment, the processor 102 of the lighting fixture 100 is configured to control one or more of the light sources so as to output radiation at a calibrated intensity that substantially corresponds in a predetermined manner to a control signal for the light source(s). As a result of mixing radiation having different spectra and respective calibrated intensities, a calibrated color is produced. In one aspect of this embodiment, at least one calibration value for each light source is stored in the memory 114, and the processor is programmed to apply the respective calibration values to the control signals (commands) for the corresponding light sources so as to generate the calibrated intensities.

In one aspect of this embodiment, one or more calibration values may be determined once (e.g., during a lighting fixture manufacturing/testing phase) and stored in the memory 114 for use by the processor 102. In another aspect, the processor 102 may be configured to derive one or more calibration values dynamically (e.g. from time to time) with the aid of one or more photosensors, for example. In various embodiments, the photosensor(s) may be one or more external components coupled to the lighting fixture, or alternatively may be integrated as part of the lighting fixture itself. A photosensor is one example of a signal source that may be integrated or otherwise associated with the lighting fixture 100, and monitored by the processor 102 in connection with the operation of the lighting fixture. Other examples of such signal sources are discussed further below, in connection with the signal source 124 shown in FIG. 1.

One exemplary method that may be implemented by the processor 102 to derive one or more calibration values includes applying a reference control signal to a light source (e.g., corresponding to maximum output radiant power), and measuring (e.g., via one or more photosensors) an intensity of radiation (e.g., radiant power falling on the photosensor) thus generated by the light source. The processor may be programmed to then make a comparison of the measured intensity and at least one reference value (e.g., representing an intensity that nominally would be expected in response to the reference control signal). Based on such a comparison, the processor may determine one or more calibration values (e.g., scaling factors) for the light source. In particular, the processor may derive a calibration value such that, when applied to the reference control signal, the light source outputs radiation having an intensity that corresponds to the reference value (i.e., an "expected" intensity, e.g., expected radiant power in lumens).

In various aspects, one calibration value may be derived for an entire range of control signal/output intensities for a given light source. Alternatively, multiple calibration values may be derived for a given light source (i.e., a number of calibration value "samples" may be obtained) that are respectively applied over different control signal/output intensity ranges, to approximate a nonlinear calibration function in a piecewise linear manner.

In another aspect, as also shown in FIG. 1, the lighting fixture 100 optionally may include one or more user interfaces 118 that are provided to facilitate any of a number of user-selectable settings or functions (e.g., generally controlling the light output of the lighting fixture 100, changing and/or selecting various pre-programmed lighting effects to be generated by the lighting fixture, changing and/or selecting various parameters of selected lighting effects, setting particular identifiers such as addresses or serial numbers for the lighting fixture, etc.). In various embodiments, the communication between the user interface 118 and the lighting fixture may be accomplished through wire or cable, or wireless transmission.

In one implementation, the controller 105 of the lighting fixture monitors the user interface 118 and controls one or more of the light sources 104A, 104B, 104C and 104D based at least in part on a user's operation of the interface. For example, the controller 105 may be configured to respond to operation of the user interface by originating one or more control signals for controlling one or more of the light sources. Alternatively, the processor 102 may be configured to respond by selecting one or more pre-programmed control signals stored in memory, modifying control signals generated by executing a lighting program, selecting and executing a new lighting program from memory, or otherwise affecting the radiation generated by one or more of the light sources.

In particular, in one implementation, the user interface 118 may constitute one or more switches (e.g., a standard wall switch) that interrupt power to the controller 105. In one aspect of this implementation, the controller 105 is configured to monitor the power as controlled by the user interface, and in turn control one or more of the light sources based at least in part on a duration of a power interruption caused by operation of the user interface. As discussed above, the controller may be particularly configured to respond to a predetermined duration of a power interruption by, for example, selecting one or more pre-programmed control signals stored in memory, modifying control signals generated by executing a lighting program, selecting and executing a new lighting program from memory, or otherwise affecting the radiation generated by one or more of the light sources.

FIG. 1 also illustrates that the lighting fixture 100 may be configured to receive one or more signals 122 from one or more other signal sources 124. In one implementation, the controller 105 of the lighting fixture may use the signal(s) 122, either alone or in combination with other control signals (e.g., signals generated by executing a lighting program, one or more outputs from a user interface, etc.), so as to control one or more of the light sources 104A, 104B, 104C and 104D in a manner similar to that discussed above in connection with the user interface.

Examples of the signal(s) 122 that may be received and processed by the controller 105 include, but are not limited to, one or more audio signals, video signals, power signals, various types of data signals, signals representing information obtained from a network (e.g., the Internet), signals representing one or more detectable/sensed conditions, signals from lighting fixtures, signals consisting of modulated light, etc. In various implementations, the signal source(s) 124 may be located remotely from the lighting fixture 100, or included as a component of the lighting fixture. In one embodiment, a signal from one lighting fixture 100 could be sent over a network to another lighting fixture 100.

Some examples of a signal source 124 that may be employed in, or used in connection with, the lighting fixture 100 of FIG. 1 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/light sensors (e.g., photodiodes, sensors that are sensitive to one or more particular spectra of electromagnetic radiation such as spectroradiometers or spectrophotometers, etc.), various types of cameras, sound or vibration sensors or other pressure/force transducers (e.g., microphones, piezoelectric devices), and the like.

Additional examples of a signal source 124 include various metering/detection devices that monitor electrical signals or characteristics (e.g., voltage, current, power, resistance, capacitance, inductance, etc.) or chemical/biological characteristics (e.g., acidity, a presence of one or more particular chemical or biological agents, bacteria, etc.) and provide one or more signals 122 based on measured values of the signals or characteristics. Yet other examples of a signal source 124 include various types of scanners, image recognition systems, voice or other sound recognition systems, artificial intelligence and robotics systems, and the like. A signal source 124 could also be a lighting fixture 100, another controller or processor, or any one of many available signal generating devices, such as media players, MP3 players, computers, DVD players, CD players, television signal sources, camera signal sources, microphones, speakers, telephones, cellular phones, instant messenger devices, SMS devices, wireless devices, personal organizer devices, and many others.

In one embodiment, the lighting fixture 100 shown in FIG. 1 also may include one or more optical elements 130 to optically process the radiation generated by the light sources 104A, 104B, 104C, and 104D. For example, one or more optical elements may be configured so as to change one or both of a spatial distribution and a propagation direction of the generated radiation. In particular, one or more optical elements may be configured to change a diffusion angle of the generated radiation. In one aspect of this embodiment, one or more optical elements 130 may be particularly configured to variably change one or both of a spatial distribution and a propagation direction of the generated radiation (e.g., in response to some electrical and/or mechanical stimulus). Examples of optical elements that may be included in the lighting fixture 100 include, but are not limited to, reflective materials, refractive materials, translucent materials, filters, lenses, mirrors, and fiber optics. The optical element 130 also may include a phosphorescent material, luminescent material, or other material capable of responding to or interacting with the generated radiation.

As also shown in FIG. 1, the lighting fixture 100 may include one or more communication ports 120 to facilitate coupling of the lighting fixture 100 to any of a variety of other devices. For example, one or more communication ports 120 may facilitate coupling multiple lighting fixtures together as a networked lighting system, in which at least some of the lighting fixtures are addressable (e.g., have particular identifiers or addresses) and are responsive to particular data transported across the network.

In particular, in a networked lighting system environment, as discussed in greater detail further below (e.g., in connection with FIG. 2), as data is communicated via the network, the controller 105 of each lighting fixture coupled to the network may be configured to be responsive to particular data (e.g., lighting control commands) that pertain to it (e.g., in some cases, as dictated by the respective identifiers of the networked lighting fixtures). Once a given controller identifies particular data intended for it, it may read the data and, for example, change the lighting conditions produced by its light sources according to the received data (e.g., by generating appropriate control signals to the light sources). In one aspect, the memory 114 of each lighting fixture coupled to the network may be loaded, for example, with a table of lighting control signals that correspond with data the processor 102 of the controller receives. Once the processor 102 receives data from the network, the processor may consult the table to select the control signals that correspond to the received data, and control the light sources of the lighting fixture accordingly.

In one aspect of this embodiment, the processor 102 of a given lighting fixture, whether or not coupled to a network, may be configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. For example, in one aspect, considering for the moment a lighting fixture based on red, green and blue LEDs (i.e., an "R-G-B" lighting fixture), a lighting command in DMX protocol may specify each of a red channel command, a green channel command, and a blue channel command as eight-bit data (i.e., a data byte) representing a value from 0 to 255. The maximum value of 255 for any one of the color channels instructs the processor 102 to control the corresponding light source(s) to operate at maximum available power (i.e., 100%) for the channel, thereby generating the maximum available radiant power for that color (such a command structure for an R-G-B lighting fixture commonly is referred to as 24-bit color control). Hence, a command of the format [R, G, B]=[255, 255, 255] would cause the lighting fixture to generate maximum radiant power for each of red, green and blue light (thereby creating white light).

It should be appreciated, however, that lighting fixtures suitable for purposes of the present disclosure are not limited to a DMX command format, as lighting fixtures according to various embodiments may be configured to be responsive to other types of communication protocols/lighting command formats so as to control their respective light sources. In general, the processor 102 may be configured to respond to lighting commands in a variety of formats that express prescribed operating powers for each different channel of a multi-channel lighting fixture according to some scale representing zero to maximum available operating power for each channel.

In one embodiment, the lighting fixture 100 of FIG. 1 may include and/or be coupled to one or more power sources 108. In various aspects, examples of power source(s) 108 include, but are not limited to, AC power sources, DC power sources, batteries, solar-based power sources, thermoelectric or mechanical-based power sources and the like. Additionally, in one aspect, the power source(s) 108 may include or be associated with one or more power conversion devices that convert power received by an external power source to a form suitable for operation of the lighting fixture 100.

While not shown explicitly in FIG. 1, but as discussed in greater detail further below, the lighting fixture 100 may be implemented in any one of several different structural configurations according to various embodiments of the present disclosure. Examples of such configurations include, but are not limited to, an essentially linear or curvilinear configuration, a circular configuration, an oval configuration, a rectangular configuration, combinations of the foregoing, various other geometrically shaped configurations, various two or three dimensional configurations, and the like. A given lighting fixture also may have any one of a variety of mounting arrangements for the light source(s), enclosure/housing arrangements and shapes to partially or fully enclose the light sources, and/or electrical and mechanical connection configurations.

Additionally, one or more optical elements as discussed above may be partially or fully integrated with an enclosure/housing arrangement for the lighting fixture. Furthermore, the various components of the lighting fixture discussed above (e.g., processor, memory, power, user interface, etc.), as well as other components that may be associated with the lighting fixture in different implementations (e.g., sensors/transducers, other components to facilitate communication to and from the unit, etc.) may be packaged in a variety of ways; for example, in one aspect, any subset or all of the various lighting fixture components, as well as other components that may be associated with the lighting fixture, may be packaged together. In another aspect, packaged subsets of components may be coupled together electrically and/or mechanically in a variety of manners, as discussed below.

Figure 2:
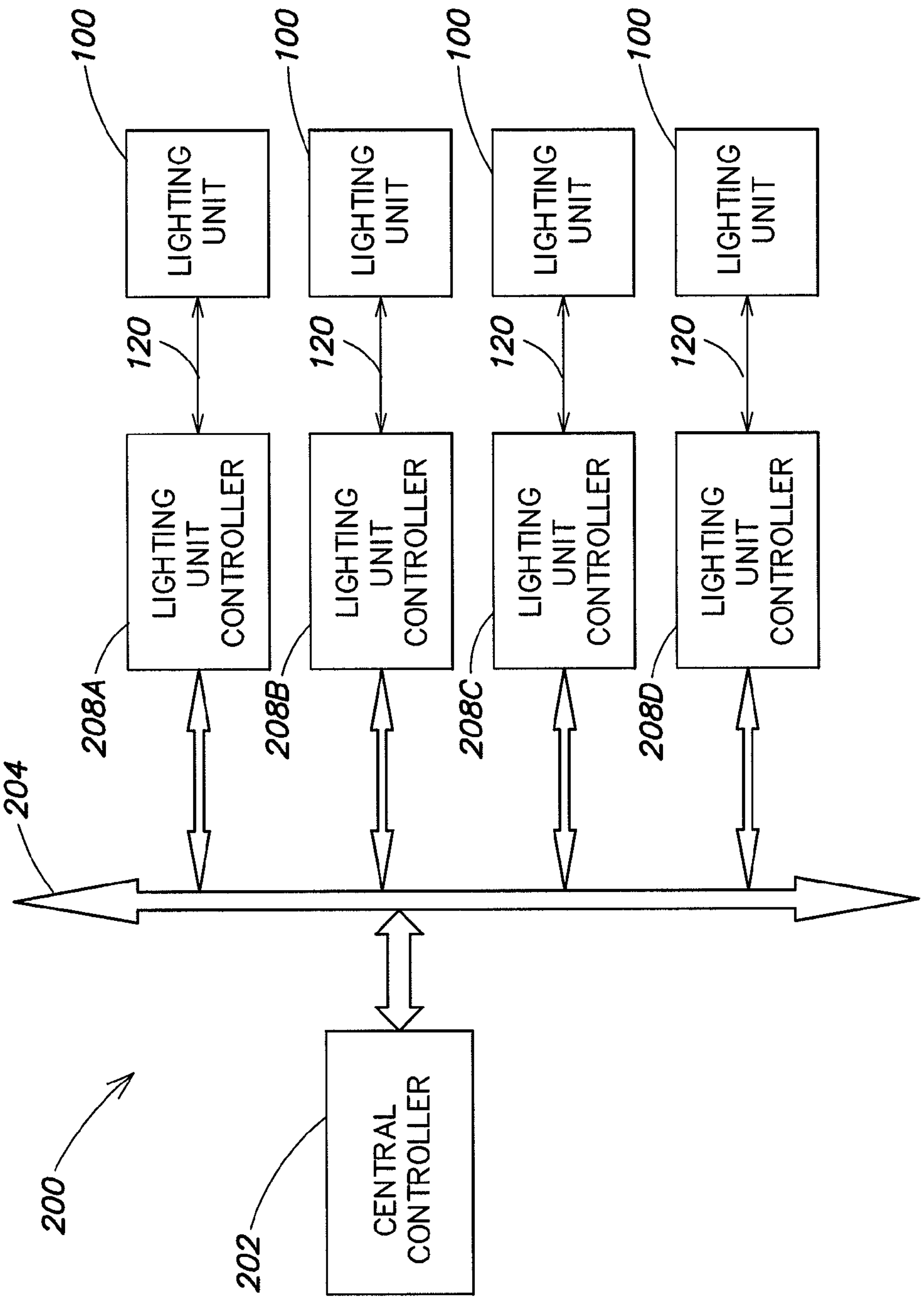
FIG. 2 is a diagram illustrating a networked lighting system according to one embodiment of the disclosure.

FIG. 2 illustrates an example of a networked lighting system 200 according to one embodiment of the present disclosure. In the embodiment of FIG. 2, a number of lighting fixtures or fixtures 100, similar to those discussed above in connection with FIG. 1, are coupled together to form the networked lighting system. It should be appreciated, however, that the particular configuration and arrangement of lighting fixtures shown in FIG. 2 is for purposes of illustration only, and that the disclosure is not limited to the particular system topology shown in FIG. 2.

Additionally, while not shown explicitly in FIG. 2, it should be appreciated that the networked lighting system 200 may be configured flexibly to include one or more user interfaces, as well as one or more signal sources such as sensors/transducers. For example, one or more user interfaces and/or one or more signal sources such as sensors/transducers (as discussed above in connection with FIG. 1) may be associated with any one or more of the lighting fixtures of the networked lighting system 200. Alternatively (or in addition to the foregoing), one or more user interfaces and/or one or more signal sources may be implemented as "stand alone" components in the networked lighting system 200. Whether stand alone components or particularly associated with one or more lighting fixtures 100, these devices may be "shared" by the lighting fixtures of the networked lighting system. Stated differently, one or more user interfaces and/or one or more signal sources such as sensors/transducers may constitute "shared resources" in the networked lighting system that may be used in connection with controlling any one or more of the lighting fixtures of the system.

As shown in the embodiment of FIG. 2, the lighting system 200 may include one or more lighting fixture controllers (hereinafter "LUCs") 208A, 208B, 208C, and 208D, wherein each LUC is responsible for communicating with and generally controlling one or more lighting fixtures 100 coupled to it. Although FIG. 2 illustrates one lighting fixture 100 coupled to each LUC, it should be appreciated that the disclosure is not limited in this respect, as different numbers of lighting fixtures 100 may be coupled to a given LUC in a variety of different configurations (serially connections, parallel connections, combinations of serial and parallel connections, etc.) using a variety of different communication media and protocols.

In the system of FIG. 2, each LUC in turn may be coupled to a central controller 202 that is configured to communicate with one or more LUCs. Although FIG. 2 shows four LUCs coupled to the central controller 202 via a generic connection 204 (which may include any number of a variety of conventional coupling, switching and/or networking devices), it should be appreciated that according to various embodiments, different numbers of LUCs may be coupled to the central controller 202. Additionally, according to various embodiments of the present disclosure, the LUCs and the central controller may be coupled together in a variety of configurations using a variety of different communication media and protocols to form the networked lighting system 200. Moreover, it should be appreciated that the interconnection of LUCs and the central controller, and the interconnection of lighting fixtures to respective LUCs, may be accomplished in different manners (e.g., using different configurations, communication media, and protocols).

For example, according to one embodiment of the present disclosure, the central controller 202 shown in FIG. 2 may by configured to implement Ethernet-based communications with the LUCs, and in turn the LUCs may be configured to implement DMX-based communications with the lighting fixtures 100. In particular, in one aspect of this embodiment, each LUC may be configured as an addressable Ethernet-based controller and accordingly may be identifiable to the central controller 202 via a particular unique address (or a unique group of addresses) using an Ethernet-based protocol. In this manner, the central controller 202 may be configured to support Ethernet communications throughout the network of coupled LUCs, and each LUC may respond to those communications intended for it. In turn, each LUC may communicate lighting control information to one or more lighting fixtures coupled to it, for example, via a DMX protocol, based on the Ethernet communications with the central controller 202.

More specifically, according to one embodiment, the LUCs 208A, 208B, and 208C shown in FIG. 2 may be configured to be "intelligent" in that the central controller 202 may be configured to communicate higher level commands to the LUCs that need to be interpreted by the LUCs before lighting control information can be forwarded to the lighting fixtures 100. For example, a lighting system operator may want to generate a color changing effect that varies colors from lighting fixture to lighting fixture in such a way as to generate the appearance of a propagating rainbow of colors ("rainbow chase"), given a particular placement of lighting fixtures with respect to one another. In this example, the operator may provide a simple instruction to the central controller 202 to accomplish this, and in turn the central controller may communicate to one or more LUCs using an Ethernet-based protocol high level command to generate a "rainbow chase." The command may contain timing, intensity, hue, saturation or other relevant information, for example. When a given LUC receives such a command, it may then interpret the command and communicate further commands to one or more lighting fixtures using a DMX protocol, in response to which the respective sources of the lighting fixtures are controlled via any of a variety of signaling techniques (e.g., PWM).

It should again be appreciated that the foregoing example of using multiple different communication implementations (e.g., Ethernet/DMX) in a lighting system according to one embodiment of the present disclosure is for purposes of illustration only, and that the disclosure is not limited to this particular example.

From the foregoing, it may be appreciated that one or more lighting fixtures as discussed above are capable of generating highly controllable variable color light over a wide range of colors, as well as variable color temperature white light over a wide range of color temperatures.

Figure 3:
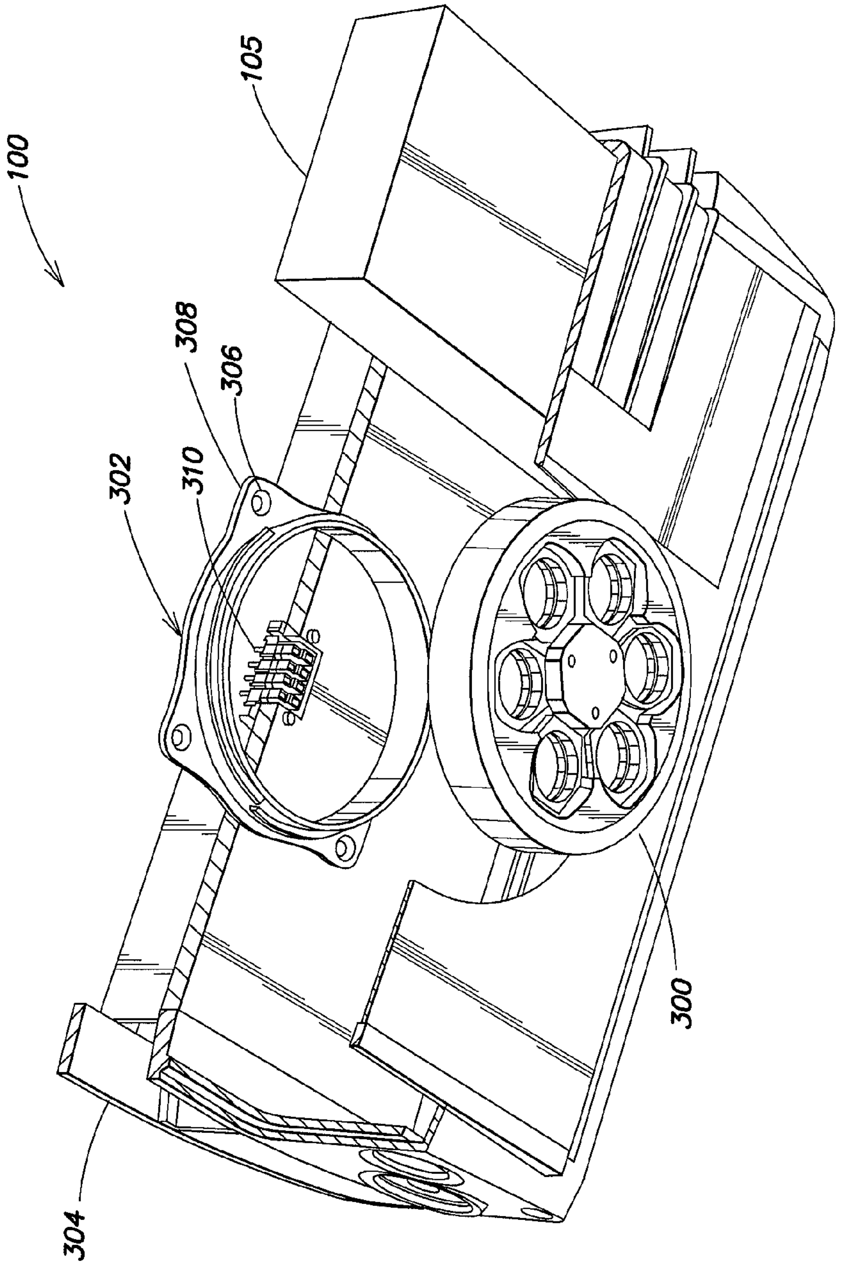
FIG. 3 is a perspective, partial cut away bottom view of a lighting fixture according to one embodiment of the disclosure.

FIG. 3 illustrates a perspective, partial cutaway view of a lighting fixture 100 having modular construction according to one embodiment of the disclosure. A light-generating module 300, such as an LED-based module, is attachable to and detachable from a mating socket 302. The socket 302 is fixedly coupled to a housing 304 (e.g., via screws inserted through holes 306 in flanges 308 of the socket 302), and the light-generating module 300 may be easily installed in the housing 304, via the socket 302, to form the lighting fixture 100. In some exemplary implementations, the housing 304 may serve as a heat sink (e.g., the housing may be formed from a significantly thermally conductive material, such as die-cast or extruded metal). The lighting fixture 100 of this embodiment further includes a controller module 105 as a separate component from the light-generating module 300 that may be permanently or replaceably mounted within the housing 304.

In some embodiments, the light-generating module 300 may be implemented in a relatively straightforward manner, including one or more LED-based light sources and connectors for connection of the LEDs to drive signals and operating power. In other embodiments, the light-generating module 300 may include a variety of components, including but not limited to thermal dissipation elements, on-board memory and/or control features, and optical components. When the light-generating module 300 is attached to the housing 304 via the socket 302, the light-generating module 300 may be electrically connected to the controller module 105 via a connector 310.

In some embodiments, as illustrated in FIG. 3, the overall shape of the light-generating module 300 may resemble a hockey puck. For example, in some embodiments, a circular light-generating module may have a diameter of approximately three inches and a thickness of approximately one inch. In some embodiments, the thickness of the light-generating module near the center of the light-generating module is greater than the thickness near the edges.

Figure 4:
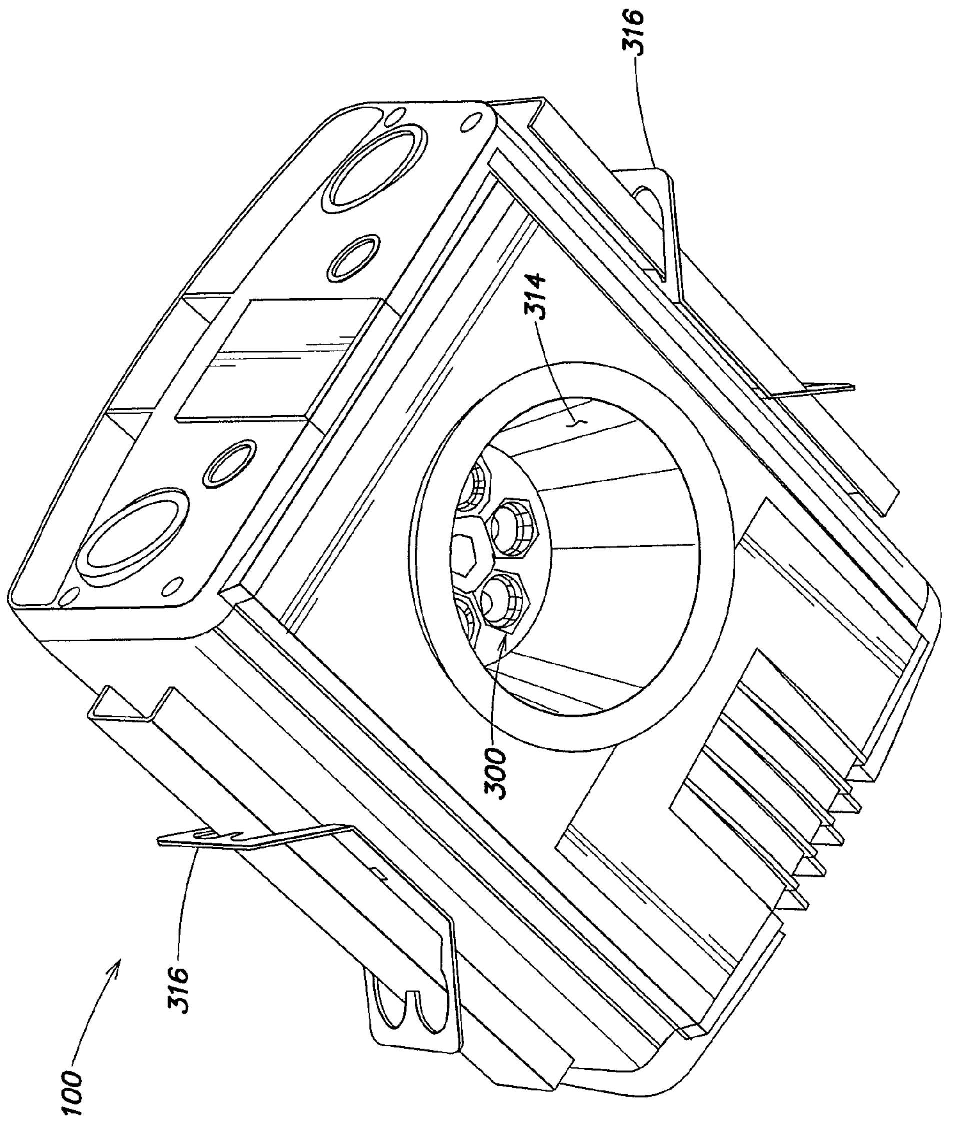
FIG. 4 is a perspective bottom view of the lighting fixture of FIG. 3.

FIG. 4 shows a perspective view of a fully assembled modular lighting fixture 100 similar to that shown in FIG. 3, including a reflector cone 314 and mounting brackets 316.

The reflector cone 314 may be removable to facilitate replacement of the light-generating module 300 and/or the controller module 105.

Figure 5:
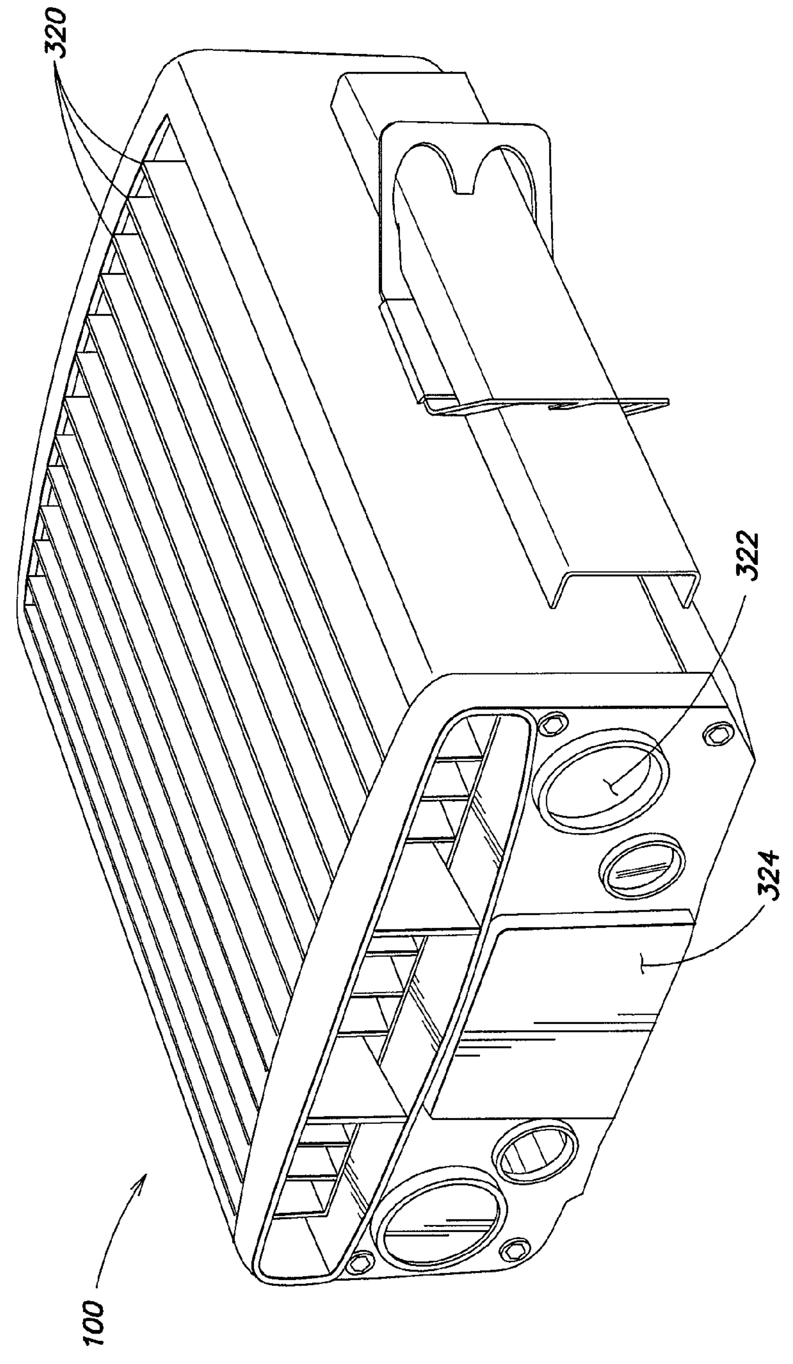
FIG. 5 is a perspective top view of the lighting fixture of FIGS. 3 and 4.

FIG. 5 shows a top perspective view of the fully assembled lighting fixture 100. In some embodiments of the lighting fixture, the lighting fixture 100 includes thermal dissipation elements 320 (fins in this embodiment) for transferring heat away from the light-generating module 300 and/or the controller module 105. For example, the socket 302 may be formed with a thermally conductive material to facilitate transfer of heat from the light-generating module 300 to the housing 304, which in turn transfers heat to the fins or other suitable thermal dissipation elements. Wiring knockouts 322 and a wiring compartment door 324 are also visible in this view. In some embodiments, separate thermal dissipation elements (i.e., thermally isolated from thermal dissipation elements that transfer heat away from the light-generating module) are provided for transferring heat away from the controller module 105, while in other embodiments, the same thermal dissipation elements transfer heat away from both the light-generating module 300 and the controller module 105.

Figure 6:
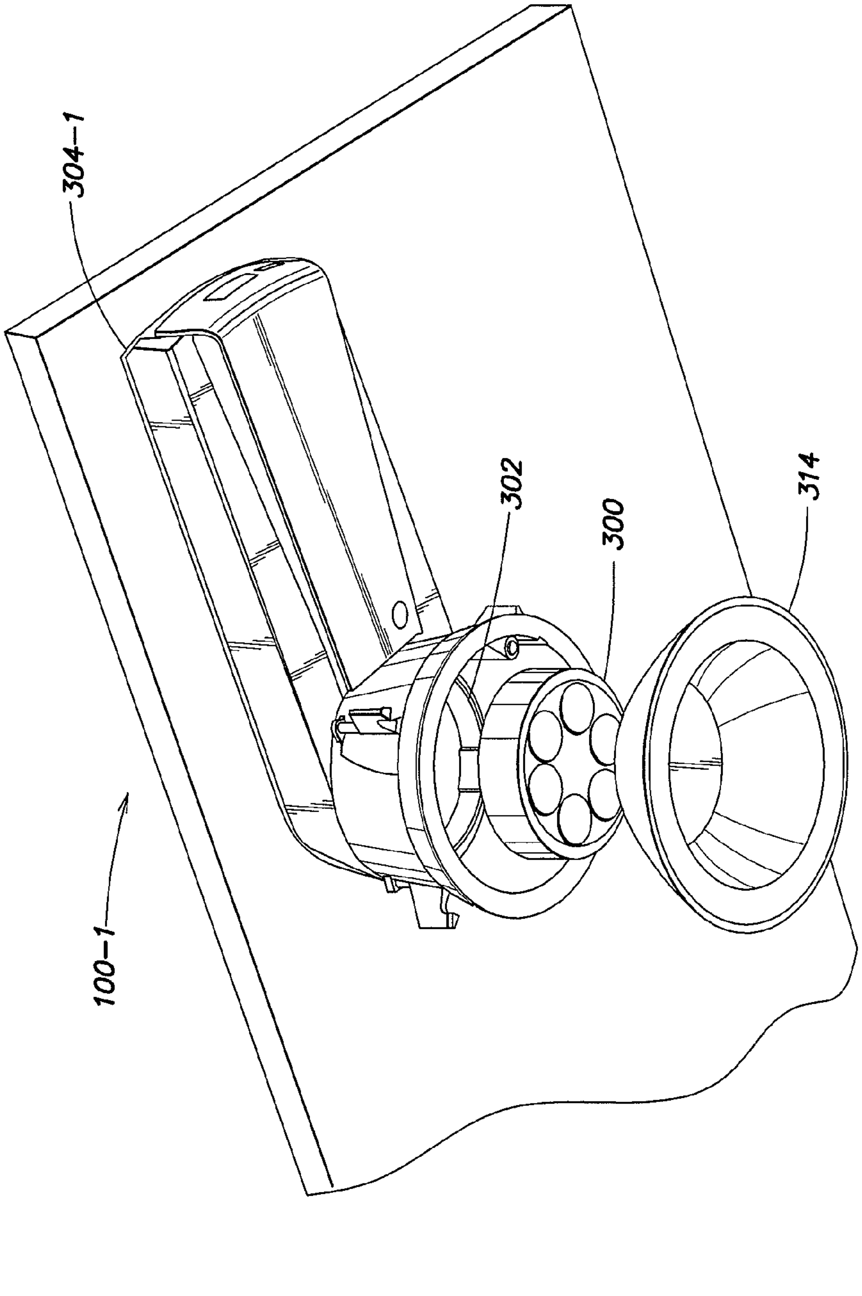
FIG. 6 is a partially exploded perspective bottom view of a lighting fixture according to another embodiment of the disclosure.

FIG. 6 illustrates a perspective view of another embodiment of a modular lighting fixture 100-1 which includes a housing 304-1 having a shape that differs from the embodiment illustrated in FIGS. 3-5. The embodiment illustrated in FIG. 6 may be useful for installation and/or removal through holes in ceilings or walls, as discussed in more detail further below. Similar to the embodiment of FIGS. 3-5, the lighting fixture 100-1 includes a light-generating module 300, a socket 302 and a reflector cone 314.

Figure 68:
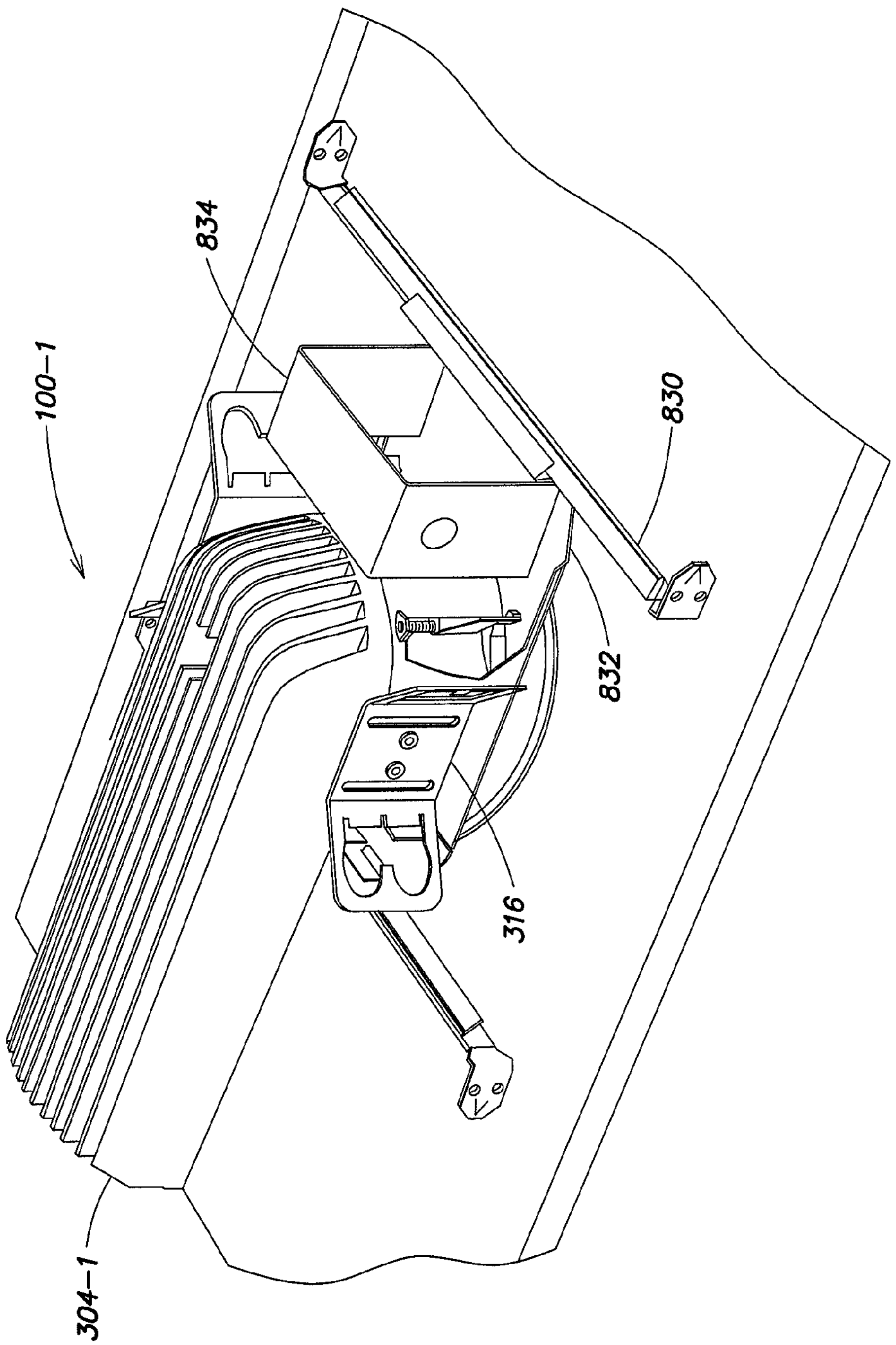
FIG. 68 is a perspective view of a lighting fixture mounted behind an architectural feature according to one embodiment of the disclosure.

In some embodiments, the controller module 105 associated with a given lighting fixture may be disposed internally within the housing, as illustrated in FIG. 3, while in other embodiments, the controller module 105 may be disposed externally (e.g., in a junction box such as the junction box shown in FIG. 68).

Figure 7:
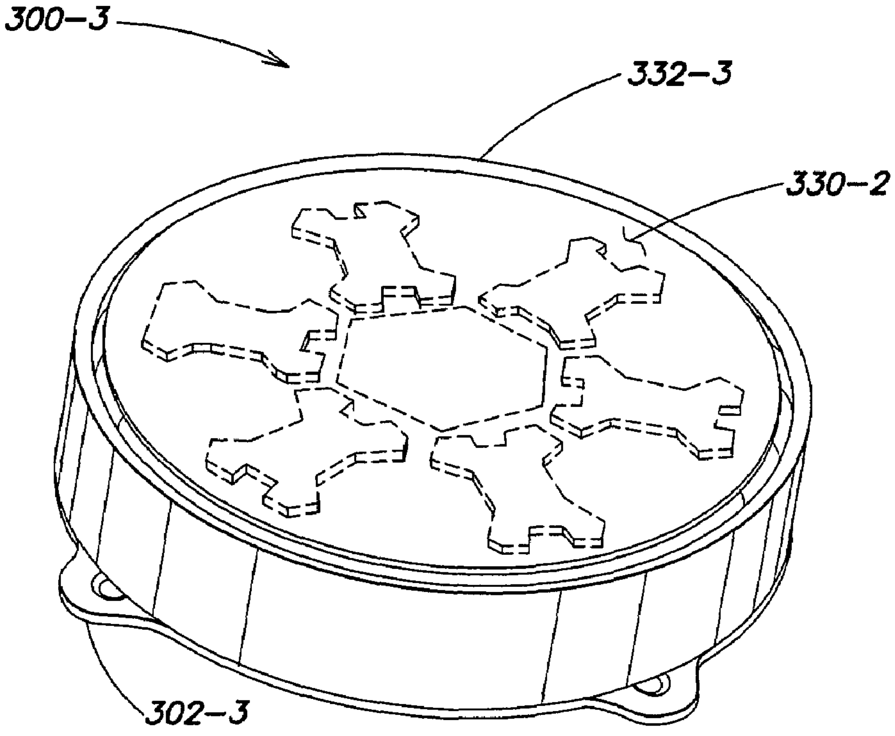
FIG. 7 is a perspective view of a light-generating module and socket combination according to one embodiment of the disclosure.
Figure 8:
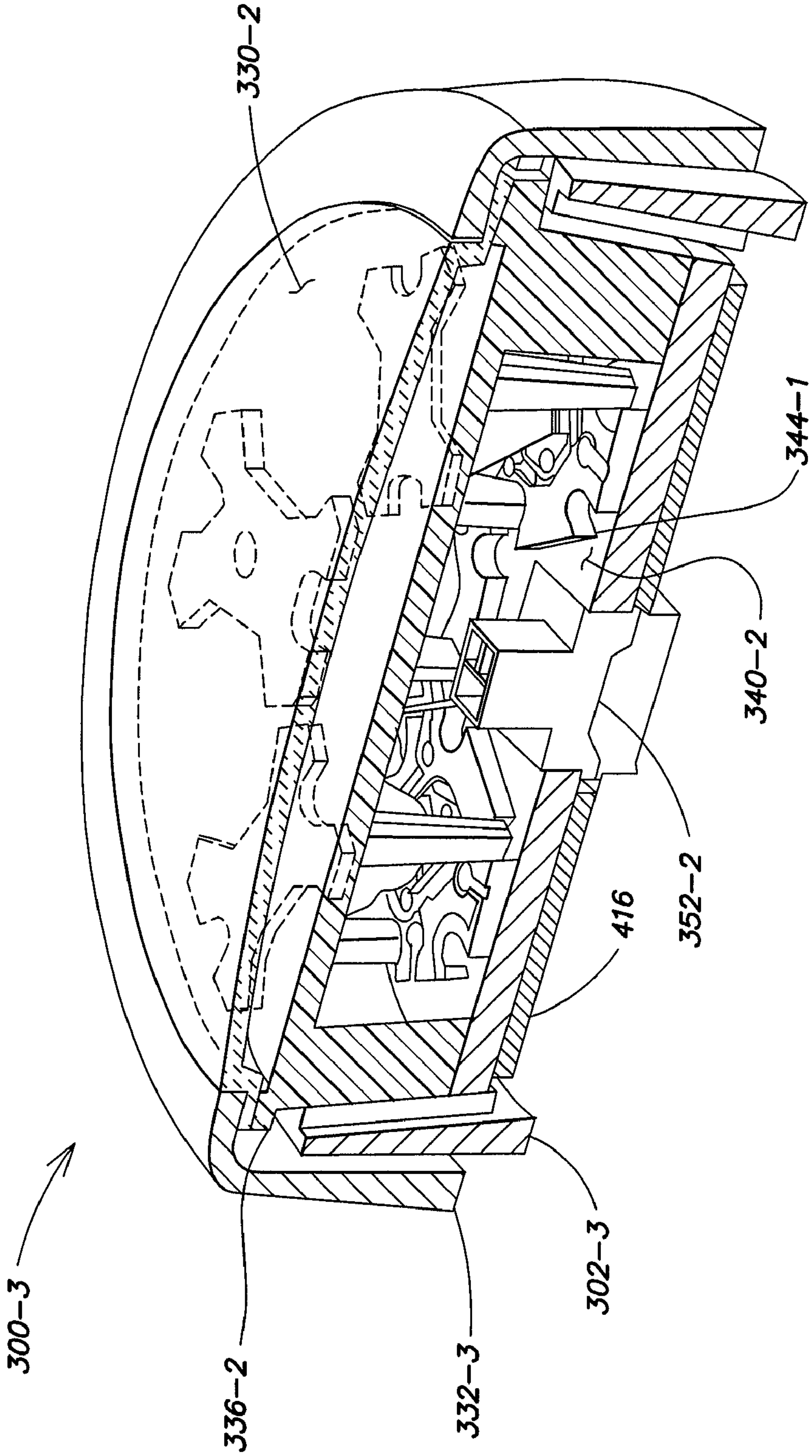
FIG. 8 is a perspective cut away view of the light-generating module of FIG. 7.
Figure 9:
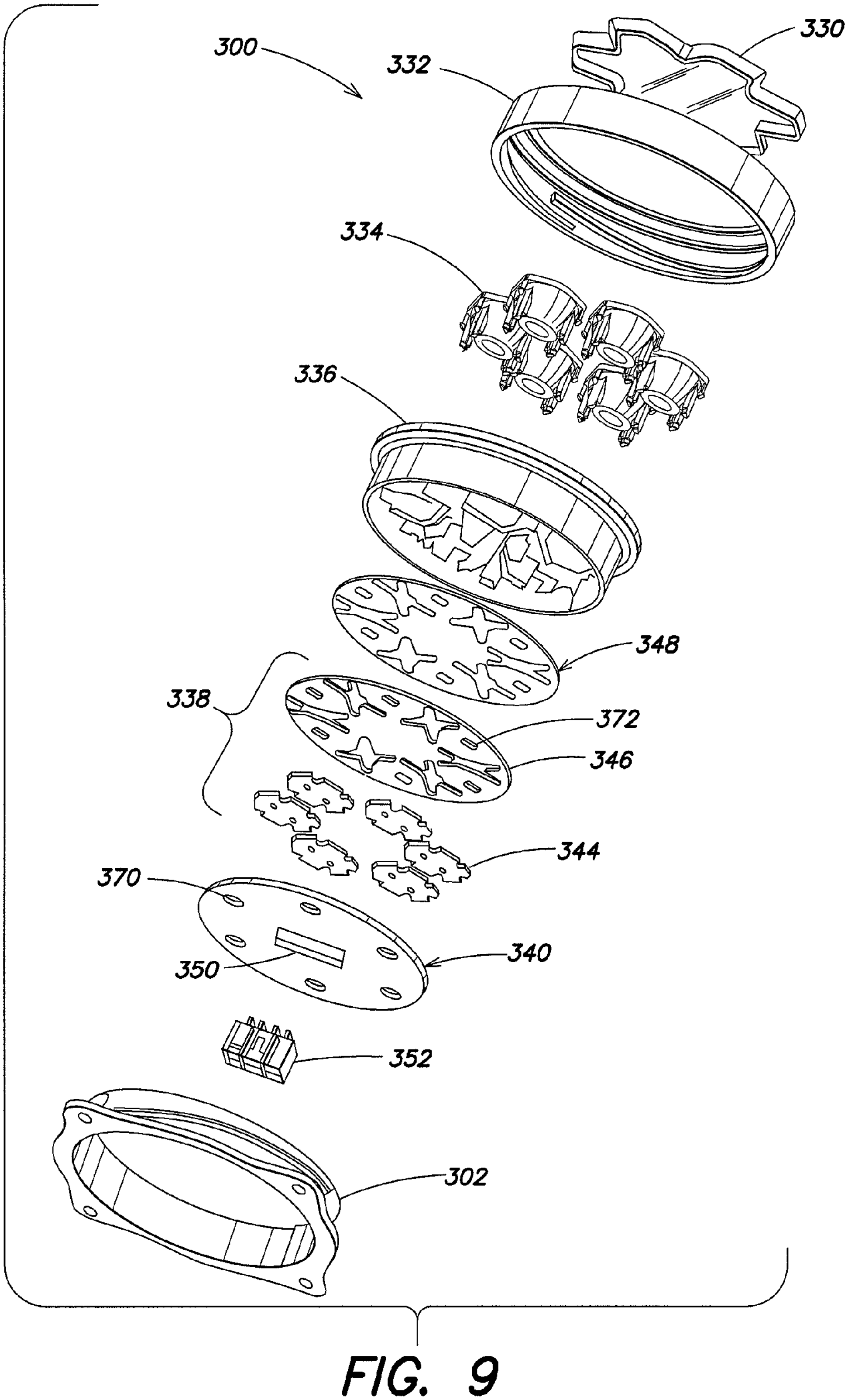
FIG. 9 is an exploded view of a light-generating module and a socket according to one embodiment of the disclosure.

FIGS. 7 and 8 illustrate perspective views of an assembled light-generating module 300-3 attached to a socket 302-3 of a lighting fixture according to one embodiment of the disclosure. The exemplary embodiment depicted in FIGS. 7 and 8 is discussed in further detail below in connection with FIGS. 27-31. FIG. 9 illustrates an exploded perspective view of a light-generating module 300, a socket 302 and a grip ring 332, according to yet another embodiment of the present disclosure. The illustrations of FIGS. 7-9 represent two exemplary embodiments of a light-generating module, and each component described with reference to FIGS. 7-9 is not necessarily required to form a light-generating module according to other embodiments.

With reference to FIG. 9, the components of the light-generating module 300 according to one embodiment include a light-passing (e.g., transparent or translucent) face plate 330, the grip ring 332, secondary optic components 334, a chassis 336, an LED assembly 338, and an aluminum base plate 340. In the embodiment of FIG. 9, the chassis 336 is configured as a metal die-cast component to facilitate heat transfer (in other embodiments, as discussed below in connection with FIGS. 27-31, a similar chassis may be formed as an injected molded component made of plastic.) The chassis 336 is configured to support a number of the secondary optic components 334.

In the module shown in FIG. 9, the LED assembly 338 includes multiple hexagonally-shaped LED subassemblies 344 (hereafter "LED hex subassemblies") which are sandwiched between a thermally conductive base plate (aluminum base plate 340) and a printed circuit board substrate 346. The combination of the base plate 340, hex subassemblies 344 and printed circuit board 346 may in turn be covered with an electrically insulating and thermally conducting layer 348 and coupled to the chassis 336 (e.g., via screws which pass through holes in the base plate and engage with threaded bores in the chassis 336). The light-passing face plate 330 also is optionally employed in the light-generating module 300, and may be held in place by the grip ring 332. Base plate 340 may include a cut-out or through-hole 350 to accommodate a connector 352 which connects to the LED assembly 338. With reference again to FIG. 3, in one implementation, the connector 352 essentially serves as a first electrical connector portion which engages with the connector 310 in the fixture housing 304, which connector serves as a complimentary second electrical connection portion when the light-generating module is installed in the socket 302.

With respect to heat management, dissipating heat through the front face (light exit face) of the light-generating module may aid in thermal efficiency. In assembling the light-generating module 300 of FIG. 9, an electrically insulating and thermally conducting layer 348 may be employed between the LED assembly 338 and the chassis 336, as illustrated in FIG. 9. In this manner, thermal transfer may occur via the front of the LED assembly (via the printed circuit board 346, the thermally conducting layer 348, and the die-cast metal chassis 336), as well as via the rear of the LED assembly 338 (via optional thermal paste or grease, the base plate 340, and ultimately to a housing or other heat sink to which the base plate may in turn be coupled, e.g., see FIG. 3). Components other than the chassis may be made from thermally conductive material, and various of the die-cast components may be painted/anodized black to facilitate heat transfer.

While the particular embodiment shown in FIGS. 7-9 illustrates a module that accommodates six LED hex subassemblies 344, it should be appreciated that the disclosure is not limited in this respect, as different configurations and numbers of LED subassemblies 344 may be employed in other embodiments. Additionally, in any of the embodiments described herein, an LED subassembly having a shape other than a hexagonal shape may be substituted for an LED hex subassembly.

Figure 10:
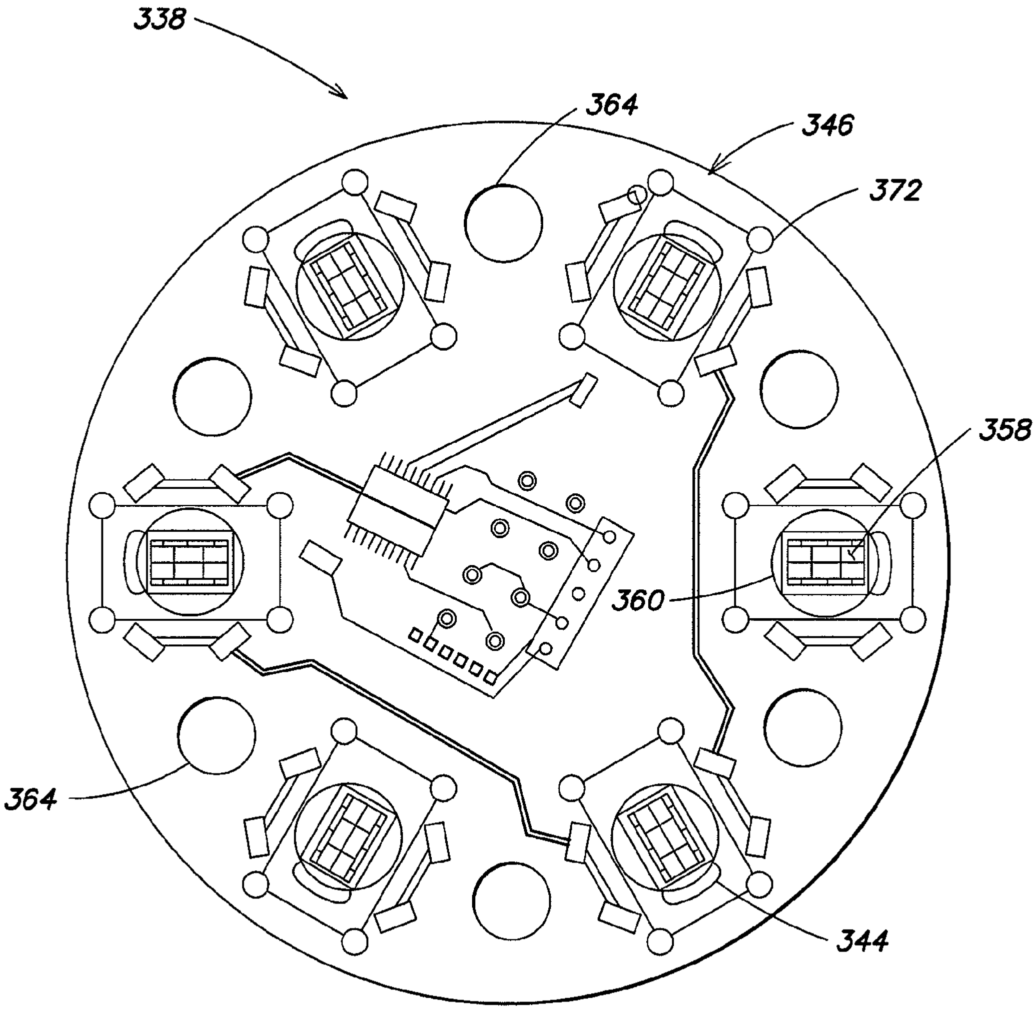
FIG. 10 is a front view of an LED assembly of the light-generating module of FIG. 9, according to one embodiment of the disclosure.

FIG. 10 is a close-up front view of the LED assembly 338 of the light-generating module 300 illustrated in FIG. 9. In particular, FIG. 10 illustrates six LED hex subassemblies 344 (e.g., OSTAR® subassemblies, which are described in more detail below) coupled to a printed circuit board 346. As can be seen in FIG. 10, each hex subassembly 344 includes six individual LED junctions 358 that are electrically interconnected in the subassembly so as to be operated simultaneously in response to a drive signal applied to the subassembly. Each subassembly also includes a primary optic 360 which may be a lens configured to provide a Lambertian beam shape. As discussed below, the hex subassemblies 344 are coupled to a rear or bottom surface of the printed circuit board 346, and the printed circuit board is configured with through holes for the primary optic 360 of each hex subassembly 344. Large through-holes 364 in the printed circuit board 346 facilitate attachment of the base plate 340 and the LED assembly 338 to the chassis 336.

In one implementation, the LED hex subassemblies 344 may be components manufactured under the name OSTAR® by OSRAM Opto Semiconductors Gmbh (see http://www.osram-os.com/ostar-lighting). Each OSTAR® subassembly 344 may provide up to 400 lumens of radiation at an operating current of 700 milliamps from six LED junctions that are driven simultaneously to provide white light having a color temperature of approximately 5600 degrees Kelvin.

In one aspect, LED hex subassemblies 344, exemplified by the OSTAR® products, may be implemented as "chip-on-board" LED subassemblies or modules. In a chip-on-board assembly, an unpackaged silicon die (i.e., semiconductor chip) is attached directly onto the surface of a substrate (e.g., an FR-4 printed circuit board, a flexible printed circuit board, a ceramic substrate, etc.) and wire bonded to form electrical connections to the substrate. An epoxy resin or a silicone coating is then applied on top of the die/chip to encapsulate and protect the die/chip. In one exemplary OSTAR® configuration, the LED hex subassembly includes four or six LED semiconductor chips mounted on a ceramic substrate, which is in turn mounted directly to a surface of a metal core printed circuit board. To protect the semiconductor chips from environmental influences such as moisture, the chips may be coated with a clear silicone encapsulant.

Each OSTAR® includes an aluminum core substrate to facilitate thermal dissipation, on top of which is disposed electrical connections, the LED junctions (semiconductor chips), and an integrated primary lens (as one example of a primary optic) to provide a Lambertian beam shape. The hexagonally-shaped substrate is provided with multiple perimeter cut-outs and/or through-holes to permit coupling of the subassemblies via screws to the chassis 336 and also to facilitate registration of the individual hex subassemblies to a common substrate, as well as optional secondary optics. Electrical connections to the hex subassemblies may be made by soldering to contacts on the top of the subassembly, or by employing spring type contacts. An aluminum substrate of the OSTARs® may be, in some embodiments, placed in direct contact with thermally conductive features, such as the base plate 340, the socket 302, and/or the fixture housing 304, to facilitate a thermal conduction path away from the LED subassemblies.

While an example of an LED hex subassembly constituted by an OSTAR® component is discussed above, it should be appreciated that the disclosure is not limited in this respect, as LED hex subassemblies having other configurations, including one or more LEDs configured to generate essentially white light having a variety of color temperatures and/or light having a variety of non-white colors, may be employed in light-generating modules according to various embodiments.

In particular, in one exemplary implementation, one or more LED subassemblies of a given LED assembly may generate white light having a first color temperature, and one or more others of the LED subassemblies may generate white light having a different second color temperature, such that a given light-generating module may be configured as a multi-channel LED-base light source. Likewise, a lighting fixture including such a multi-channel light-generating module may be configured with a multi-channel controller module configured to independently control the multiple channels of the multi-channel light-generating module. In this manner, the light-generating module may be configured to generate either of the different color temperatures, or an arbitrary combination of the different color temperatures. Thus, lighting fixtures according to the present disclosure may be particularly configured to provide for controllable variable color-temperature white light from a single light-generating module.

Figure 11:
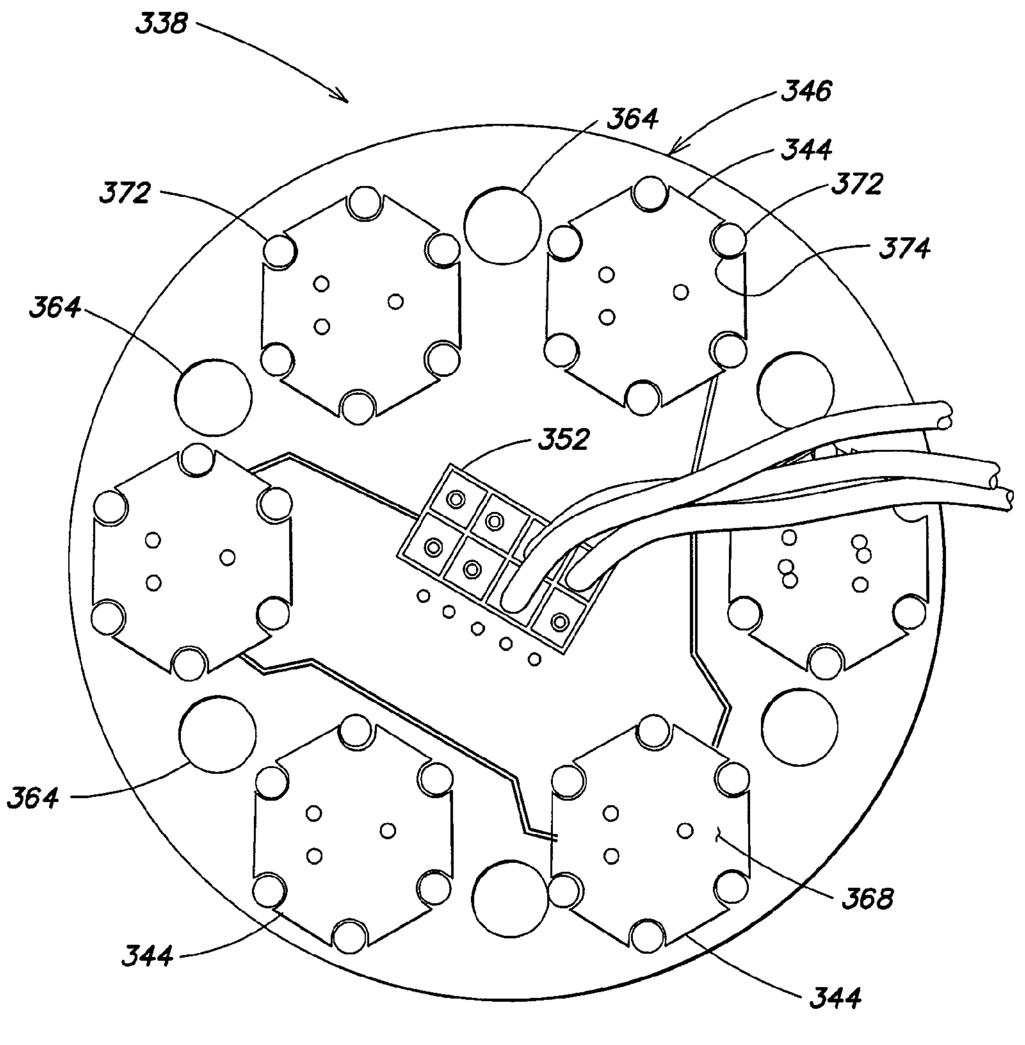
FIG. 11 is a rear view of the LED assembly of FIG. 10.

FIG. 11 is a close-up rear view of the LED assembly 338, showing the rear mounting of the hex subassemblies 344 to the printed circuit board 346, as well as the electrical connector 352 that provides one or more drive signals for operating the hex subassemblies. From FIG. 11, a rear surface 368 of the aluminum substrate of each hex subassembly 344 is clearly visible. With reference again to FIG. 9, in one aspect of this embodiment, the rear surfaces of the hex subassemblies are coupled to the aluminum base plate 340 to facilitate thermal transfer from the back (or bottom surface) of the hex subassemblies. In one implementation, thermal grease or paste may be used to adhere the base plate 340 to the LED assembly 338, such that through-holes 370 in the base plate 340 are aligned with the large through-holes 364 in the printed circuit board 346 to facilitate attachment of the base plate and the LED assembly to the chassis 336. As mentioned above, the base plate 340 may include a center cut-out or through-hole to allow for clearance of the electrical connector 352.

From FIGS. 9-11, it may also be observed that the printed circuit board 346 includes a number of smaller registration through-holes 372 that are aligned with semi-circle cut outs 374 in the perimeters of the hex subassemblies 344. These through-holes 372 facilitate the coupling of the subassemblies to the printed circuit board 346, as discussed below in connection with FIGS. 12-14.

Figure 12:
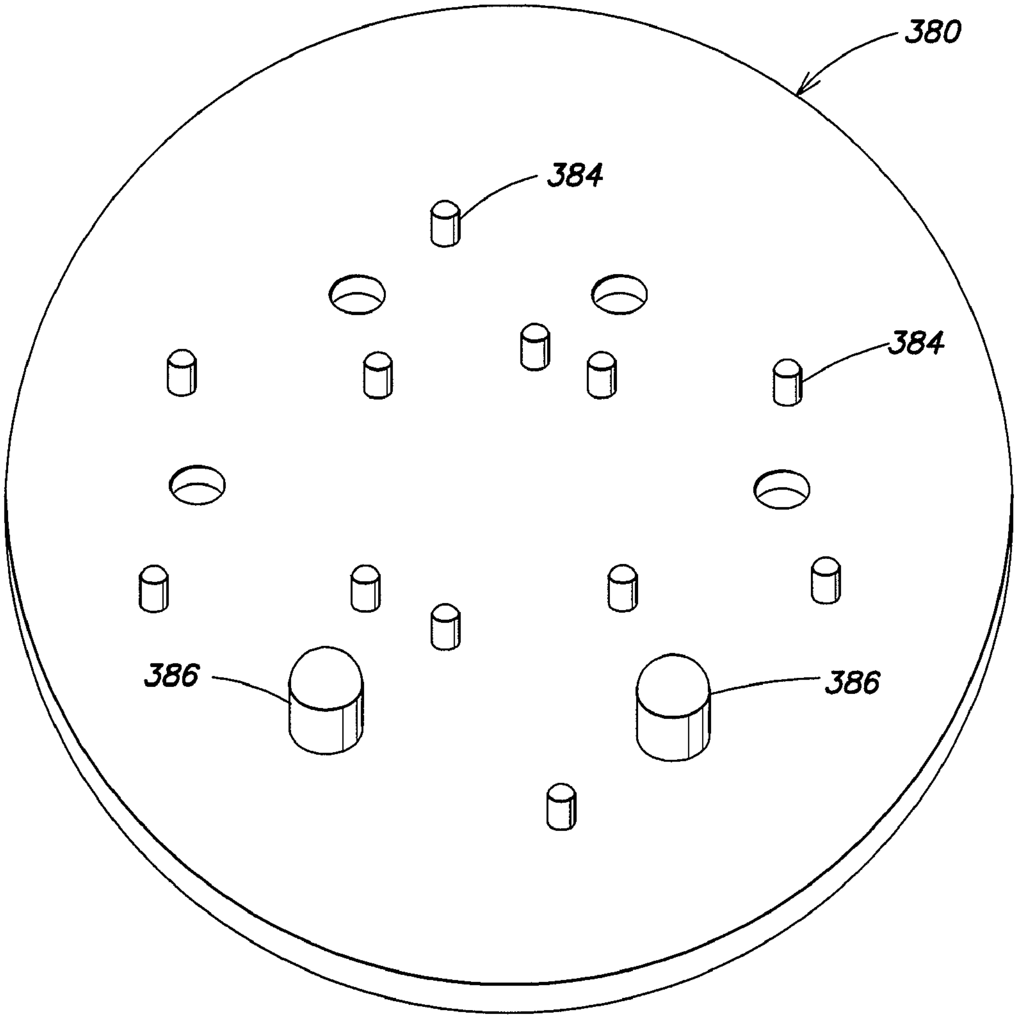
FIG. 12 illustrates a jig for use in assembling the LED assembly of FIGS. 10 and 11, according to one embodiment of the disclosure.

FIG. 12 illustrates a "jig" 380 that may be employed to facilitate assembly of the LED assembly 338. The jig 380 may be constructed of any rigid material, such as an aluminum plate. As shown in FIG. 12, the aluminum plate may include a number of holes into which are placed small pegs 384 and large pegs 386. As will be evident from the subsequent discussion and figures, the different sized pegs ensure proper registration between the hex subassemblies 344 and the printed circuit board 346.

Figure 13:
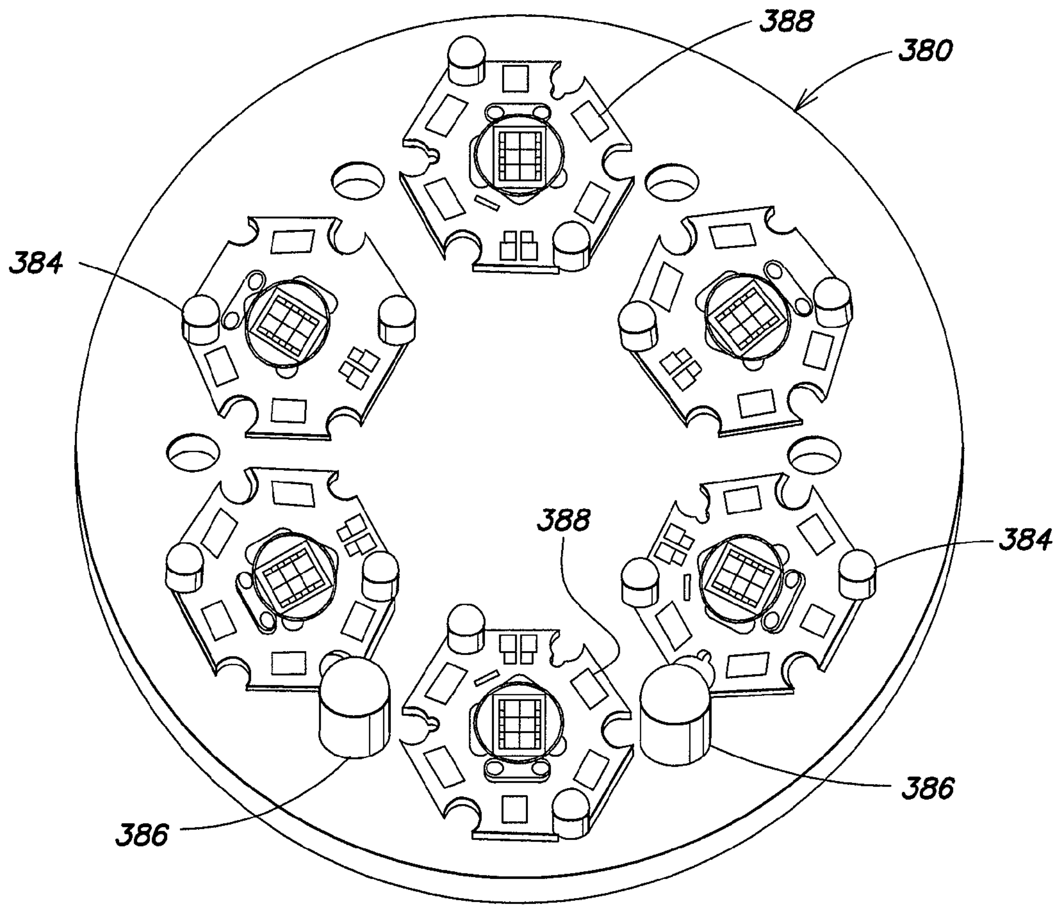
FIG. 13 illustrates LED subassemblies positioned on the jig of FIG. 12.
Figure 14:
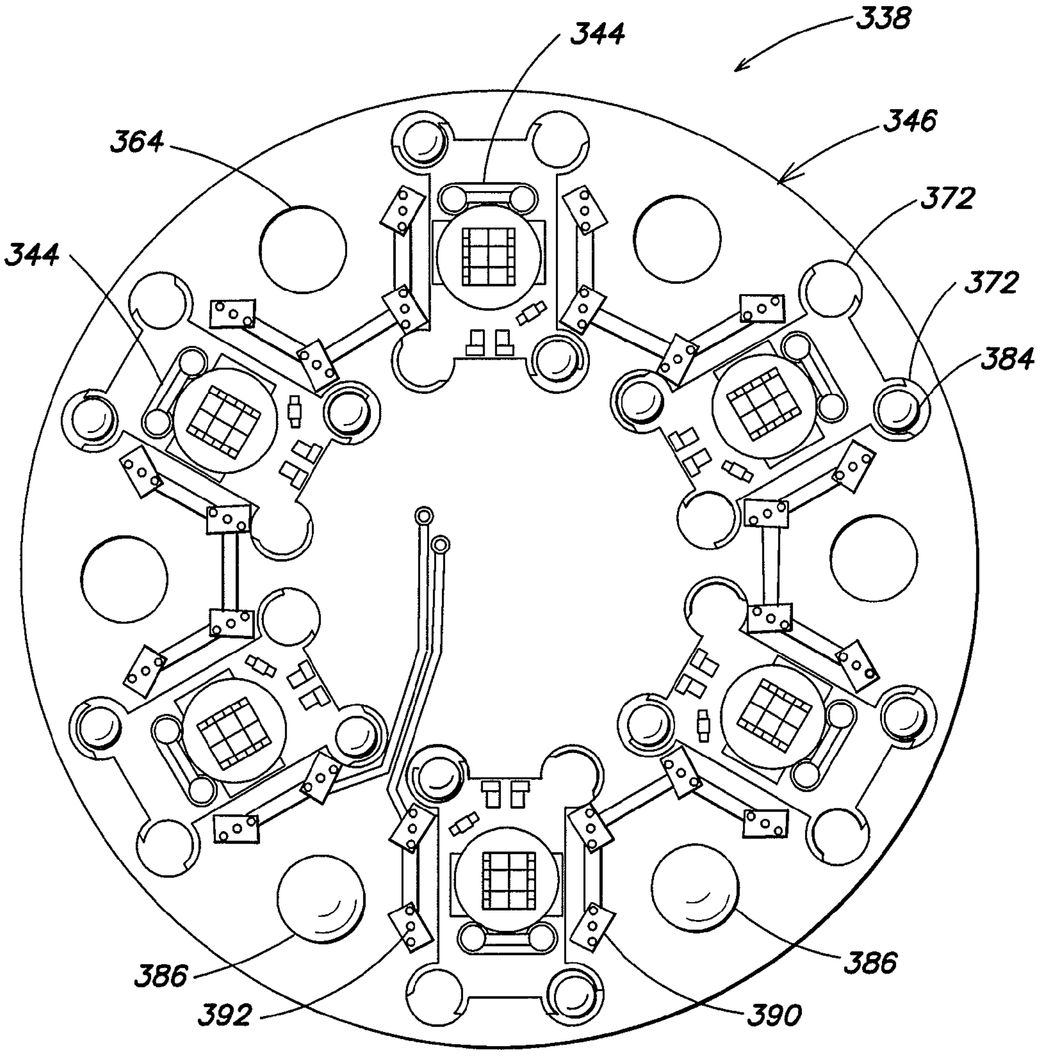
FIG. 14 illustrates the addition of a printed circuit board to the LED subassemblies of FIG. 13.

More specifically, FIG. 13 illustrates multiple LED hex subassemblies 344 positioned on the small pegs 384 of the jig 380 shown in FIG. 12 so as to hold the subassemblies flat and in appropriate positions. Once in position, solder paste may be applied to electrical contact pads 388 on the top side of the subassemblies. As shown in FIG. 14, the printed circuit board 346 is then positioned on the jig 380, over the subassemblies 344, using the large pegs 386 which pass through the large through-holes 364 in the printed circuit board 346. The printed circuit board also includes the smaller through-holes 372 to accommodate the small pegs 384.

A side of the printed circuit board 346 adjacent to the hex subassemblies (i.e., the side opposite to that in view in FIG. 14) includes first electrical contacts (e.g., copper pads—not shown), in complementary positions to the contact pads 388 on the hex subassemblies 344, which provide both mechanical attachment points and electrical connections to the hex subassemblies. In one implementation, these first electrical contacts have counterpart second electrical contacts 390 that appear on the opposite side of the printed circuit board 346 (the side in the view of FIG. 14) and the contact pairs on opposing sides of the printed circuit board may be connected via plated through-holes 392 in the middle of the contacts. Accordingly, once in position on the jig, with the solder paste sandwiched between the contact pads 388 of the hex subassemblies 344 and the first electrical contacts of the printed circuit board, heat may be applied to the second electrical contacts 390 (e.g., via a hot bar or soldering iron tip), thereby causing the solder paste to melt and form electrical and mechanical bonds between the hex subassemblies and the printed circuit board. The plated through-holes 392 facilitate heat transfer through the contacts and also allow visual inspection of the solder bond.

In one implementation, the printed circuit board 346 may be made of conventional FR-4 (Flame Resistant 4) material, which is commonly used for making printed circuit boards and is a composite of a resin epoxy reinforced with a woven fiberglass mat. In one aspect, a printed circuit board 346 made of FR-4 may be fabricated as a relatively thin substrate to facilitate effective thermal transfer from the front (or top surface) of the hex subassemblies. Thus, when the LED assembly 338 is coupled to the die-cast chassis 336, the metal of the chassis further facilitates thermal transfer from the front (or light-exit face) of the light-generating module.

In another implementation, the printed circuit board may be made of a flexible circuit board material. Flexible circuit boards are used in some common conventional applications where flexibility, space savings, or production constraints limit the serviceability of rigid circuit boards or hand wiring. In addition to cameras, a common application of flexible circuits is in computer keyboard manufacturing; most keyboards made today use flexible circuits for the switch matrix. In one example, a flexible circuit board may be implemented as an appreciably thin substrate (e.g., on the order of a few micrometers) using thin flexible plastic or other insulating material and metal foil for conductors.

One example of a suitable flexible insulating material for flexible circuit boards is Kapton®, which is a polyimide film developed by DuPont® that can remain stable in a wide range of temperatures, from −269° C. to +400° C. (−452° F. to 752° F.). In implementations of LED assemblies using flexible circuit boards, windows may be cut into the insulating material on both the top and the bottom of the circuit board to expose contact pad areas in the conducting metal foil layer. Holes may be formed in the middle of these areas to facilitate the soldering process, as discussed above. In one aspect of implementations using flexible circuit boards, a non-planar LED assembly may be fabricated and appropriately mounted to a chassis to allow customized or predetermined patterns and directions of light emission from the LEDs of the hex subassemblies.

In implementations employing a flexible circuit board, an aluminum base plate serving as an alternative to the base plate 340 may be equipped with pegs similar to those illustrated in FIG. 12, such that the LED hex subassemblies first are mounted in appropriate positions on the rigid base plate. The pegs in the base plate then would also serve to facilitate registration of the flexible circuit board, which may be placed on top of the hex subassemblies and bonded to the subassemblies in a manner similar to that described above.

Figure 15:
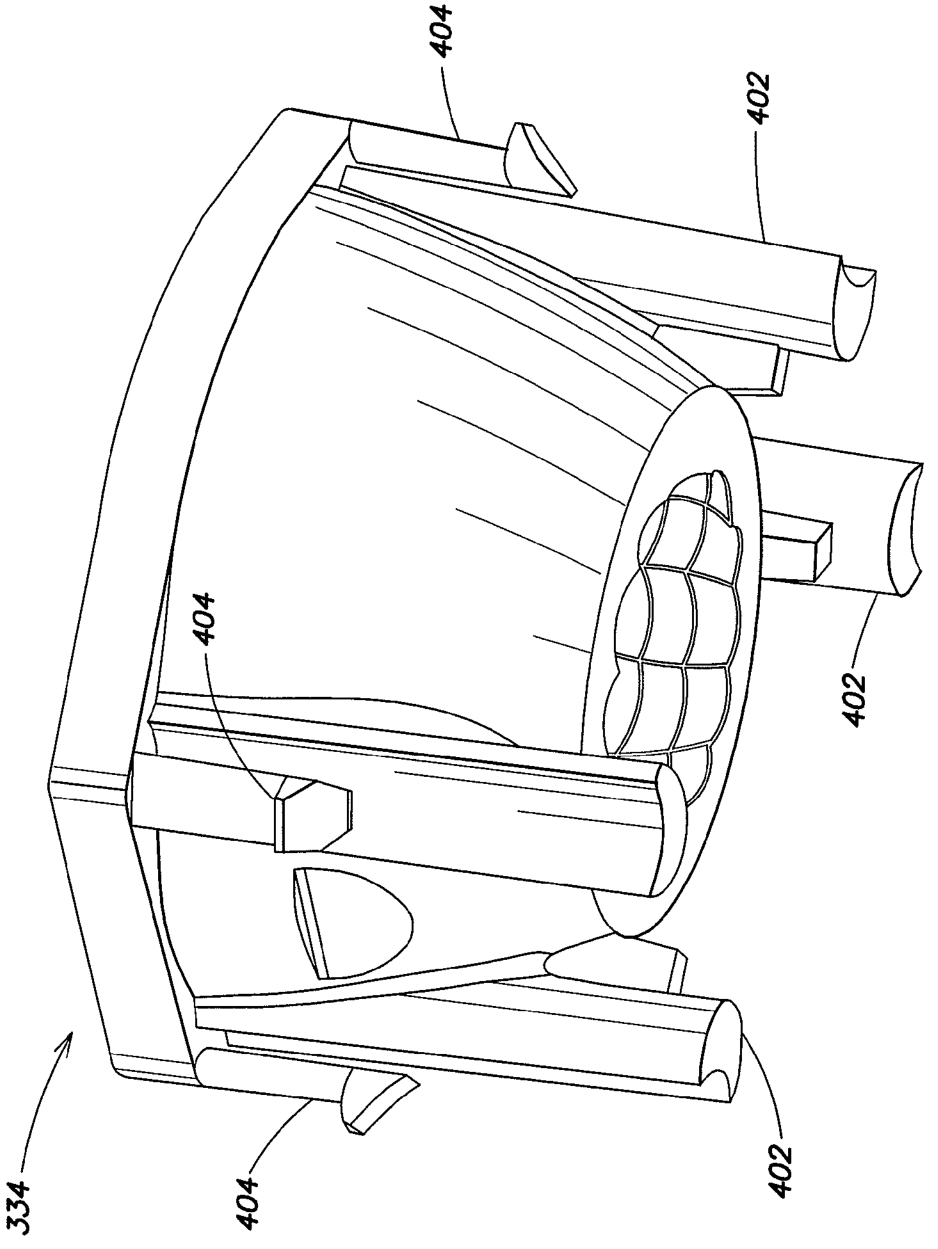
FIG. 15 is a perspective view of a secondary optic component according to one embodiment of the disclosure.

FIG. 15 shows a close-up view of the secondary optic component 334 of the light-generating module 300 shown in FIG. 9. Each secondary optic component is configured with four posts 402 which engage with four corresponding small through-holes 372 of the printed circuit board to facilitate registration of the secondary optic over the primary optic of an associated LED hex subassembly 344. Each secondary optic 334 also may include one or more clips 404 to facilitate engagement of the secondary optic with one of the secondary optic receiving portions of the chassis 336. More specifically, with reference to FIGS. 9, 25 and 26, each secondary optic fits into a corresponding secondary optic receiving portion or chamber 502 of the chassis 336, and the one or more clips 404 engage with a portion of a bottom surface 504 of the chassis 336. The posts 402 of the secondary optic pass through the secondary optic receiving portion or chamber of the chassis, and engage with the small through-holes 372 and the perimeter semi-circle cut outs 374 of an associated LED hex subassembly (e.g., see FIGS. 10 and 11) to ensure that the secondary optic is appropriately aligned with the primary optic of its associated LED hex subassembly. In various aspects, the secondary optic may be configured with baffled, curved, and/or reflective surfaces to facilitate generation of a variety of beam profiles (e.g., narrow beam, medium beam) for the light radiated by the LED hex subassemblies.

Figure 16:
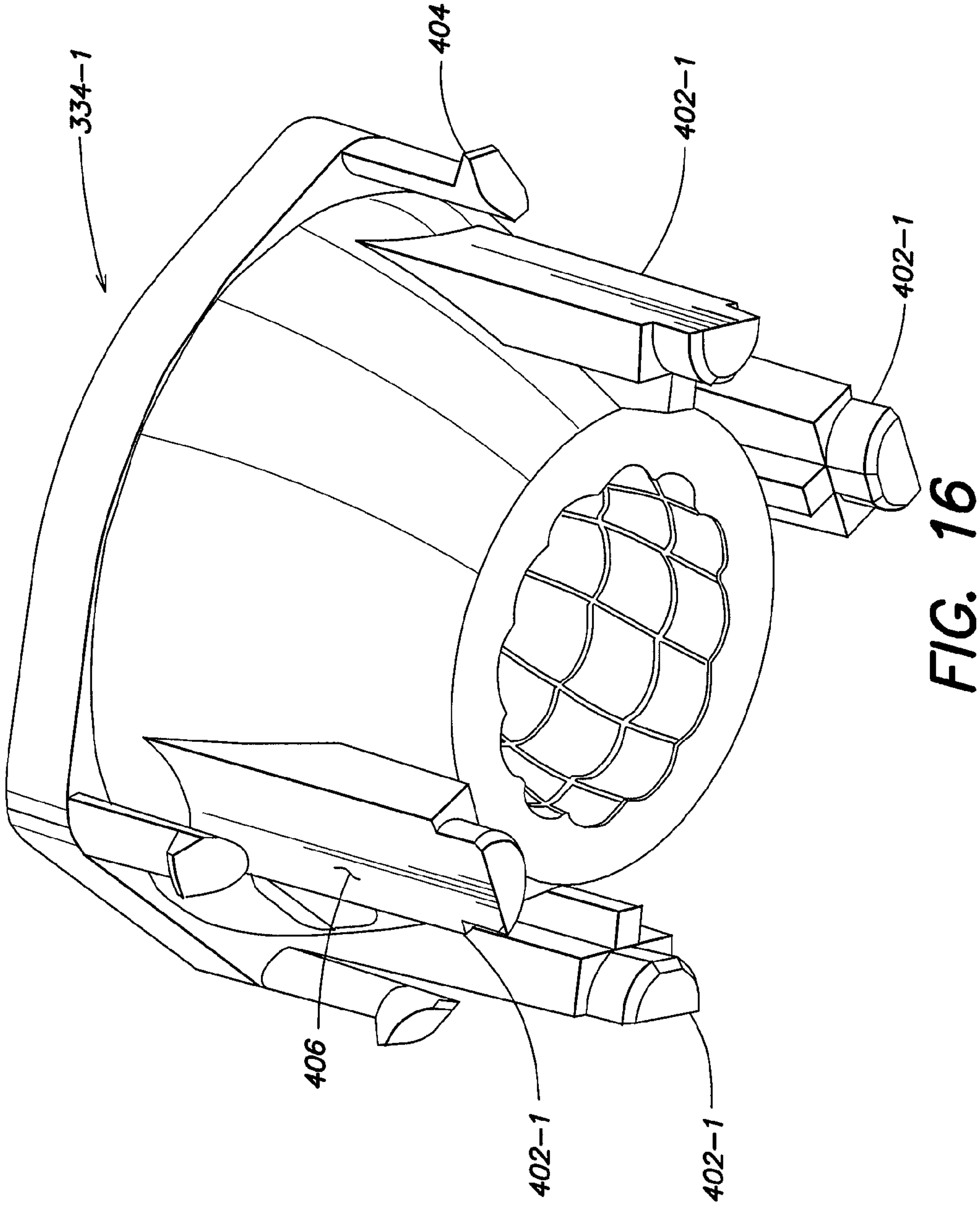
FIG. 16 is a perspective view of a secondary optic component according to another embodiment of the disclosure.
Figure 17:
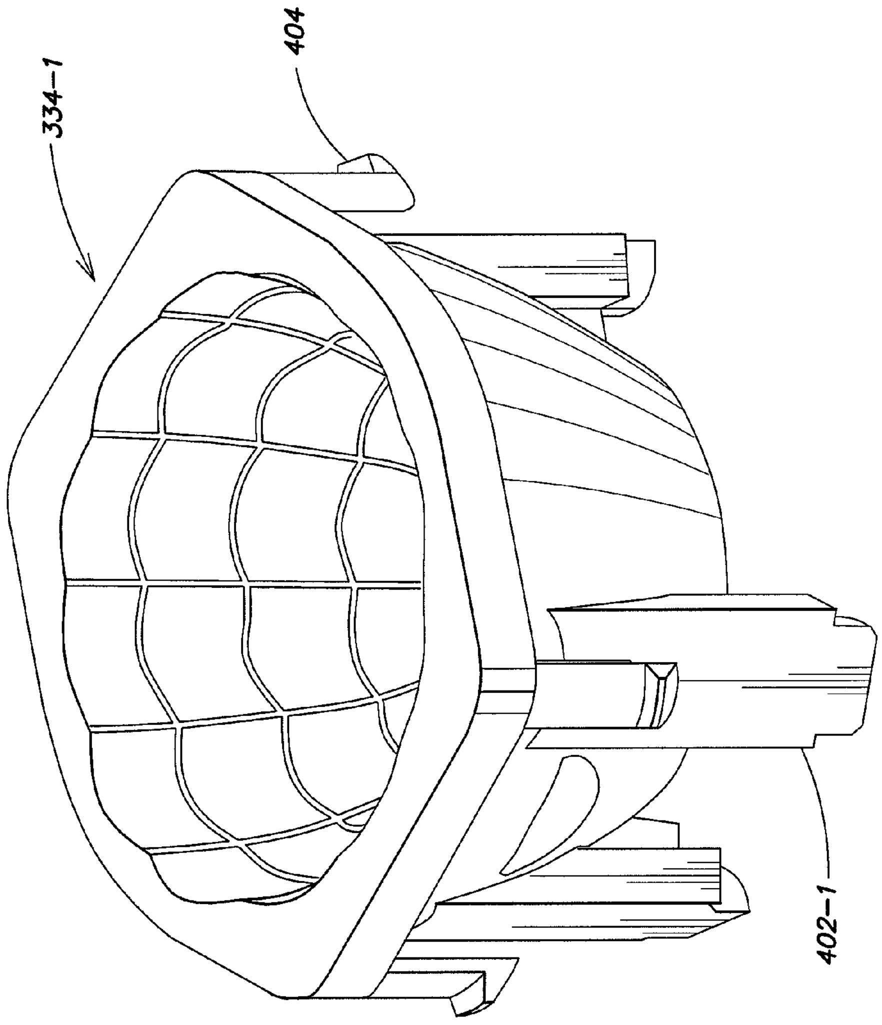
FIG. 17 is a perspective view of the secondary optic component of FIG. 16.

A slightly different embodiment of a secondary optic component 334-1 is illustrated in FIGS. 16 and 17. In this embodiment, four posts 402-1 include a flat outwardly-facing surface 406 rather than a curved outwardly surface as shown in the embodiment of FIG. 15.

Figure 18:
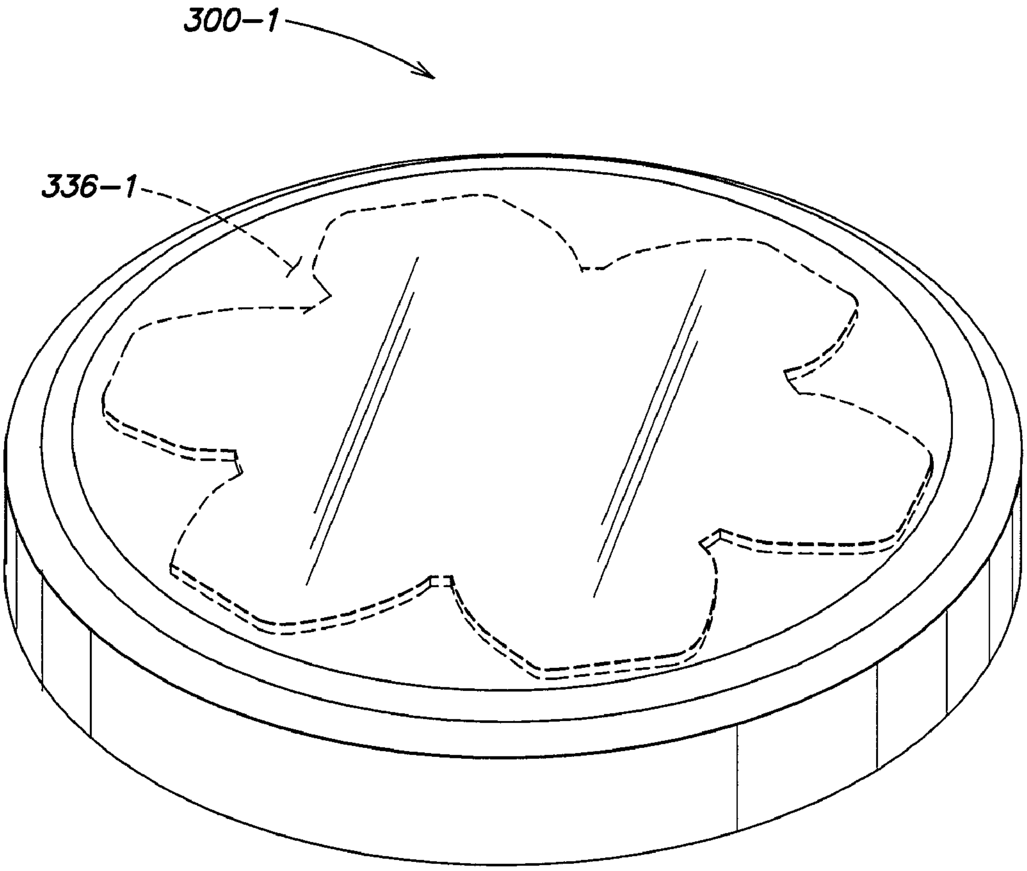
FIG. 18 is a perspective front view of a light-generating module showing ornamental features of the module, according to one embodiment of the disclosure.
Figure 19:
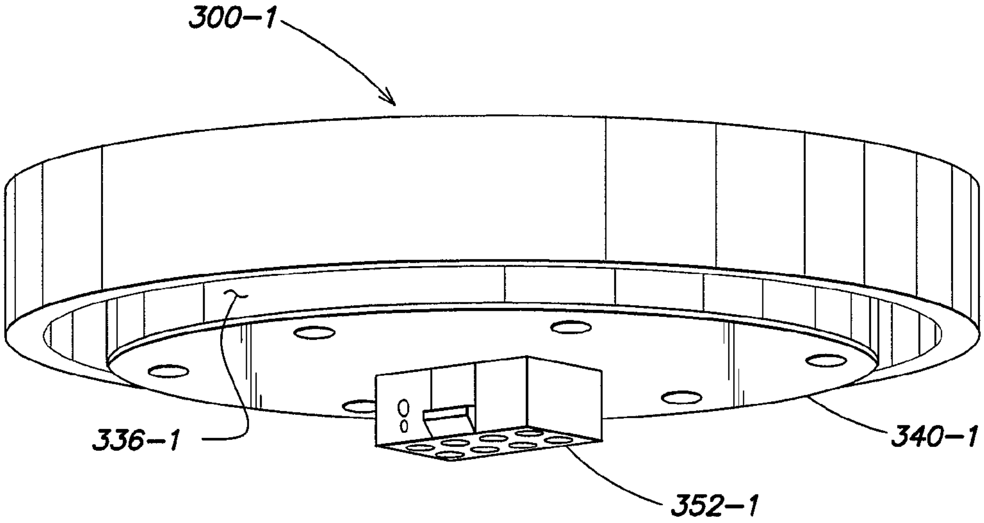
FIG. 19 is a perspective rear view of a light-generating module according to one embodiment of the disclosure.
Figure 20:
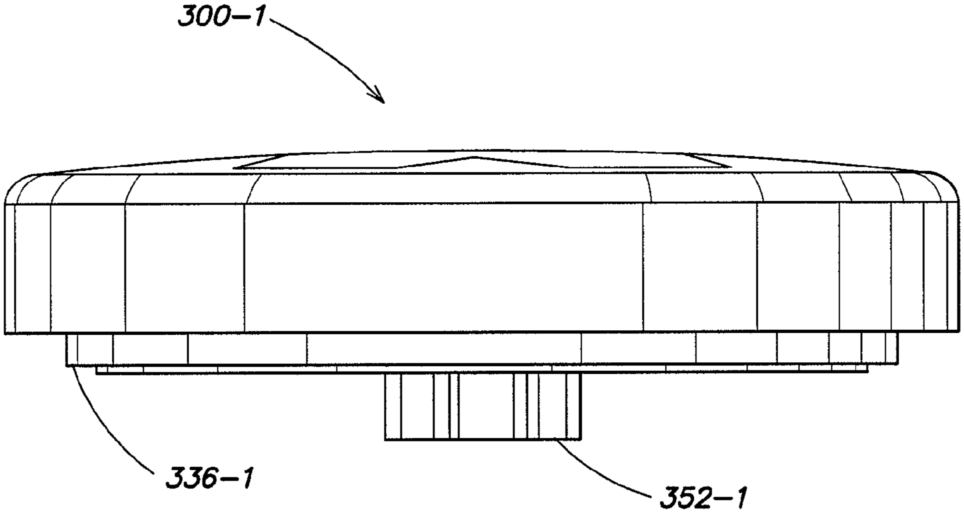
FIG. 20 is a side view of a light-generating module according to one embodiment of the disclosure.
Figure 21:
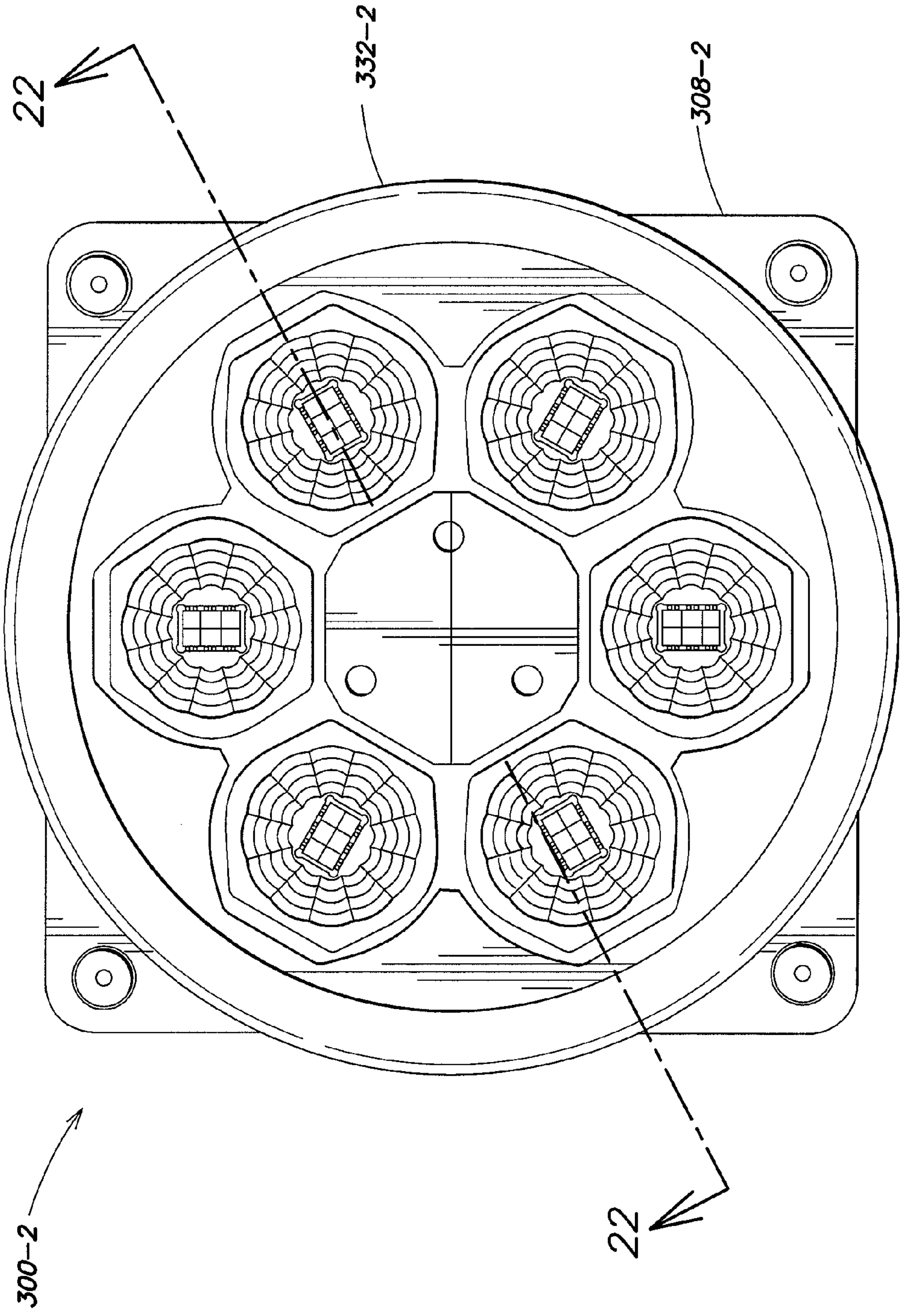
FIG. 21 is a top view of a light-generating module according to one embodiment of the disclosure.
Figure 22:
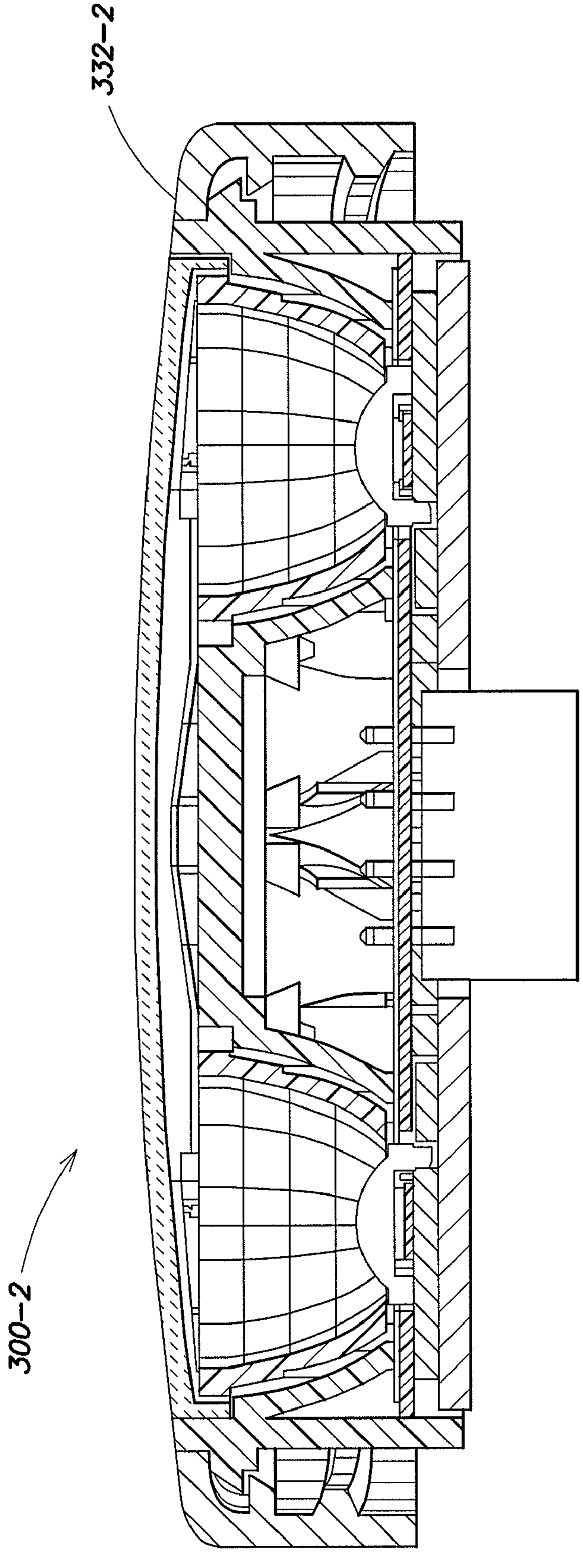
FIG. 22 is a cross-sectional view taken along line 22-22 of FIG. 21.
Figure 23:
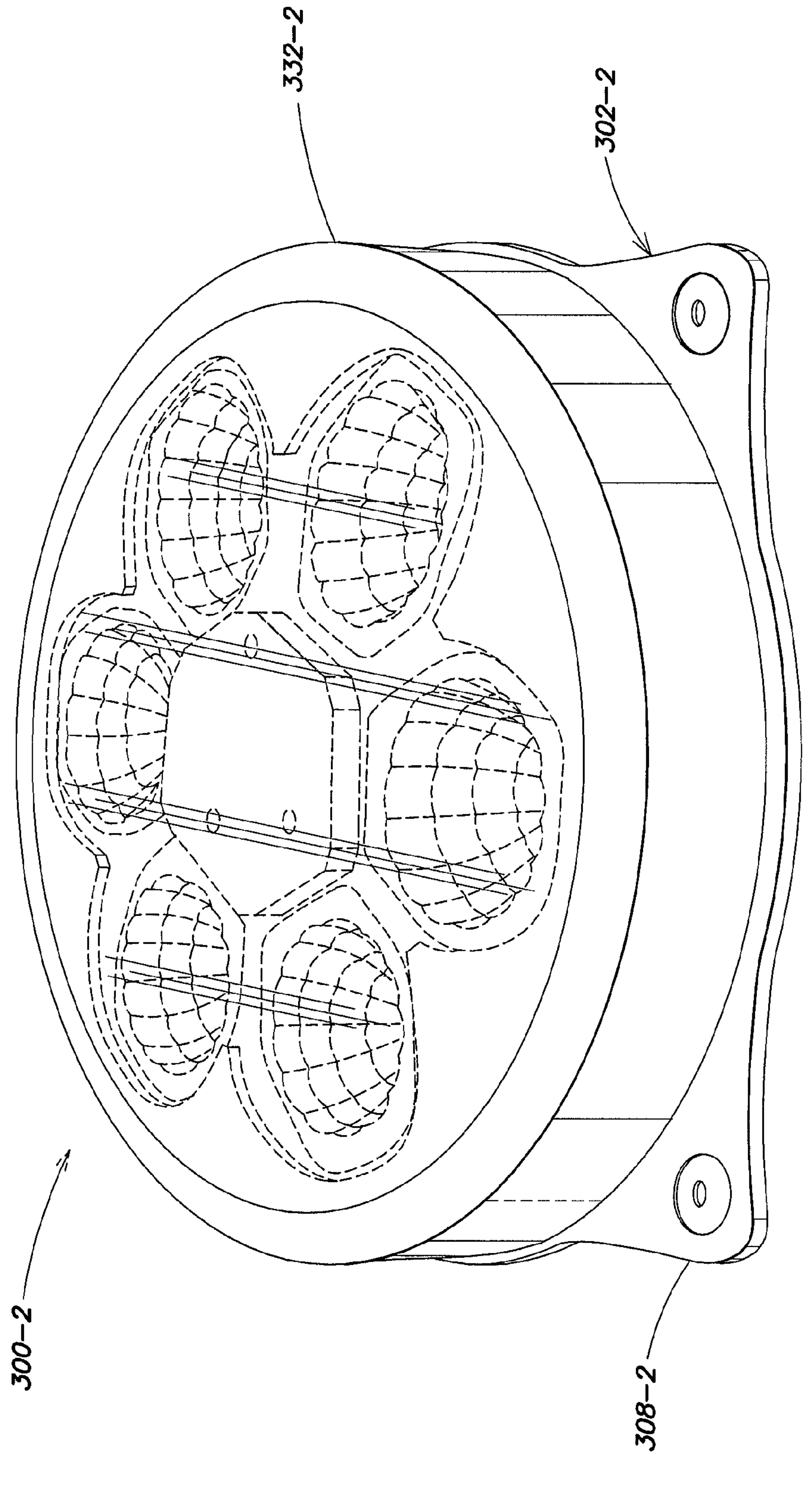
FIG. 23 is a perspective view of the light-generating module of FIG. 21.
Figure 24:
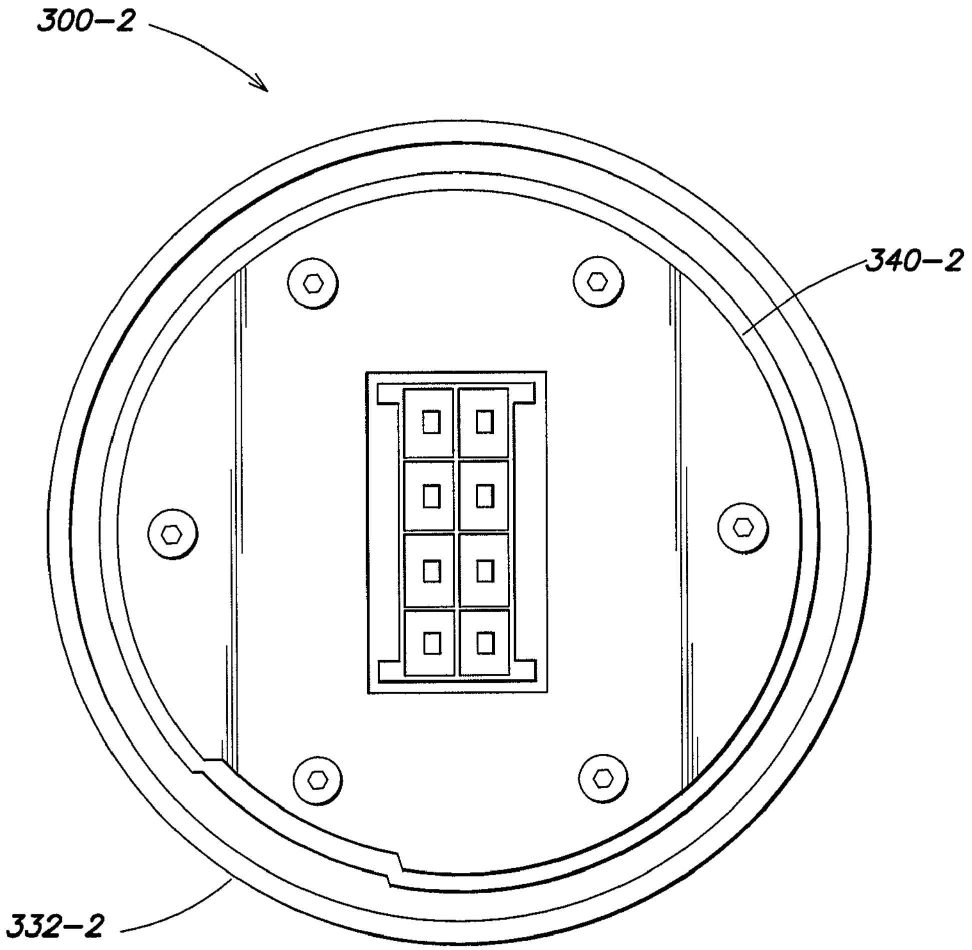
FIG. 24 is a rear view of the light-generating module of FIG. 21.

FIGS. 18 and 19 are perspective views showing the ornamental design of one embodiment of a round puck-shaped light-generating module 300-1 including a chassis 336-1, a base plate 340-1 and a connector 352-1. FIG. 20 is a side view of the light-generating module 300-1 of FIGS. 18 and 19. FIG. 21 is a top view showing the ornamental design of another embodiment of a round light-generating module 300-2 coupled to a socket 302-2 via a grip ring 332-2, wherein the flanges 308-2 of the socket are visible, and FIG. 22 shows a cross-sectional view of the light-generating module and grip ring taken along line 22-22 of FIG. 21. FIG. 23 is a top perspective view of the light-generating module 300-2, grip ring 332-2, and socket 302-2 of FIG. 21. FIG. 24 is a bottom view of the light-generating module 300-2 and grip ring 332-2 of FIG. 21.

In one exemplary implementation of the module, grip ring and socket combination illustrated in FIGS. 22-24, the socket and grip ring essentially form two mating collars, wherein at least one exterior feature of the socket and at least one interior feature of the grip ring include complementary threads to facilitate a screw-type interlocking mechanical connection as the grip ring is placed on and rotated relative to the socket. Accordingly, when the light-generating module is installed in the socket, the grip ring is configured to fit over at least a portion of a perimeter of the light-generating module and hold the light-generating module in the socket via the screw-type (rotating) interlocking mechanical connection.

Figure 25:
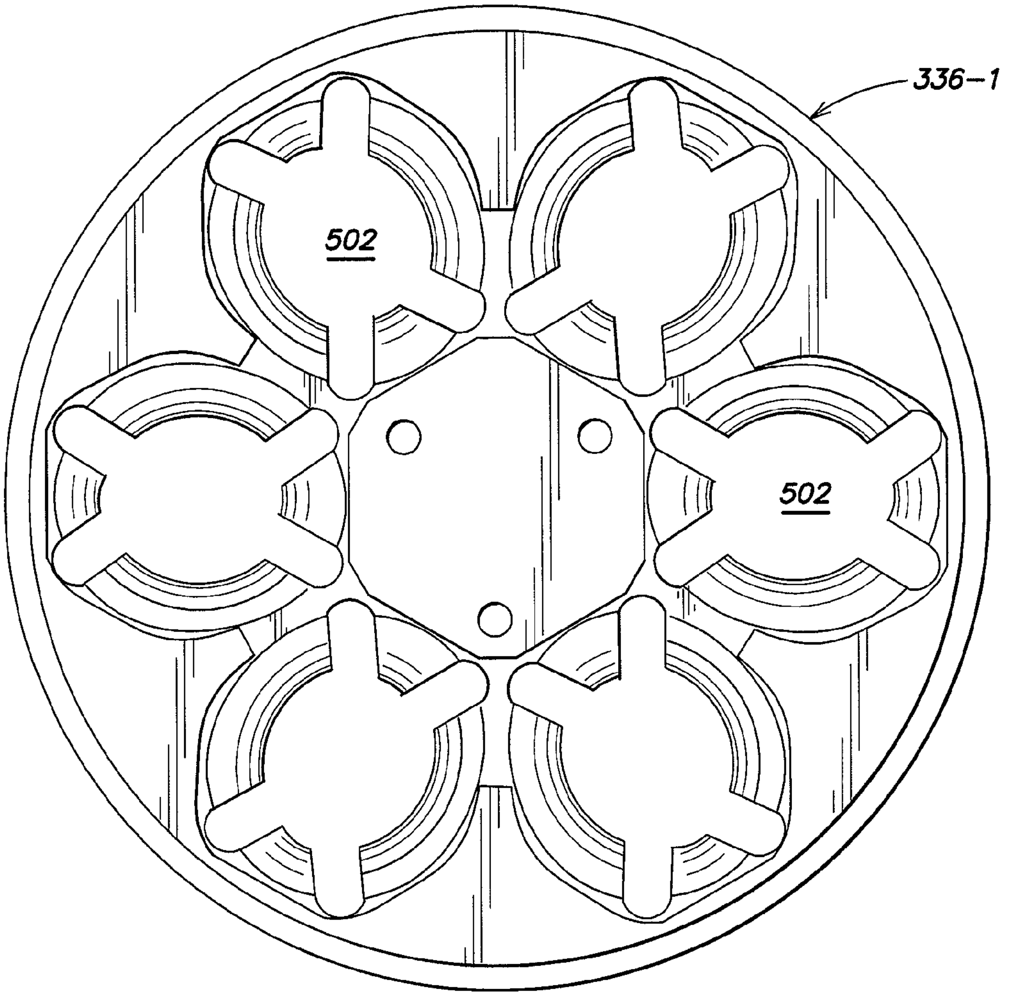
FIG. 25 is a front view of a chassis of the light-generating module of FIG. 9, according to one embodiment of the disclosure.
Figure 26:
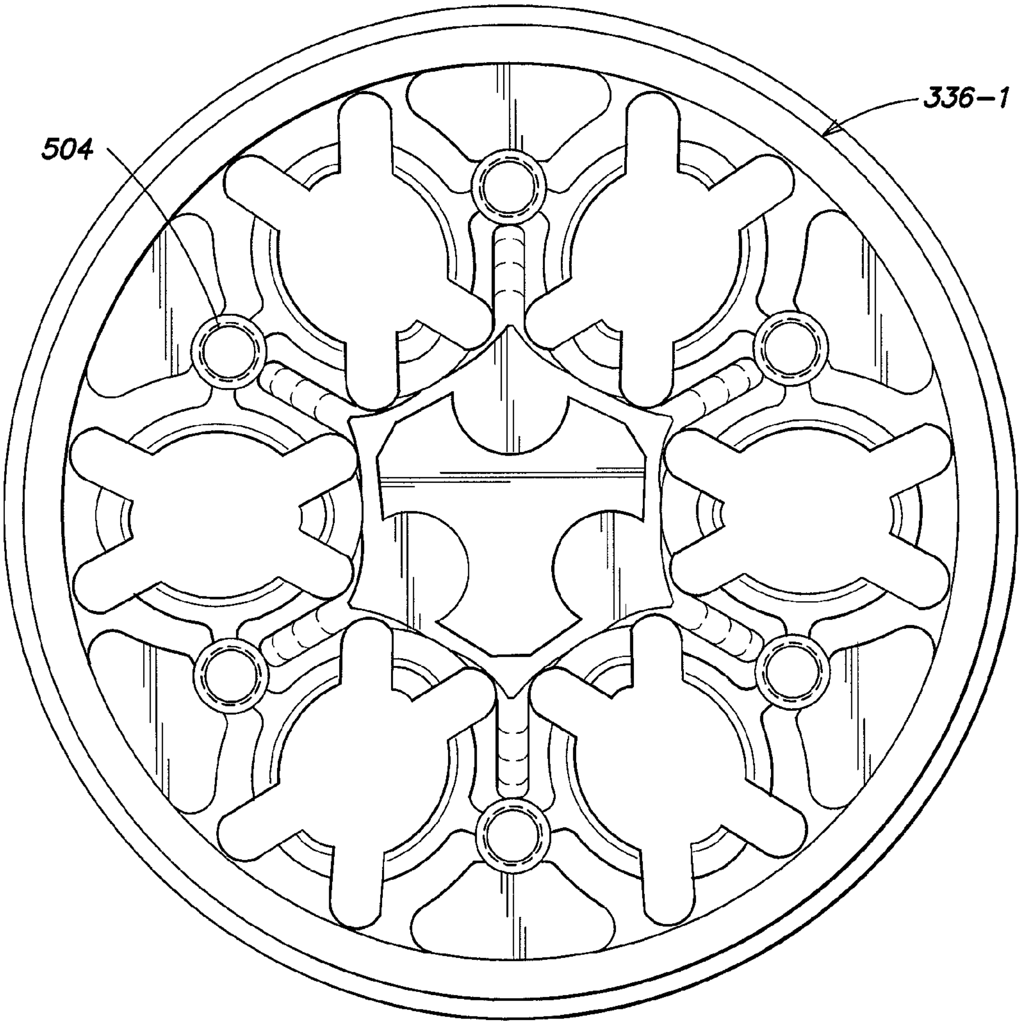
FIG. 26 is a rear view of the chassis of FIG. 25.

FIG. 25 is a top view of the ornamental design of one embodiment of a chassis 336-1 including multiple chambers 502. FIG. 26 is a bottom perspective view of the chassis 336-1 of FIG. 25, illustrating multiple threaded bores 504 formed in the body of the chassis for receiving screws that may be used to coupled the base plate and the LED assembly to the chassis.

Figure 27:
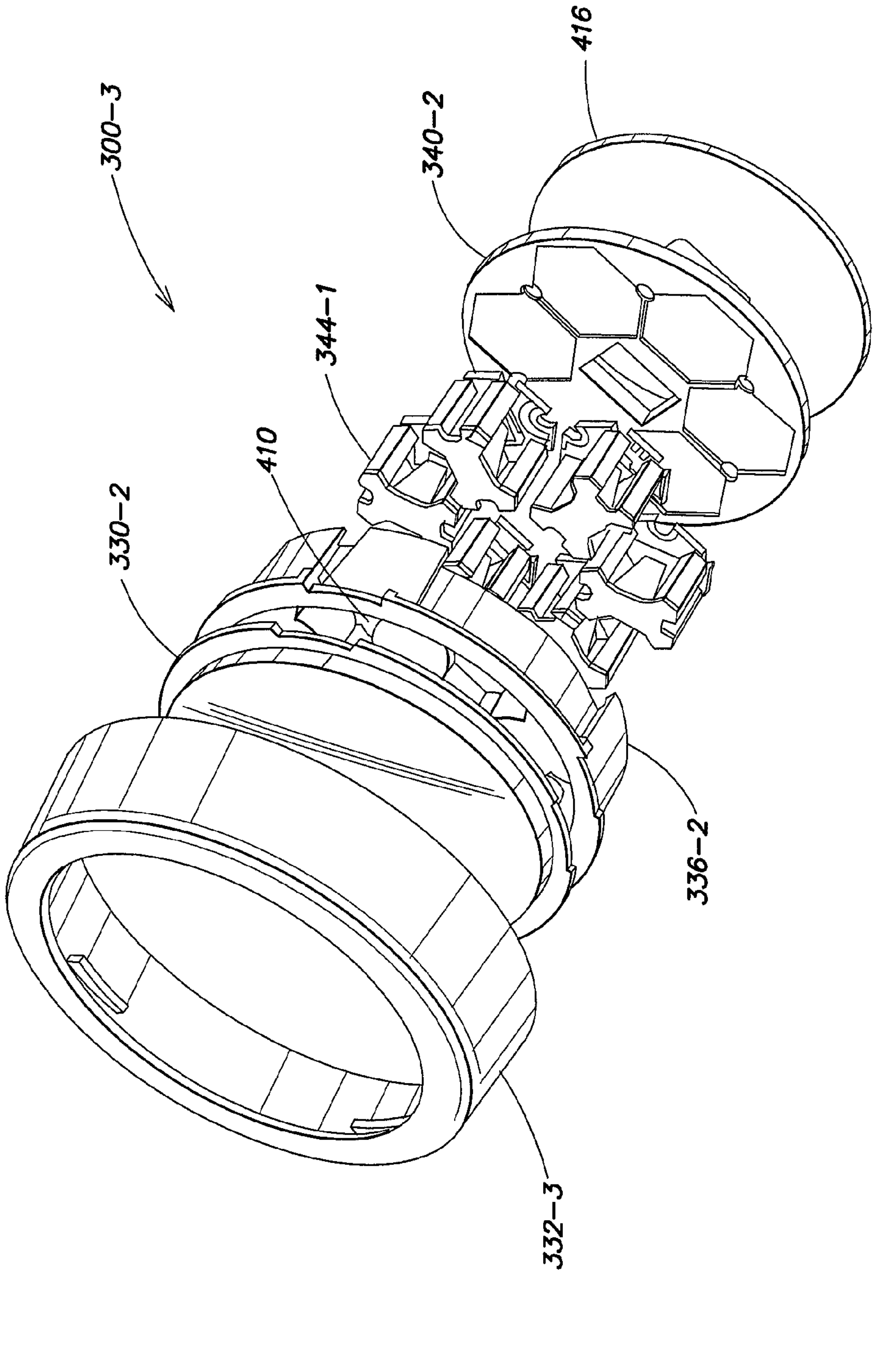
FIG. 27 is an exploded view of a light-generating module according to an alternative embodiment of the disclosure.
Figure 28:
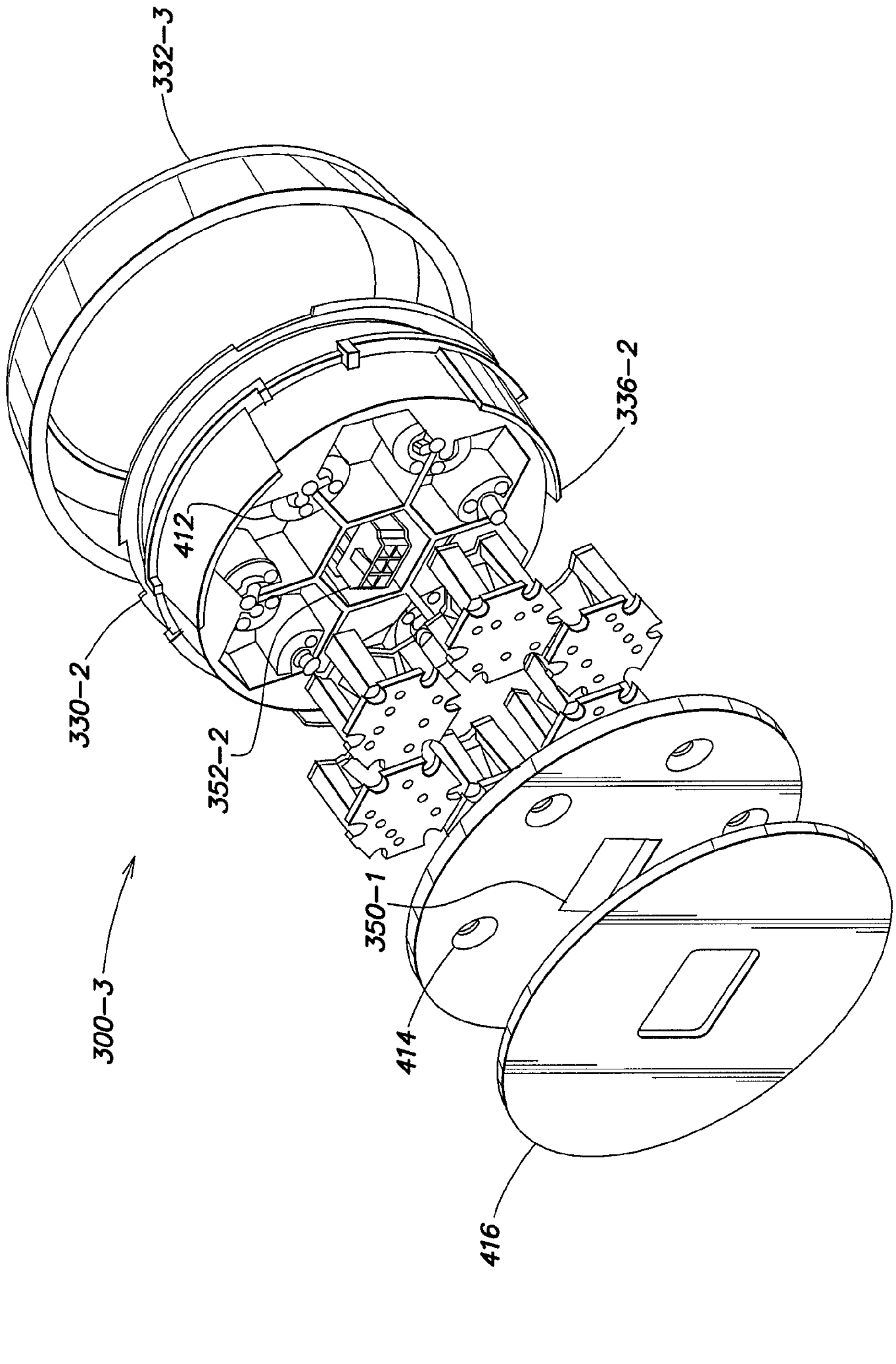
FIG. 28 is another exploded view of the light-generating module of FIG. 27.

FIGS. 27 and 28 illustrate two different exploded perspective views of a light-generating module 300-3 and grip ring 332-3 according to an alternative embodiment of the disclosure.

In the embodiment of FIGS. 27 and 28, unlike the embodiment discussed above in connection with FIG. 9, an LED assembly 338-1 including a number of LED hex subassemblies 344-1 is not arranged to be sandwiched between a thermally conductive base plate and a printed circuit board substrate, but instead is configured to be inserted into a chassis 336-2.

Figure 29:
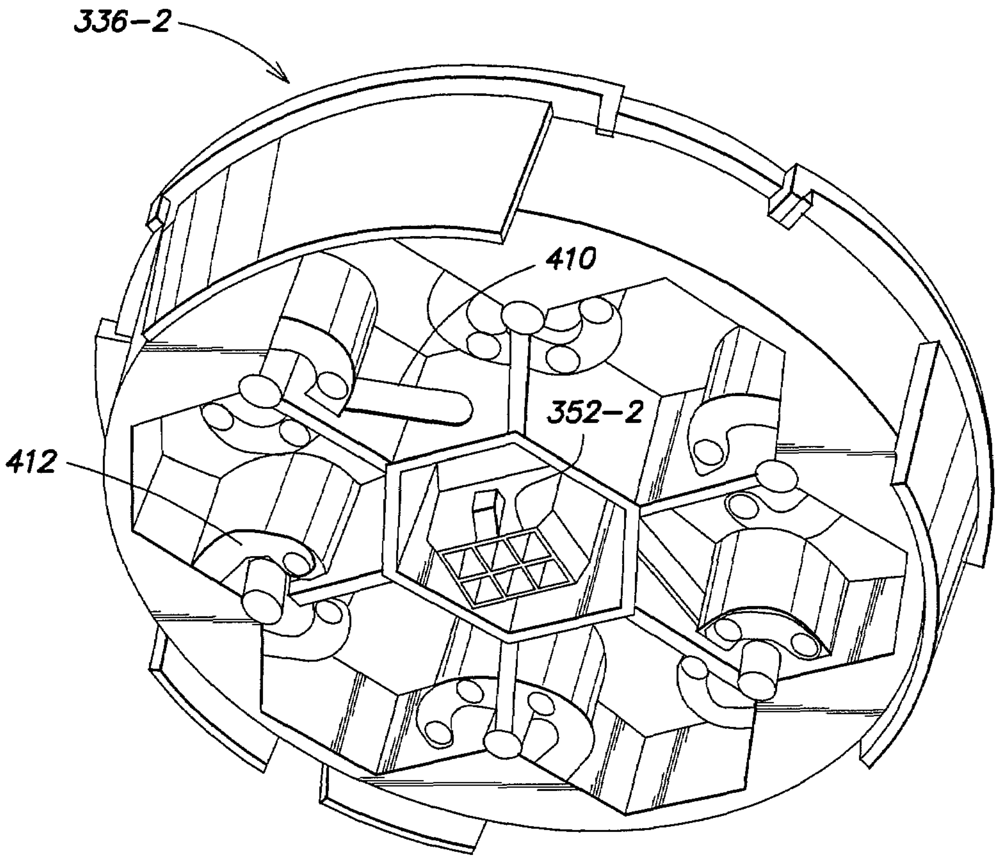
FIG. 29 is a perspective rear view of a chassis of the light-generating module of FIGS. 27 and 28, including electrical contacts and connections according to one embodiment of the disclosure.
Figure 30:
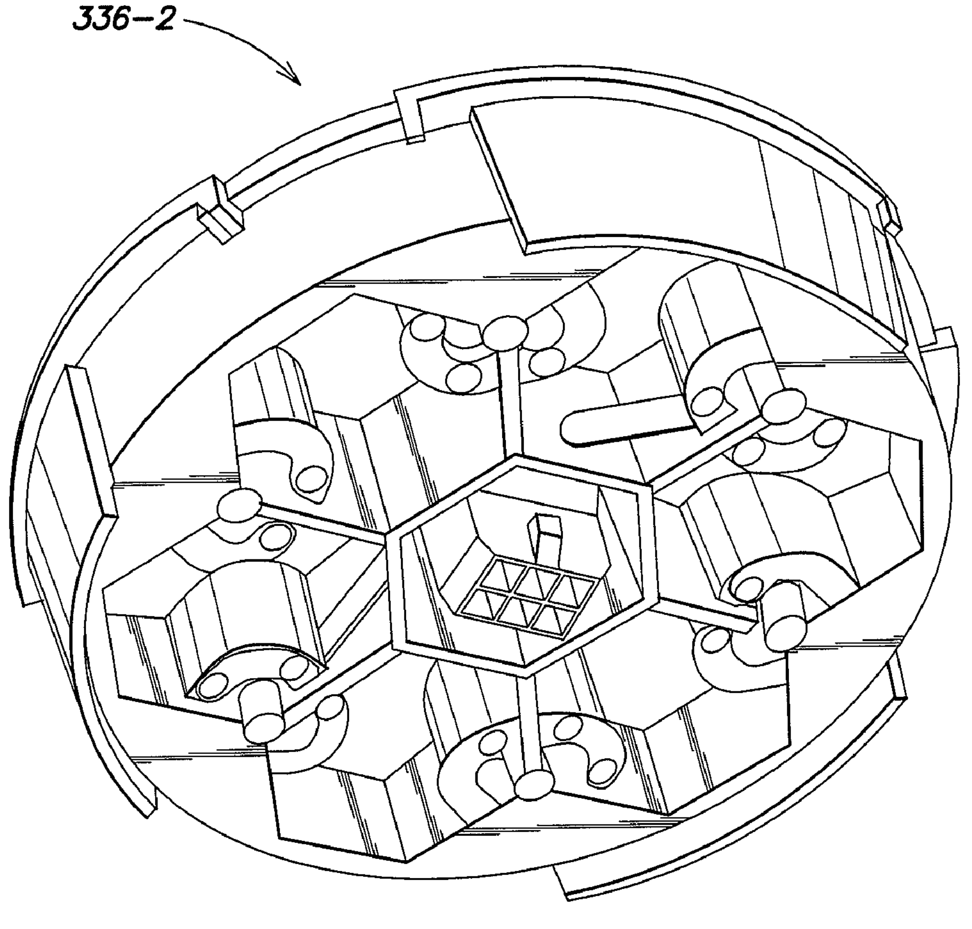
FIG. 30 is a perspective front view of the chassis of FIG. 29.
Figure 31:
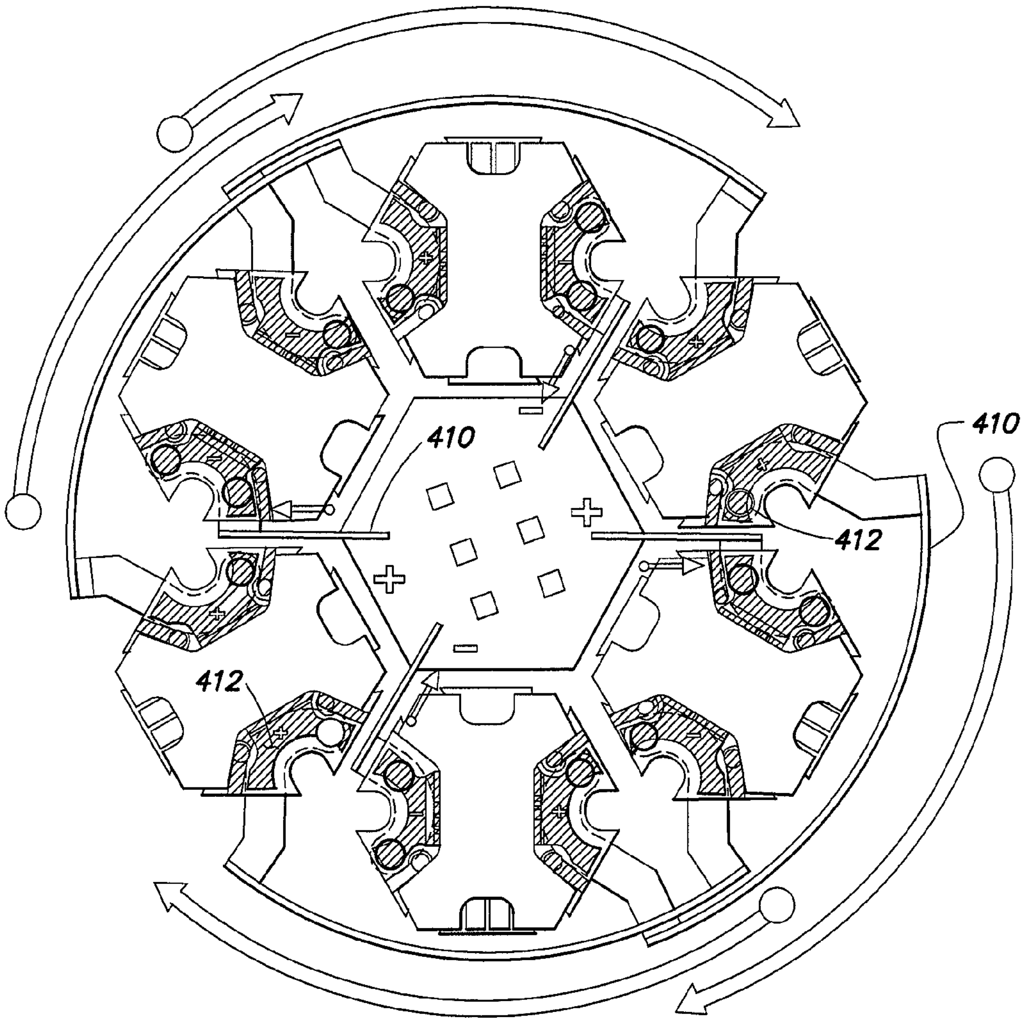
FIG. 31 is a top view of electrical connections present in the chassis of FIGS. 29 and 30 according to one embodiment of the disclosure.

FIGS. 29 and 30 illustrate various views of the chassis 336-2 including six complementary receiving portions or chambers to accommodate six LED hex subassemblies 344-1. In one aspect of this embodiment, the chassis 336-2 may be an injected molded component made of plastic. Additionally, the chassis 336-2 may be configured to include a number of electrical connectors 410 and contacts 412 integral with the body of the chassis 336-2 so as to provide operating power to each of the LED hex subassemblies 344-1 from a main connector assembly 352-2 disposed in a center channel of the chassis 336-2. One particular layout of the electrical contacts 412 and connectors 410 is shown in a top view in FIG. 31.

In various aspects, the electrical contacts or connectors of the chassis 336-2 may include: components which are insert-molded into the chassis; stamped pieces which may be pressed into the chassis during assembly; a flex printed circuit board (flex PCB); or conductive ink screened onto the molded chassis. The LED hex subassemblies 344-1 may be assembled into the chassis 336-2 by pressing to ensure satisfactory electrical contact with the contacts or connectors of the chassis. To facilitate satisfactory contact, the chassis may further include small fasteners or retention clips in the injection molded plastic.

With reference again to FIGS. 27 and 28, once the LED assembly 300-3 including the LED hex subassemblies 344-1 is assembled in the chassis 336-2, a stamped aluminum base plate 340-2 may be attached to the chassis 336-2 via screws passing though counter-sunk though-holes 414 in the base plate 340-2 (see FIG. 28) (the base plate material may also be copper, graphite or other suitable thermally conductive material). The base plate 340-2 also includes a center though-hole 350-1 for the connector assembly 352-2, although in some embodiments, the though-hole 350-1 may not be in the center of the base plate 340-2, and in some embodiments, no though-hole 350-1 is present. The base plate 340-2 may provide a thermal connection to a housing as described above with reference to FIG. 9. A gap pad 416 may comprise a thermal material that is optionally positioned adjacent to a bottom surface of the aluminum base plate 340-2 and adhered via a thermal paste or thermal grease. In general, a gap pad may be employed to closely mate two surfaces and eliminate voids that would exist if two bare surfaces were mated.

In various implementations, other alternative thermal materials may be employed, such as viscous paste or liquid metal sandwiched between the plate and a thin and slightly convex sheet. When the light-generating module is lockingly engaged with the socket, this convex sheet deforms under compression to flatness against the fixture housing (e.g., a heat sink—described below with reference to FIG. 43). Alternatively, a thin sheet of very soft metal, such as indium (Brinell hardness 0.9), that can deform under pressure, can replace the gap pad. In another aspect, the gap pad or other thermal material may be manufactured with wings or flaps that fold up through or around the base plate and were pinched/captured when the base plate is fastened to the chassis.

As discussed above, various components and/or subassemblies of the light-generating module 300 may be configured to conduct heat away from the light-generating module 300. In some embodiments, the chassis 336 may be die-cast in metal, or formed with another suitable thermally conducting material, such that heat may be transmitted from the LED assembly 338 to the face plate 330 and/or the grip ring 332. The electrically insulating and thermally conducting layer 348 discussed above may be interposed between the LED assembly 338 and the chassis 336 as part of facilitating thermal dissipation. In this manner, thermal dissipation may be facilitated from the front face and/or the sides of the light-generating module 300.

Thermal dissipation also may be facilitated from the rear side of the light-generating module 300 in some embodiments. For example, a thermally conductive base plate 340 may be provided as a backing to the LED assembly 338 such that thermal dissipation is facilitated though the housing and/or socket to which the light-generating module 300 is attached.

As illustrated in FIGS. 32-39, in some embodiments, a light-generating module may include one or more active thermal dissipation components such as a fan, and/or may include passive thermal dissipation features such as fins or air circulation paths or channels. Such embodiments may be useful with certain LED assemblies and light-generating modules in that the use of thermal dissipation components may allow the light-generating module to be a stand-alone unit in terms of thermal dissipation. That is, thermal coupling to a housing or other fixture may not be required for suitable thermal dissipation. In this manner, flexibility may be achieved in terms of associating the light-generating module with various lighting fixtures and systems.

Figure 32:
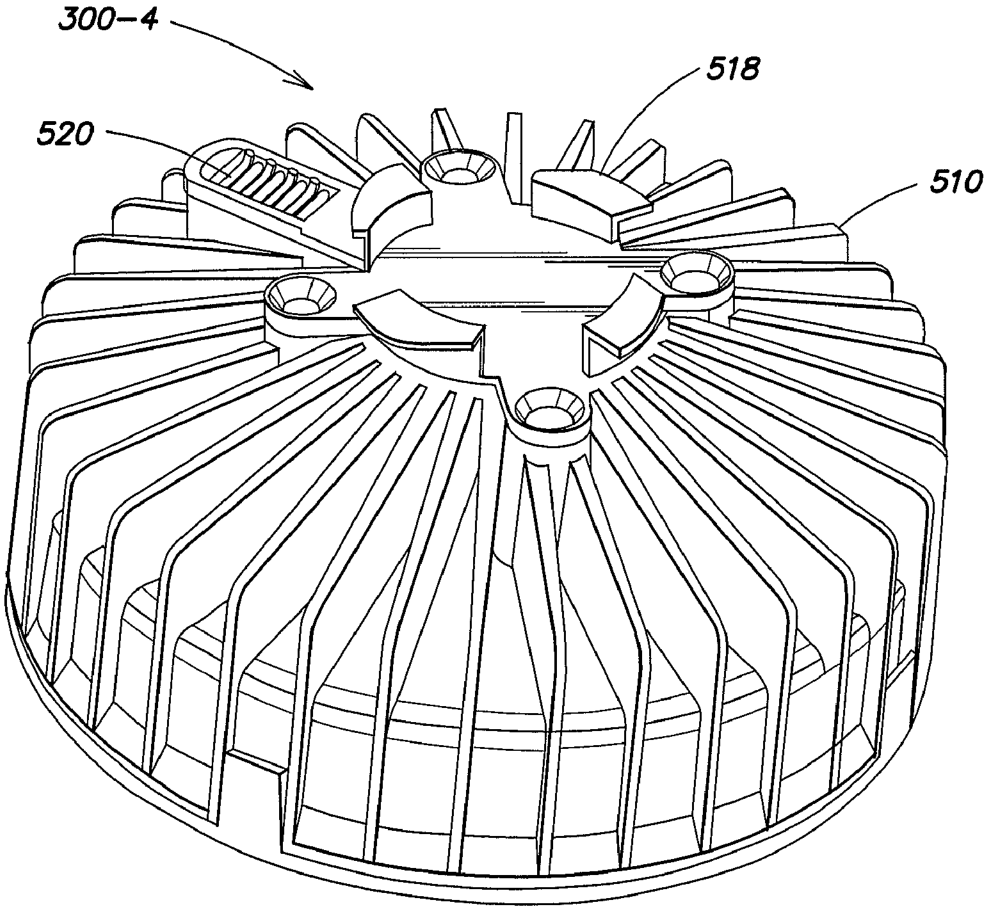
FIG. 32 is a perspective view of a light-generating module including a heat sink according to one embodiment of the disclosure.
Figure 33:
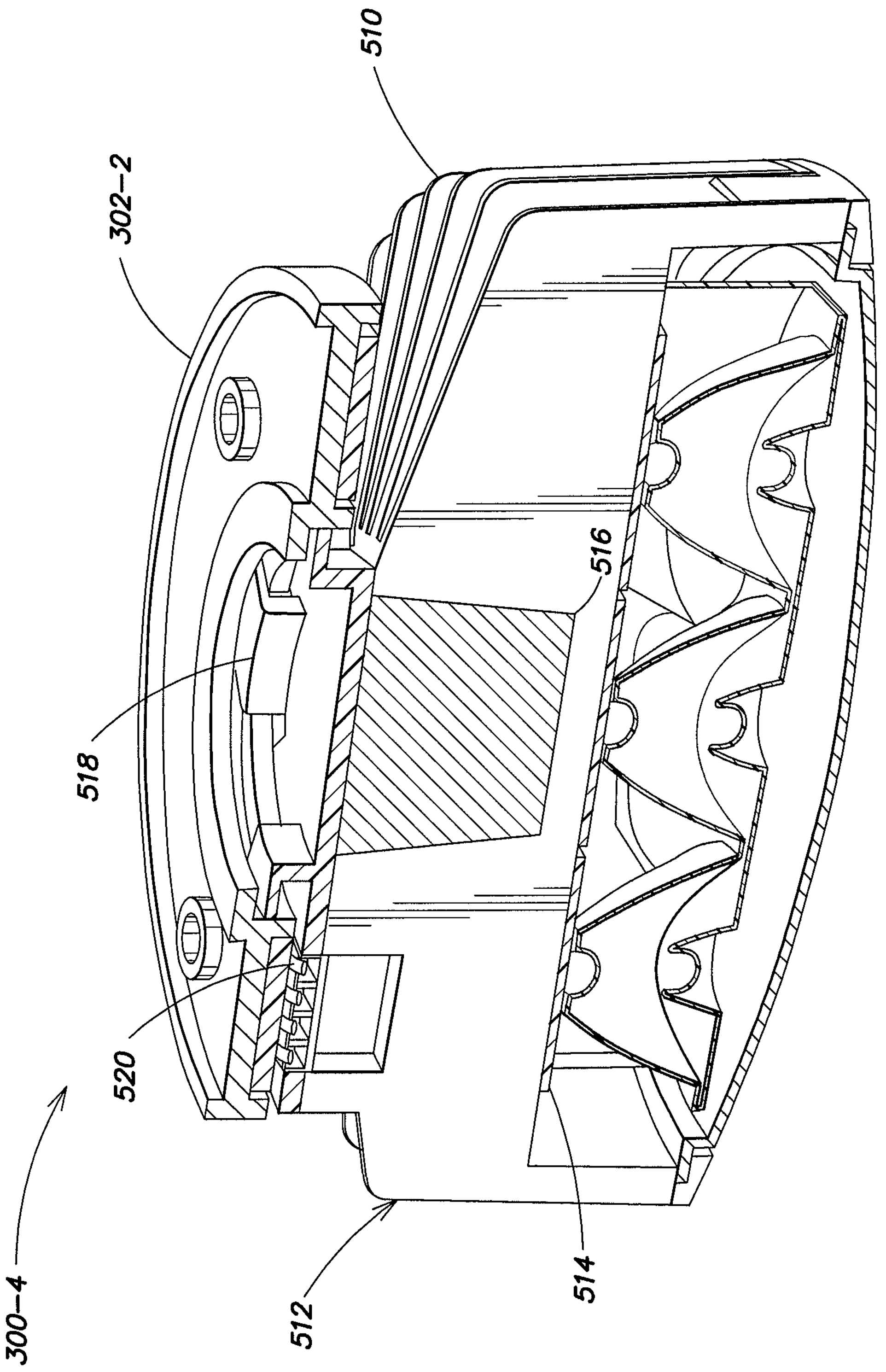
FIG. 33 is a cross-sectional view of the light-generating module of FIG. 32.

One embodiment of a light-generating module 300-4 employing thermal dissipation fins 510 is illustrated in FIGS. 32 and 33. In this embodiment, the fins 510 are integral to the light-generating module 300-4 in that the fins 510 are included as part of a die-cast metal light-generating module housing 512. An LED assembly 514 is thermally coupled to the die-cast housing 512 such that heat may be transferred to the thermal dissipation fins 510. The module housing 512 includes an insert molded copper core 516 and an injection molded flange 518 for mating engagement with a socket 302-2, as shown in FIG. 33. Even though the socket 302-2 in this embodiment is die-cast metal, the plastic flange 518 prevents any appreciable amount of heat from transferring to the socket 302-2 in this embodiment. In some embodiments, the socket 302-2 may be thermally conductive to facilitate heat transfer.

The module housing 512 includes leaf springs 520 for forming operating power and control connections with the socket 302-2 when the light-generating module 300-4 is engaged with the socket 302-2.

Figure 34:
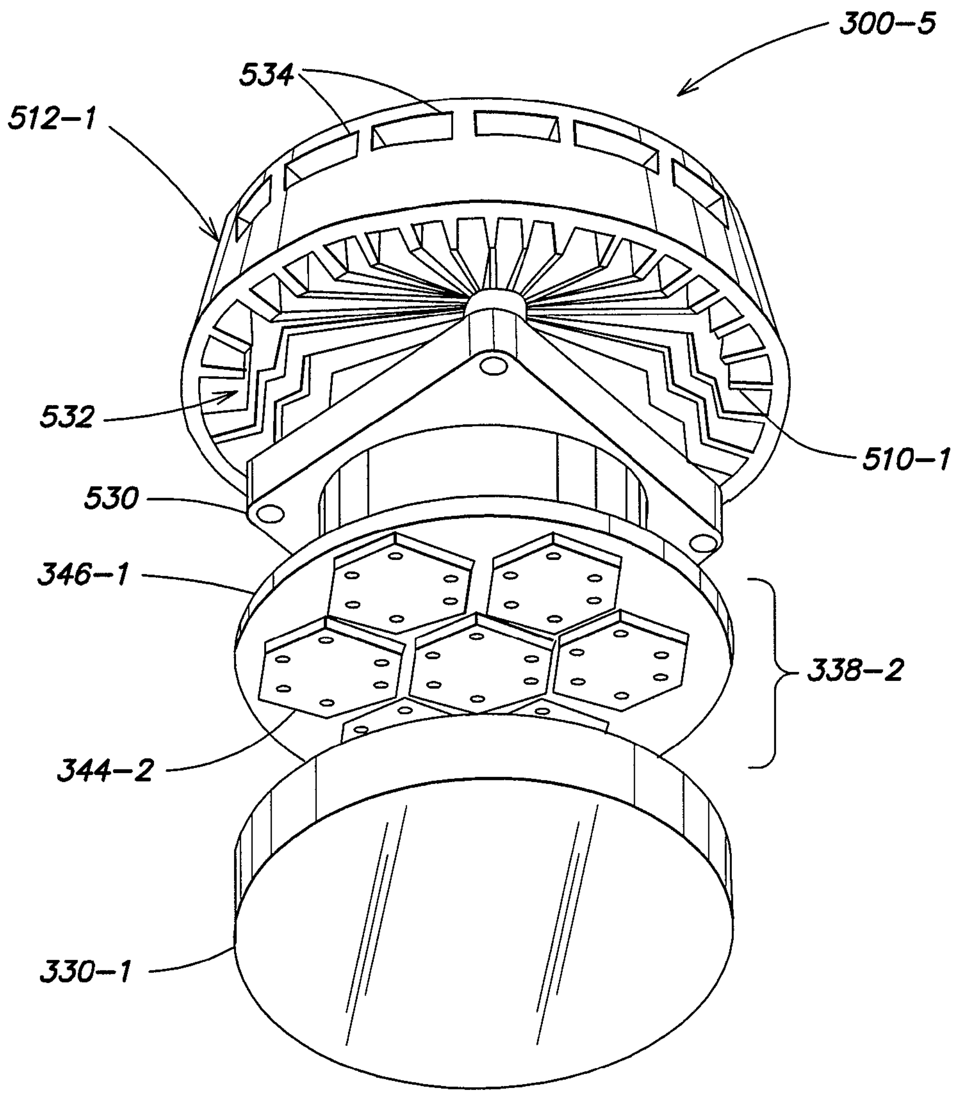
FIG. 34 is an exploded view of a light-generating module including a fan according to one embodiment of the disclosure.

One embodiment of a light-generating module 300-5 including a fan 530 is illustrated in FIG. 34. The fan 530 is disposed between an LED assembly 338-2 and a module housing 512-1. The fan 530, which may be a low RPM fan, draws air into the housing 512-1 through intake vents 532, and expels air from the module 300-5 through exhaust vents 534. During operation, heat is transferred from LED subassemblies 344-2 to thermal dissipation fins 510-1 through a metal core printed circuit board 346-1. The airflow created by the fan 530 passes over the thermal dissipation fins 510-1 and removes heat from the thermal dissipation fins 510-1 before exiting the module housing 512-1 through the exhaust vents 534. Any airflow which directly passes over the metal core printed circuit board 346-1 and/or the LED subassemblies 344-2 also may remove heat. Of course the particular arrangement or configuration of the thermal dissipation fins 510-1 may differ from those illustrated in this embodiment. More than one fan may be used for a given light-generating module 300-5. In some embodiments, operation of the fan 530 may be controlled using temperature sensing or measurements of the amount of energy supplied to the LED assembly 338-2.

Figure 35:
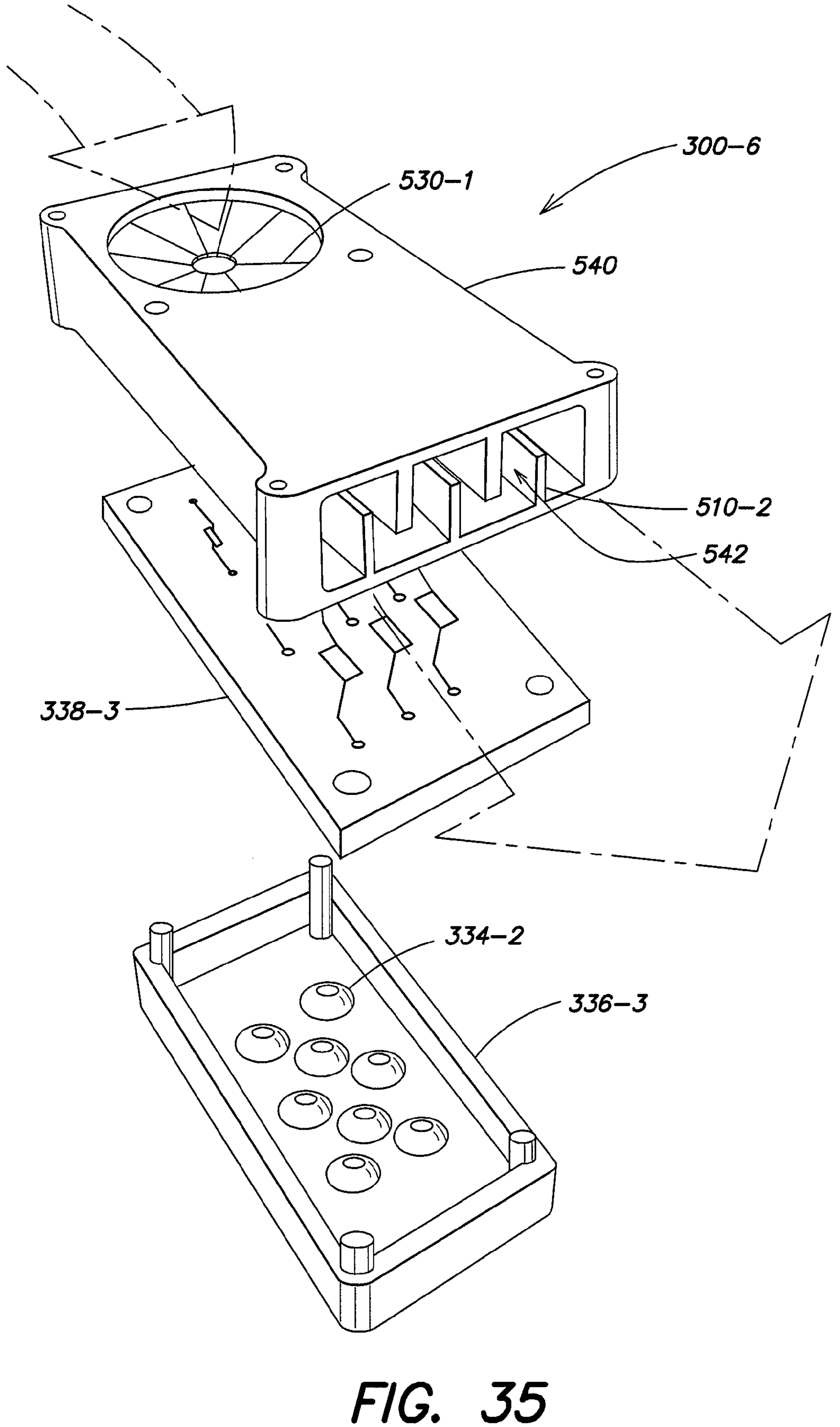
FIG. 35 is an exploded view of a light-generating module including a fan according to another embodiment of the disclosure.

Another embodiment of a light-generating module 300-6 including a fan 530-1 is illustrated in FIG. 35. For example, the fan 530-1, such as a low decibel fan, can be disposed in a heat sink 540, such as a die-cast heat sink. An LED assembly 338-3 (the backside of which is visible in FIG. 35) is thermally coupled to the heat sink 540 (e.g., with a gap pad, viscous paste or liquid metal). The heat sink 540 has fins 510-2 which form channels 542 through which air flows. The LED assembly 338-3 and a chassis 336-3 for supporting secondary optic components 334-2 may be removably attached to the heat sink 540, for example with screws. In some embodiments, the LED assembly 338-3 and the chassis 336-3 may be permanently attached to the heat sink 540 and the entire light-generating module 300-6 incorporating all of the components illustrated in FIG. 35 may be attachable to and removable from lighting fixture housings by a user. The heat sink 540 also may serve as a housing or a support for additional components, electronic or otherwise, for the light-generating module 300-6.

Figure 36:
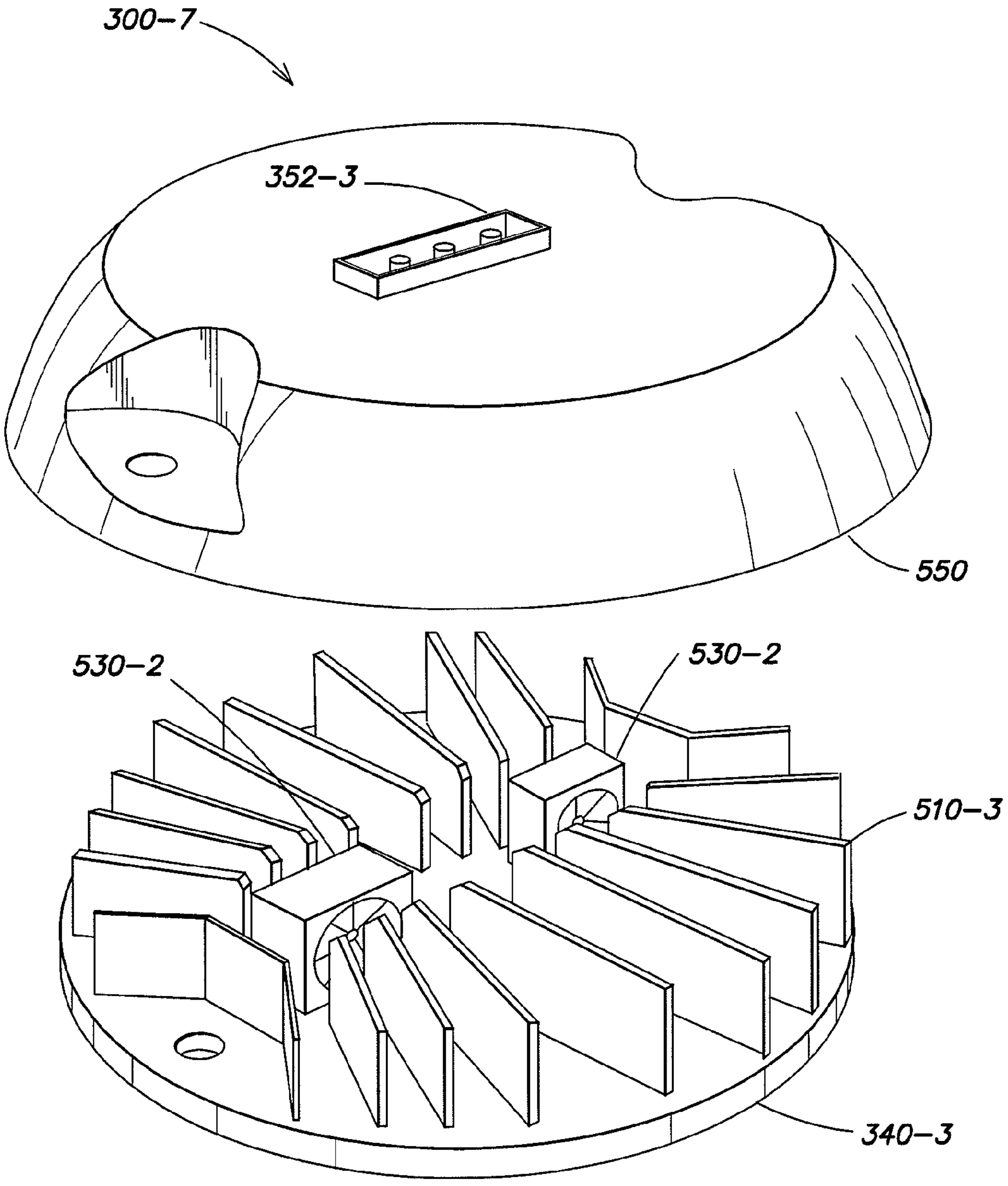
FIG. 36 is a perspective view of a heat sink for a light-generating module.
Figure 37:
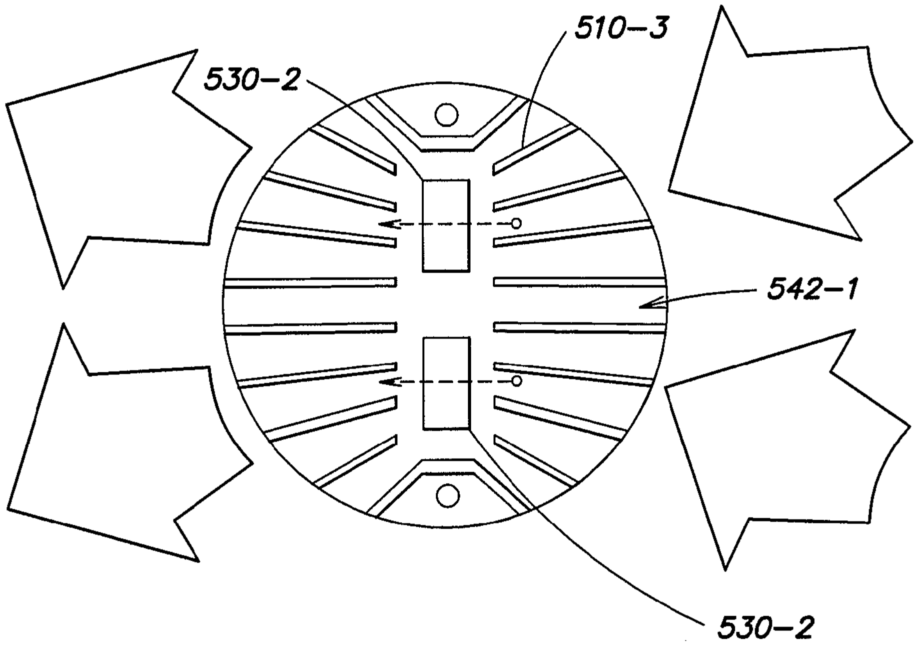
FIG. 37 is a top view of the heat sink of FIG. 36.
Figure 38:
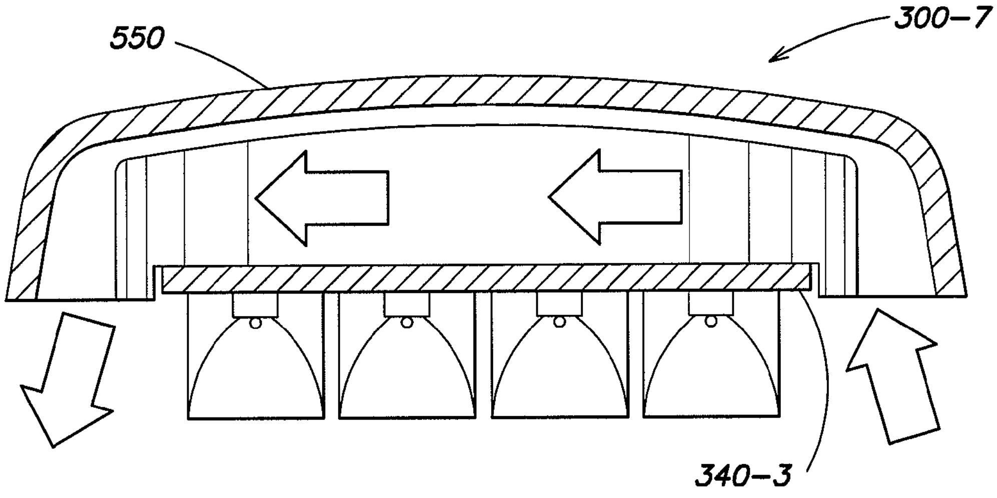
FIG. 38 is a cross-sectional view of the heat sink of FIG. 36.

In one embodiment of a light-generating module 300-7 illustrated in FIGS. 36-38, the thermal components include a thermally conductive base plate 340-3, fins 510-3, and a cover 550. The components may be configured to facilitate a flow of air past certain of the thermal dissipation components (such as the fins 510-3), as shown in FIGS. 37 and 38. For example, in some embodiments, one or more fans 530-2 may be employed to promote an air flow through channels 542-1 formed by the fins 510-3.

The cover 550 may be configured to allow the light-generating module 300-7 to be attached with screws to a housing 304-2 of a lighting fixture 100-2, or, in some embodiments, the cover may be configured to allow the light-generating module 300-7 to be clipped or snapped into place within the fixture housing 304-2. The cover 550 may include contacts 352-3 for operating power and/or control connectivity, or the cover 550 may include a hole for allowing access to power and/or control contacts on an LED subassembly.

Figure 39:
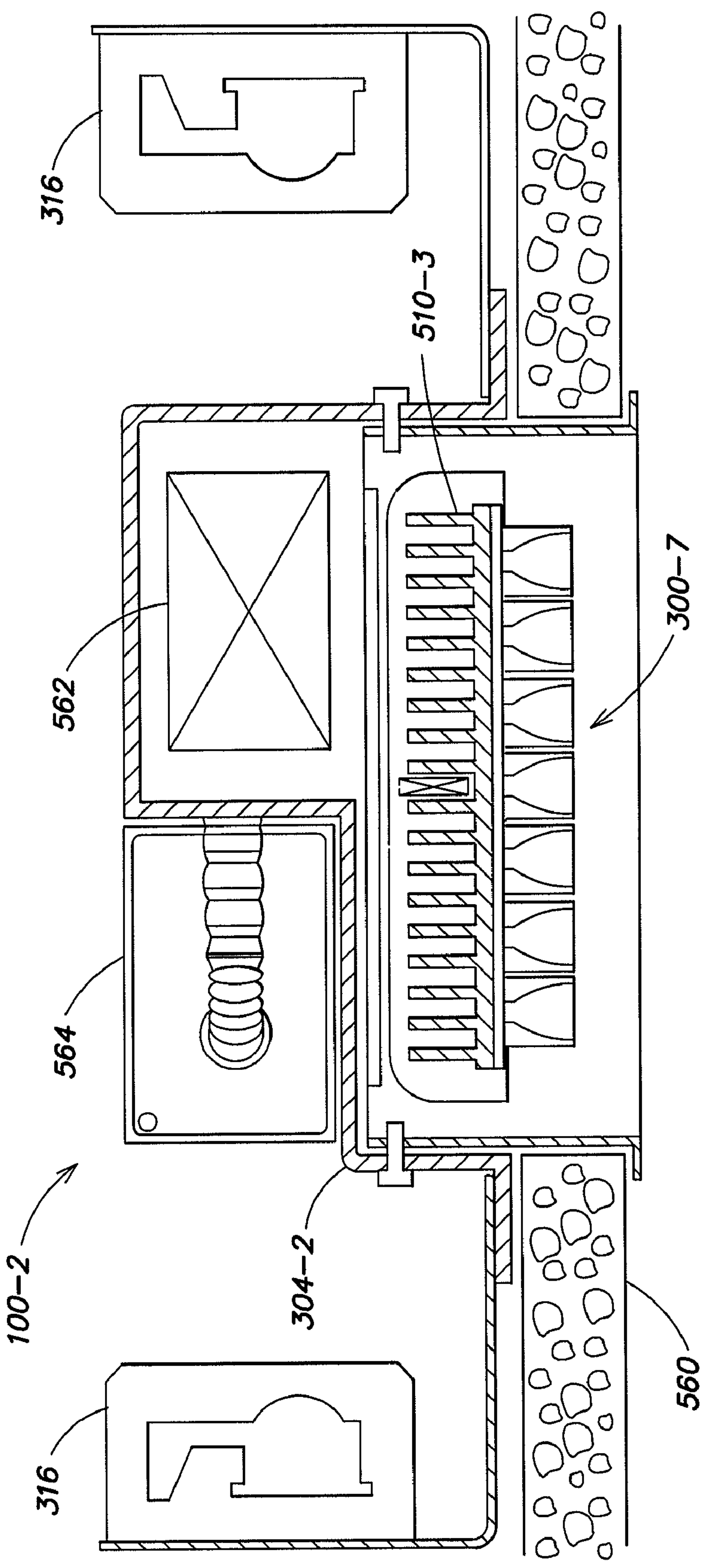
FIG. 39 is a cross-sectional side view of a recessed joist-mount lighting fixture according to one embodiment of the disclosure.

As may be seen in FIG. 39, a mounting bracket 316 may be designed to mount, for example, between joists, beams or similar architectural features of a ceiling 560, so that the lighting fixture 100-2 is recessed, with the lower portion of the lighting fixture 100-2 being disposed substantially flush with the ceiling 560. The lighting fixture 100-2 may be configured to hold a removable light-generating module (e.g., the light-generating module 300-7). The lighting fixture 100-2 may include a controller, as well as other components, which may be disposed in a controller housing 562. A wiring compartment 564 may include various electronic components, such as wires for supplying operating power and data to the light-generating module 100-2. The controller housing 562 and/or the wiring compartment 564 may be configured to provide the recessed lighting fixture 100-2 with a low vertical profile, so as to minimize the height of the recessed lighting fixture 100-2 within the ceiling 560. In some embodiments, the profile of the recessed lighting fixture 100-2 may have an approximately four inch depth above the ceiling 560, such as to connect to a two-by-four stud or joist without requiring additional space above the ceiling.

Figure 40:
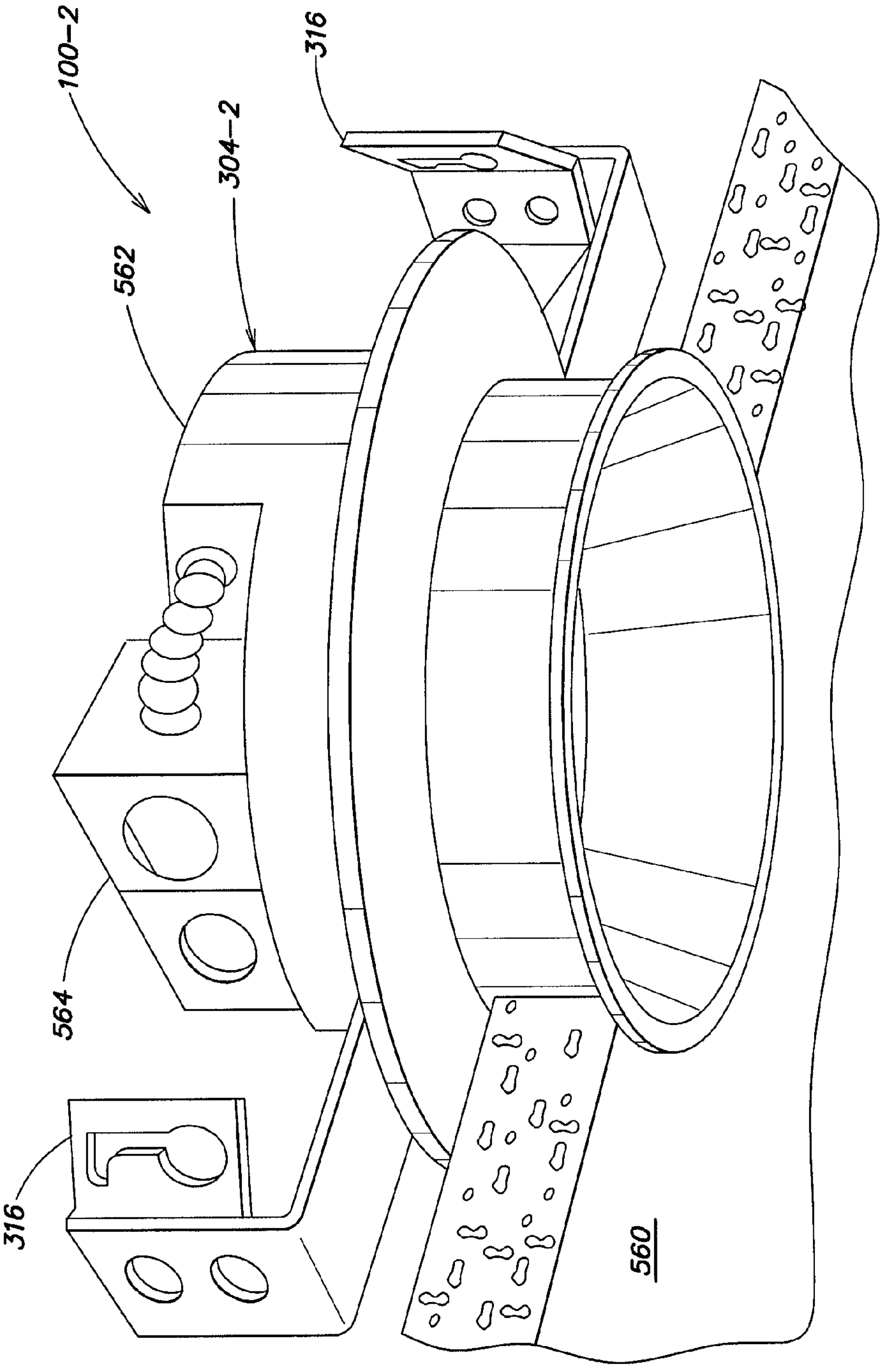
FIG. 40 is a perspective view of a recessed joist-mount lighting fixture according to one embodiment of the disclosure.
Figure 41:
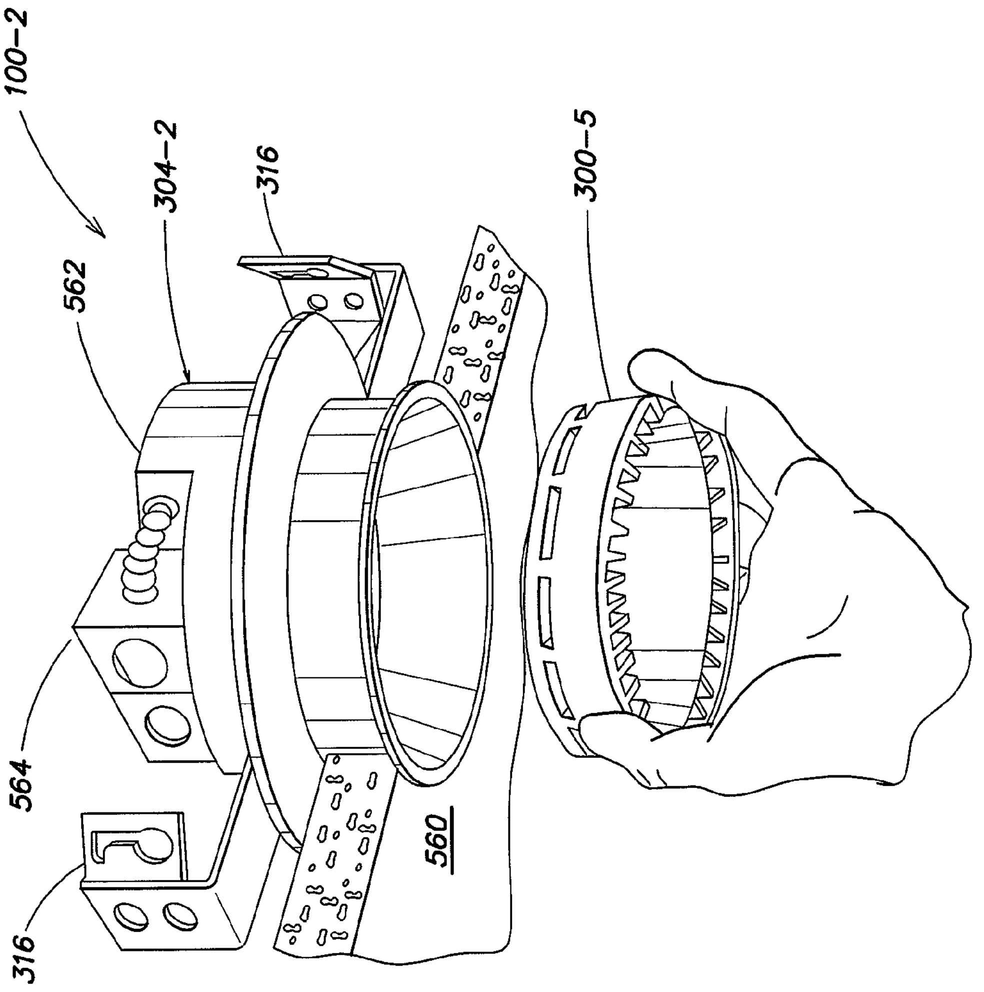
FIG. 41 shows a light-generating module being removed from a recessed joist-mount lighting fixture.

As illustrated in FIGS. 40 and 41, the light-generating module 300-5 described with reference to FIG. 34 (or another suitable light-generating module disclosed herein) may be used within a recessed joist-mount lighting fixture 100-2 according to yet another embodiment of the disclosure. The recessed lighting fixture 100-2 may include a housing 304-2 and mounting brackets 316 configured for mounting the lighting fixture 100-2 in a ceiling 560 or other suitable location. The light-generating module 300-5 is shown being removed from the recessed lighting fixture 100-2 in FIG. 41.

In some embodiments, the light-generating module 300 may include no control facilities within the module, or may include a very limited amount of memory, processing or control facilities within the light-generating module 300. For example, the light-generating module 300 may receive drive signals for LEDs from an external controller module (that is, a controller not disposed on the light-generating module 300) and provide no further control of the LEDs and provide no feedback or information to the external controller module.

In some embodiments, the light-generating module 300 may include various memory, processing or control facilities on the light-generating module 300 itself. For example, the light-generating module 300 may include a unique identification code such a serial number. The serial number may be available for reading by an external controller module, and information associated with the serial number may be present within memory associated with the controller module, and/or information associated with the serial number may provided to the controller module from an external source. In one embodiment, the controller module reads the unique identification code of the light-generating module 300 and accesses a database that contains information specific to the light-generating module 300. In some embodiments, an identification code may identify a group of light-generating modules 300 having similar or identical characteristics, and not identify a specific light-generating module 300.

The light-generating module 300 may include only an identification code, from which further information can be accessed, as discussed above. Alternatively, in some embodiments, the light-generating module 300 may include additional information within memory on the light-generating module 300. Examples of information which may be included on the light-generating module 300 include, but are not limited to: operating power requirements; operating power output rating; descriptions of LED sources; light generating characteristics or parameters relating to color or color temperature; description of optical beam angles; calibration parameters; operating temperature; instructions for controller action related to operating temperature; and historical data relating to temperature, time or other light generating characteristics.

The operating power requirements may be provided by the light-generating module 300 in terms of voltage or current, and may include any other suitable information regarding the supply of power to the light-generating module 300. The operating power output rating may provide an output rating in terms of watts or lumens, and may include information regarding any predicted degradation over time. A description of LED-based sources may include the type and/or number of RGB LEDs and/or white LEDs, and color temperature specifications. Information regarding the optical beam angles and/or feasible optical beam angles may be included in some embodiments. Information regarding a predicted usable life span may be included in some embodiments. The light-generating module 300 may communicate operating temperature measurements to the controller, and, in some embodiments, may provide data or instructions to the controller regarding desired power levels based on operating temperature measurements. For example, the light-generating module 300 may instruct the controller to reduce the power being supplied to the light-generating module 300 when a certain threshold operating temperature is reached. In some embodiments, historical data such as the number of hours of run-time, the historical operating temperatures, or other data, may be supplied by the light-generating module 300 to the controller or other suitable device. In some embodiments, the information and/or instructions provided by the light-generating module 300 may be initiated by the light-generating module 300 itself and communicated to the controller. In some embodiments, the controller, or other reading device, may prompt the light-generating module 300 for information, or read information directly from a memory module or other suitable component of the light-generating module 300.

Figure 42:
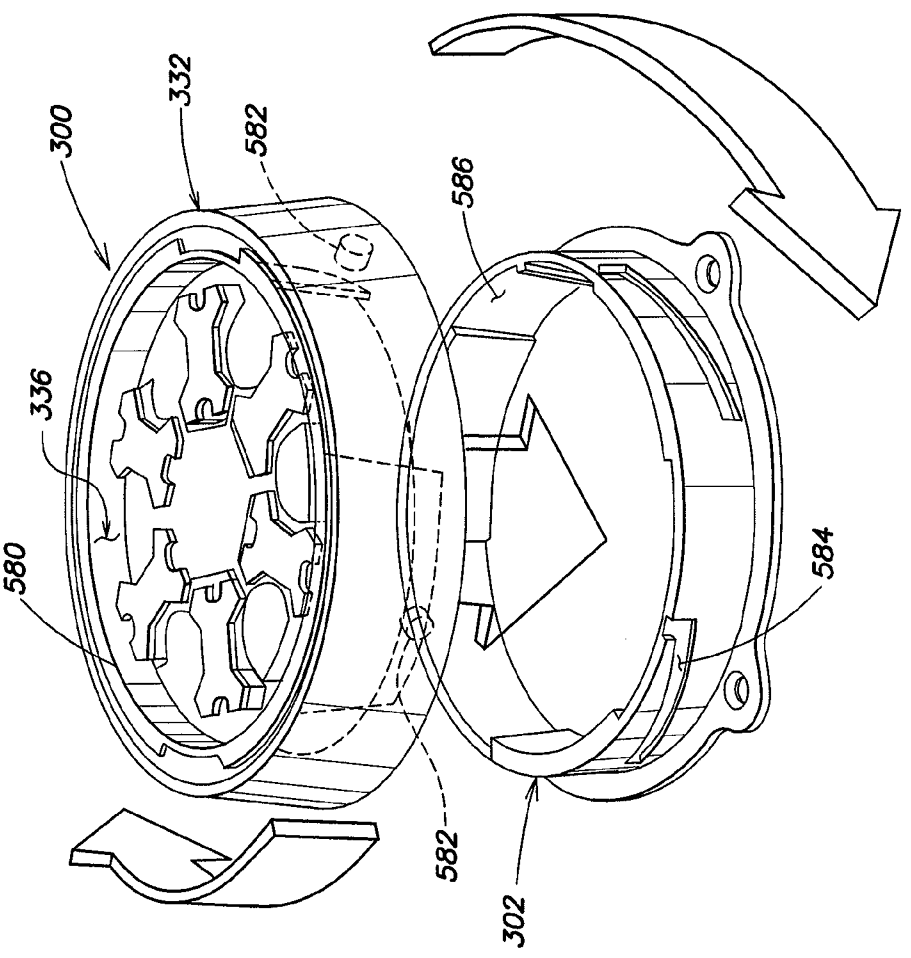
FIG. 42 illustrates a light-generating module being attached to a socket according to one embodiment of the disclosure.

As illustrated in FIG. 42, in some embodiments a socket 302 may be employed to replaceably attach a light-generating module to a housing or heat sink of a lighting fixture. In this embodiment, a grip ring 332 is rotatable on a molded ridge feature 580 of the chassis 336 and includes embossed features (e.g., posts 582) that follow and engage with a complementary spiral path 584 on the socket 302 to lock the module to the socket. In some embodiments, the socket 302 also may include a key 586 to provide a straight docking path for the engagement of the light-generating module to the socket 302. The key 586 prevents the light-generating module (other than the grip ring 332) from rotating within the socket 302. In this manner, rotation of the grip ring 332 does not substantially affect the orientation of the LED assemblies. Additionally, the orientation of any connectors on the back side of the light-generating module does not change, thereby allowing orientation-specific connectors to be mated with complementary connectors on the housing.

By using posts 582 on an internal surface of the grip ring 332 and spiral pathways 584 or screw-type threads on an exterior surface of the socket 302, in some embodiments, tool-less installation and removal of the light-generating module 300 from the lighting fixture may be achieved. In this regard, the light-generating module may be easily attached to a lighting fixture, and thermal, mechanical and electrical connections may automatically occur as a result of the attachment. Of course, in some embodiments, one or more additional steps may be required of the user to form all connections of the light-generating module to the housing. For example, in some embodiments, the physical and thermal coupling of the light-generating module to the housing may occur by twisting the light-generating module into the socket as described with reference to FIG. 42, and the electrical connection of the light-generating module to the housing may be subsequently achieved by separately plugging a connector of the light-generating module into a connector of the housing.

In one aspect, an electrical contact or other means may be incorporated with the socket 302 to detect when the grip ring 332 has reached a locked position, so that drive signals and/or operating power to the LED hex subassemblies are not applied unless the light-generating module 300 is completely locked into the socket 302.

Figure 43:
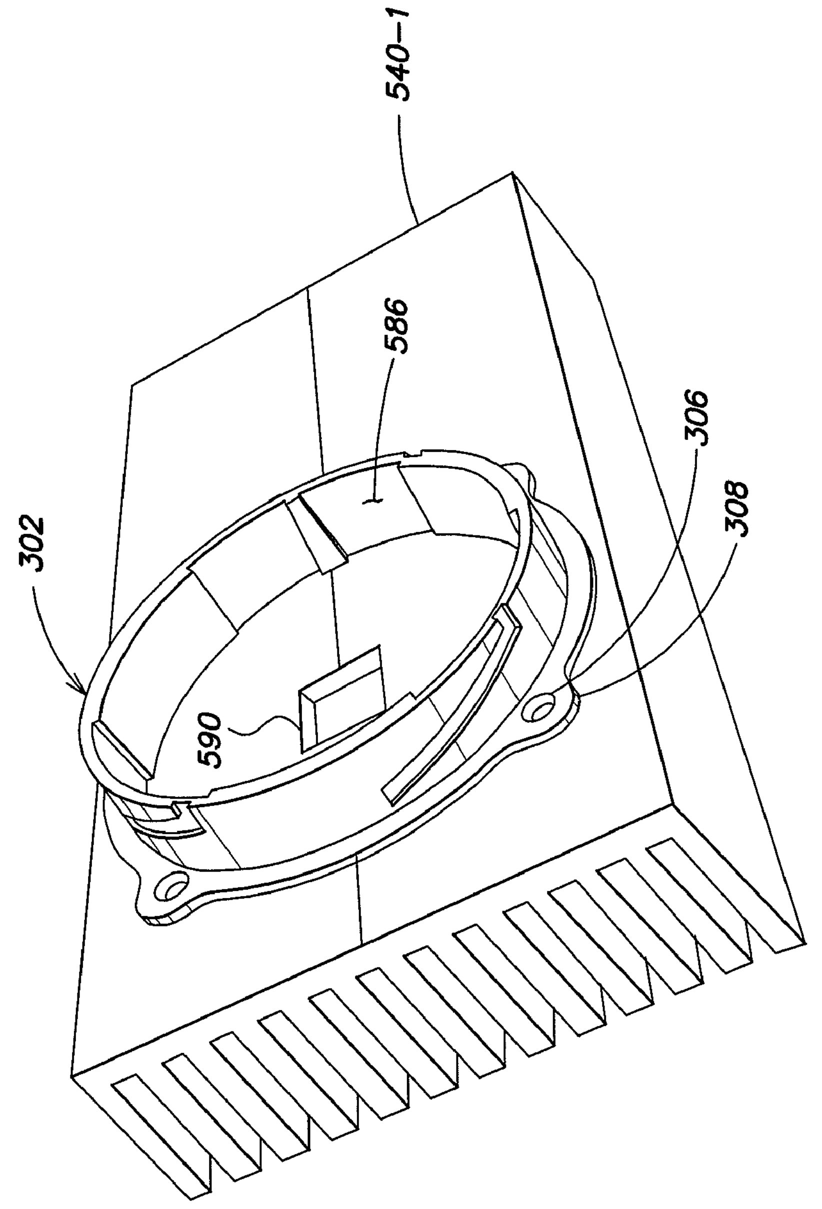
FIG. 43 illustrates a socket attached to a heat sink according to one embodiment of the disclosure.

FIG. 43 illustrates one embodiment of the socket 302 mounted to a heat sink 540-1, which may form a thermally conductive portion of a fixture housing. The socket 302 may be bolted or otherwise fastened to the heat sink 540-1 using through-holes 306 in flanges 308. A through-hole 590 may be provided in the heat sink 540-1 for an electrical connector. In some embodiments, other manners of securing the socket 302 to a heat sink, housing, or lighting fixture may be employed, and in some embodiments, the socket 302 may be integrally connected to the housing.

An attachment element other than a socket may be used in some embodiments to attach the light-generating module to the housing. For example, in some embodiments, the light-generating module may be attached to the housing using an adhesive. In some embodiments, fasteners such as screws or bolts may be used to attach the light-generating module, and in this manner, no socket may be present.

Figure 44A:
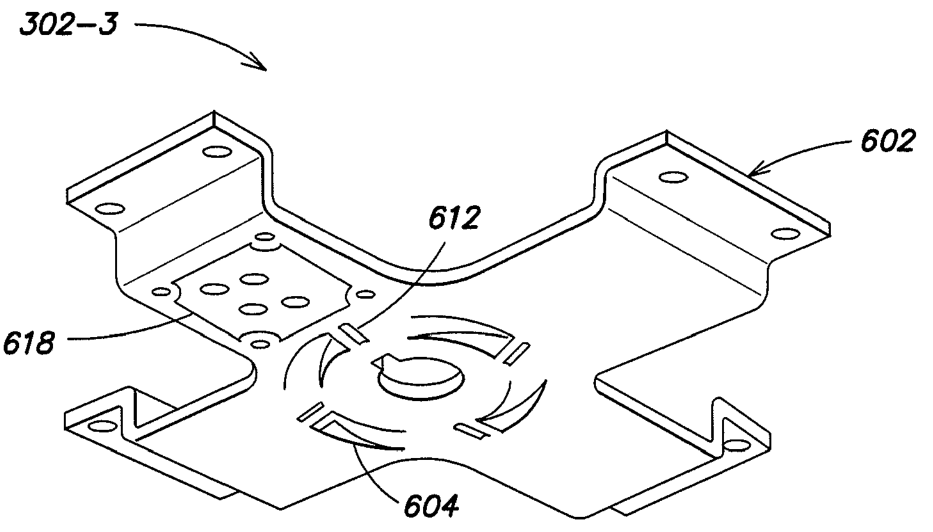
FIGS. 44A and 44B illustrate an alternative embodiment of a light-generating module and a socket.
Figure 44B:
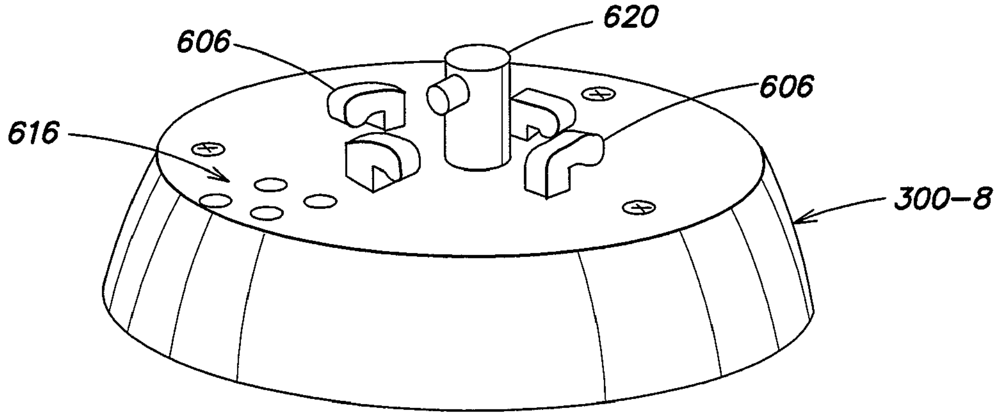
Figure 45:
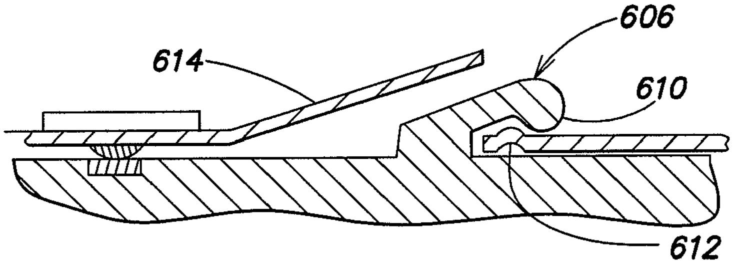
FIG. 45 is a cross-sectional side view of an engagement arrangement according to one embodiment of the disclosure.

FIGS. 44A and 44B illustrate an alternative embodiment of a socket 302-3 in which a stamped sheet 602 includes locking grooves 604 for receiving posts 606 of a light-generating module 300-8. To mount the light-generating module 300-8 to the socket, the posts 606 are inserted into the locking grooves 604 and turned clockwise. At the end of the rotation, a detent may be used to releasably lock the light-generating module 300-8 to the socket 302-3. For example, a rounded end 610 of one or more of the posts 606 may engage with a raised portion 612 of the stamped sheet to provide stability in the attachment (see FIG. 45). A bent portion 614 of the stamped sheet may be biased to press on the post 606 to further secure the attachment.

A keyed center post 620 may be used to correctly orient contact pads 616 of the light-generating module 300-8 with leaf spring contacts 618 present on the stamped sheet 602. Of course the contact pads 616 instead may be present on the stamped sheet 602 and the leaf spring contacts 618 may be present on the light-generating module 300-8. Other suitable connection assemblies may be used to achieve electrical and/or mechanical connections.

Figure 47:
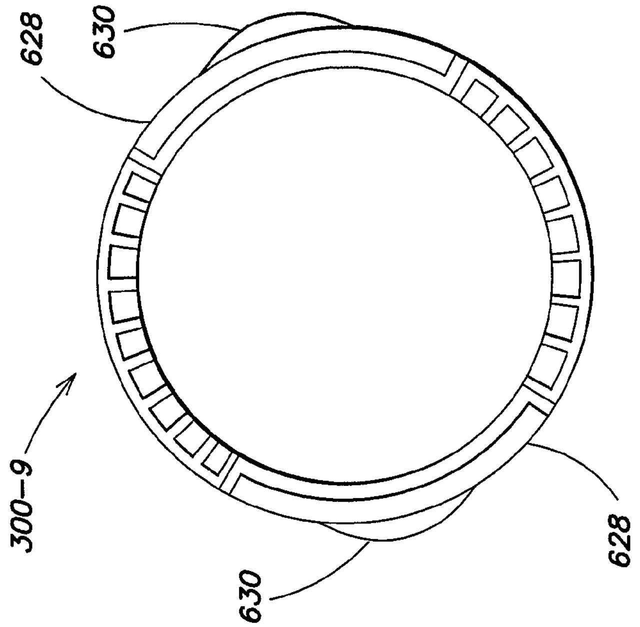
FIG. 47 is a front view of the light-generating module of FIG. 46.
Figure 46:
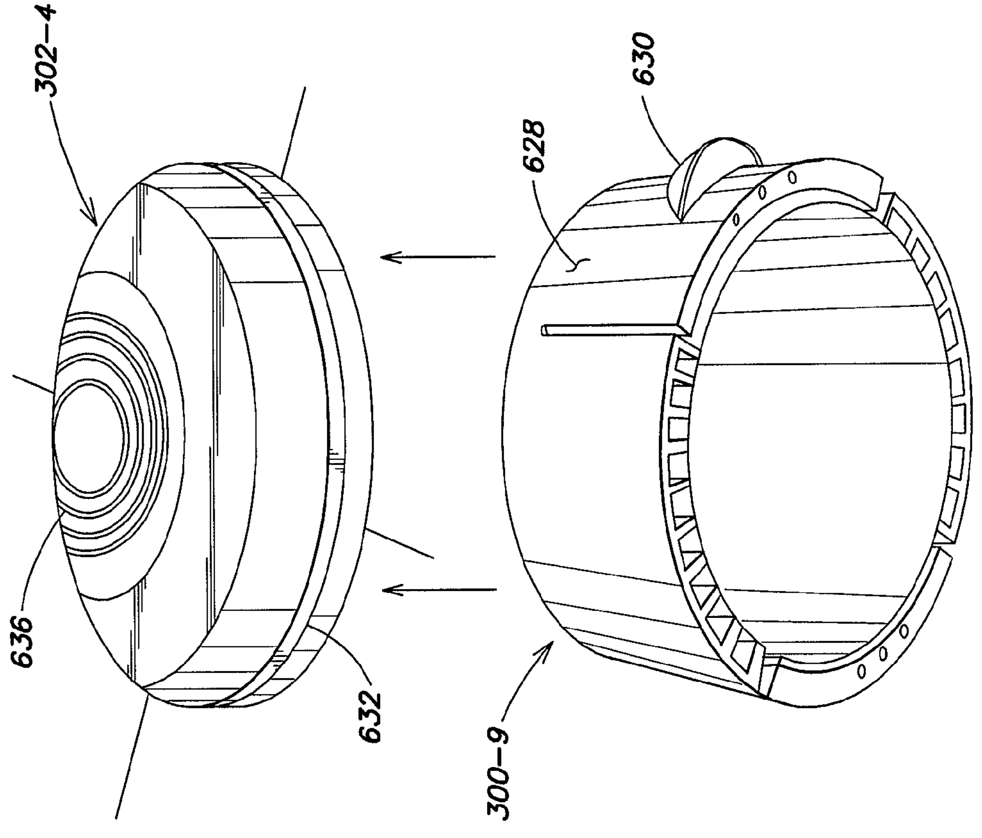
FIG. 46 is a perspective view of another embodiment of a light-generating module and a socket.

FIGS. 46 and 47 show another alternative embodiment of a socket 302-4 and light-generating module 300-9. In this embodiment, the light-generating module 300-9 includes at least two flexible wings 628 which can deform inwardly, thereby allowing engagement elements 630 to move inwardly when pressing the light-generating module into the socket. Once the engagement elements reach a groove 632 in the socket 302-4, the flexible wings 628 move outwardly and the engagement elements engage with the groove 632 and hold the light-generating module 300-9 in the socket 302-4. A spring-biased contact plate 636 is disposed at a base of the socket 302-4 to facilitate electrical connection to the light-generating module. To remove the light-generating module 300-9 from the socket 302-4, a user pushes one or more of the flexible wings 628 inwardly to release the engagement elements 630 from the groove 632.

Figure 48:
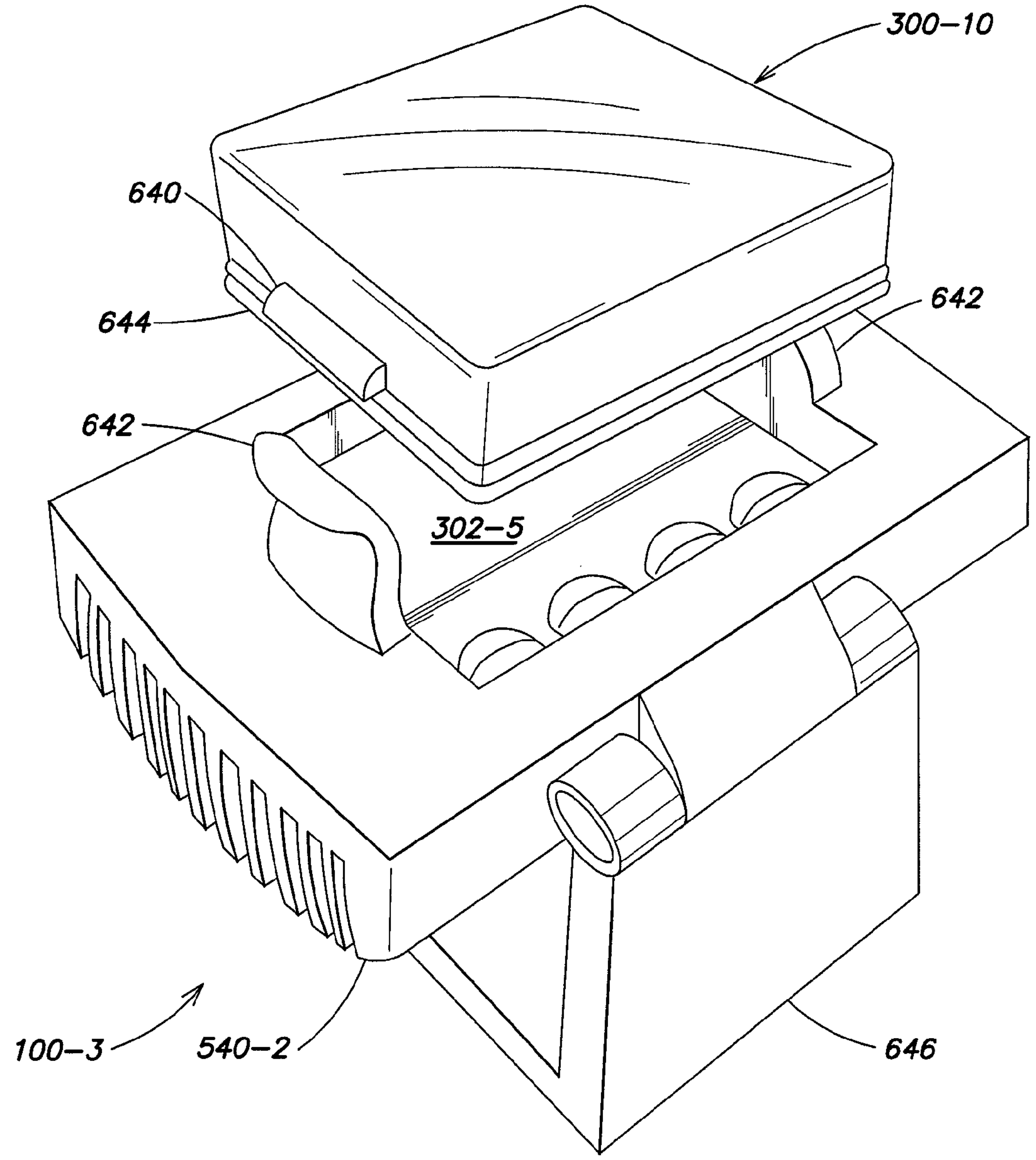
FIG. 48 is a perspective view of a rectangular light-generating module and socket according to one embodiment of the disclosure.

While each of the socket embodiments described thus far have used circular sockets as examples, it is important to note that a socket is not required to be circular. For example, in the embodiment of a socket 302-5 and a light-generating module 300-10 illustrated in FIG. 48, the socket 302-5 is substantially rectangular. In this embodiment, the light-generating module 300-10 includes one or more tabs 640 which engage with corresponding compliant catches 642 in a heat sink 540-2. The light-generating module 300-10 may include a thermally conductive gap pad 644 to facilitate thermal conductance to the heat sink 540-2. The heat sink 540-2 may be part of a lighting fixture 100-3 which includes a hinged mounting bracket 646.

Figure 49:
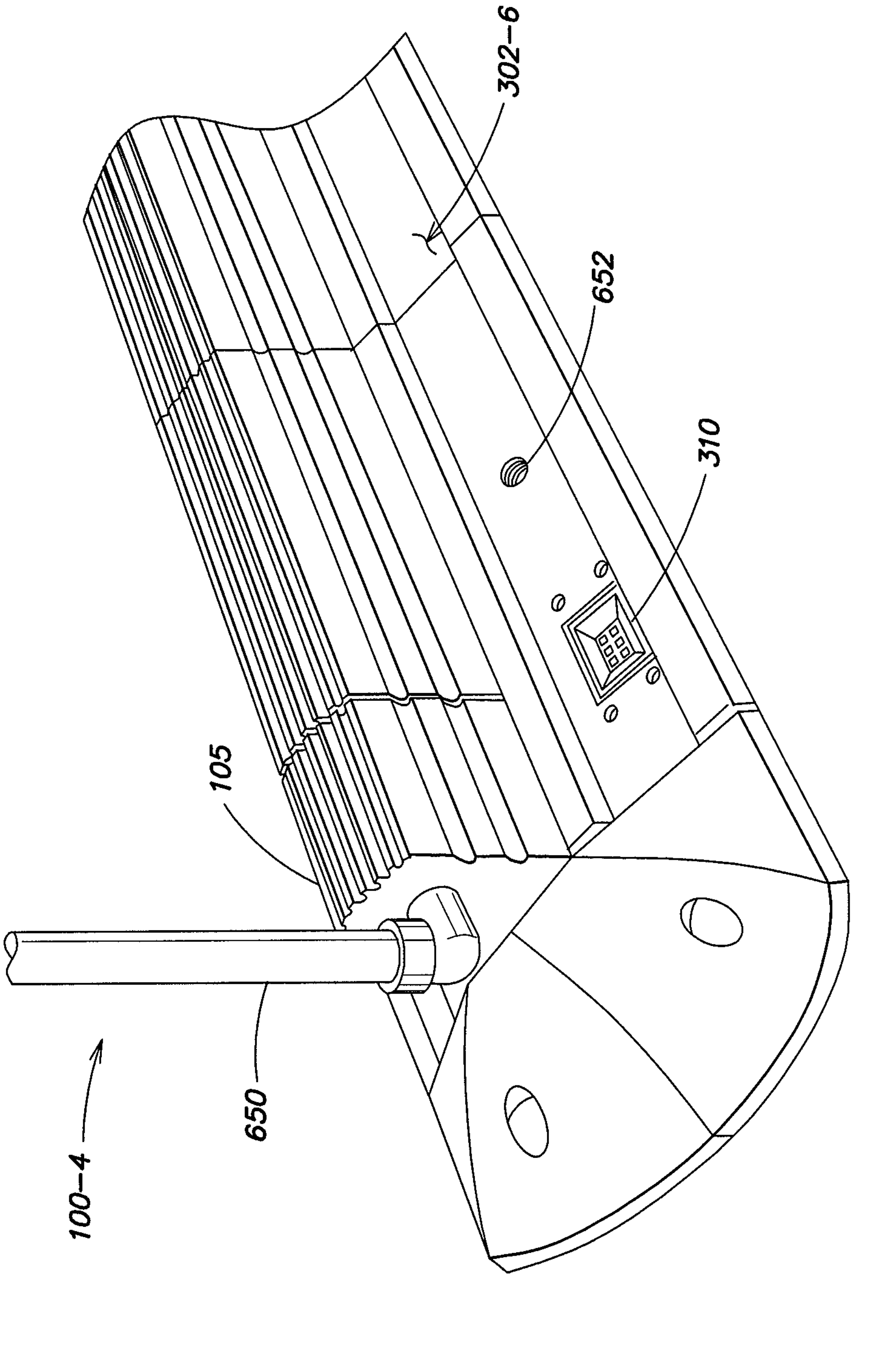
FIG. 49 is a perspective view of a lighting fixture configured to receive upwardly-facing light-generating modules.

Another embodiment of a substantially rectangular socket is illustrated in FIG. 49. A lighting fixture 100-4 which hangs from a ceiling is configured to hold light-generating modules that project light upwardly. One or more hangars 650 support the lighting fixture 100-4 and also may provide a conduit for wires that carry operating power and/or control signals to a controller 105. One or more sockets 302-6 face upwardly and include an electrical connector 310 for engagement with an electrical connector on a light-generating module. A light-generating module may be secured to the lighting fixture 100-4 by passing a screw through the light-generating module and into a threaded hole 652 present on a base of the socket 302-6.

Figure 50:
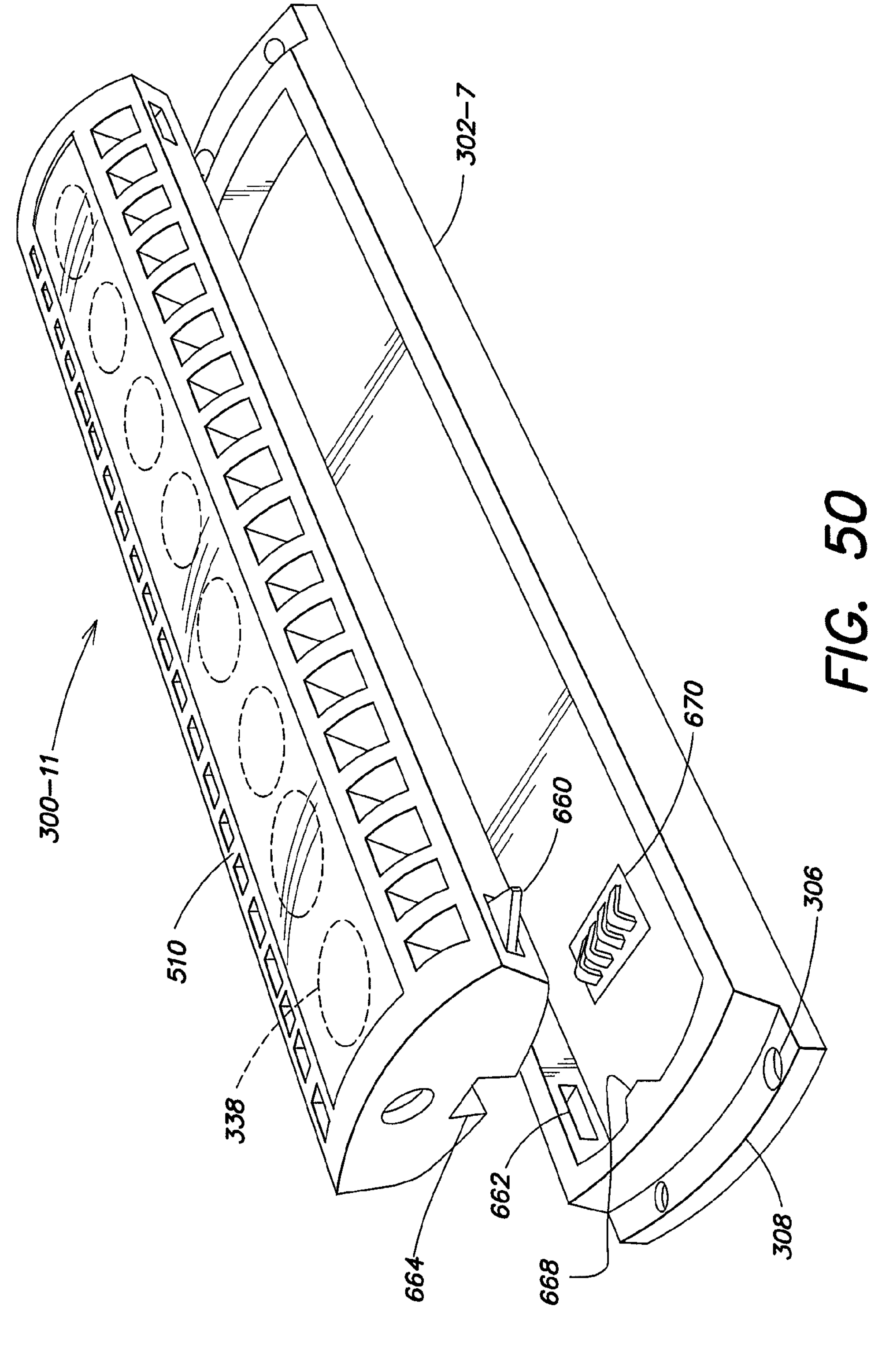
FIGS. 50 and 51 illustrate light-generating modules and sockets according to two alternative embodiments of the disclosure.

Another embodiment of a substantially rectangular socket 302-7 is illustrated in FIG. 50. A light-generating module 300-11 which also is substantially rectangular includes LED assemblies 338 and "clicks" into place (snap-fits) in the socket 302-7. The light-generating module 300-11 includes spring-biased catches 660 which protrude into grooves 662 in the socket 302-7 to hold the light-generating module 300-11 in place. In some embodiments, the catches may be locked in the deployed or undeployed positions with a tool. The light-generating module 300-11 also includes an orientation notch 664 which helps align the light-generating module 300-11 by mating with a corresponding protrusion 668 in the socket 302-7. The light-generating module 300-11 may be formed with a die-cast aluminum housing and include integrated heat sink fins 510. In some embodiments, heat sink fins may be incorporated in the socket 302-7 and/or a housing to which the socket is attached. The socket 302-7 includes leaf springs 670 for operating power and data connections, although any suitable connectors may be used. The socket 302-7 may be attached to a lighting fixture using through-holes 306 in a socket flange 308.

Figure 51:
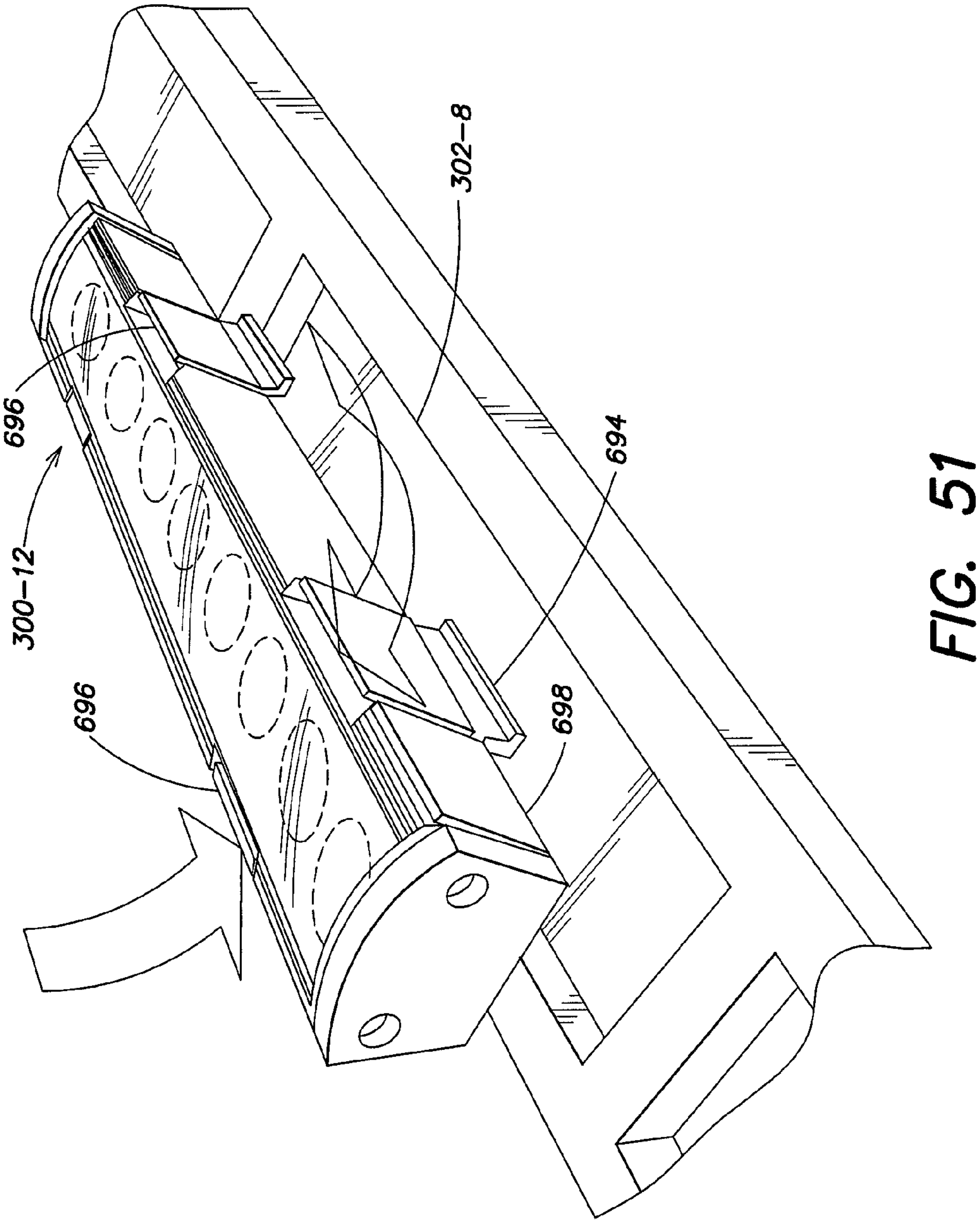

Another embodiment of a socket 302-8 and light-generating module 300-12 is illustrated in FIG. 51. In this embodiment, the light-generating module 300-12 includes pivoting hooks 694 which extend outwardly when pinch levers 696 are squeezed. In this embodiment, the light-generating module 300-12 is held within an extruded aluminum module housing 698.

Figure 52:
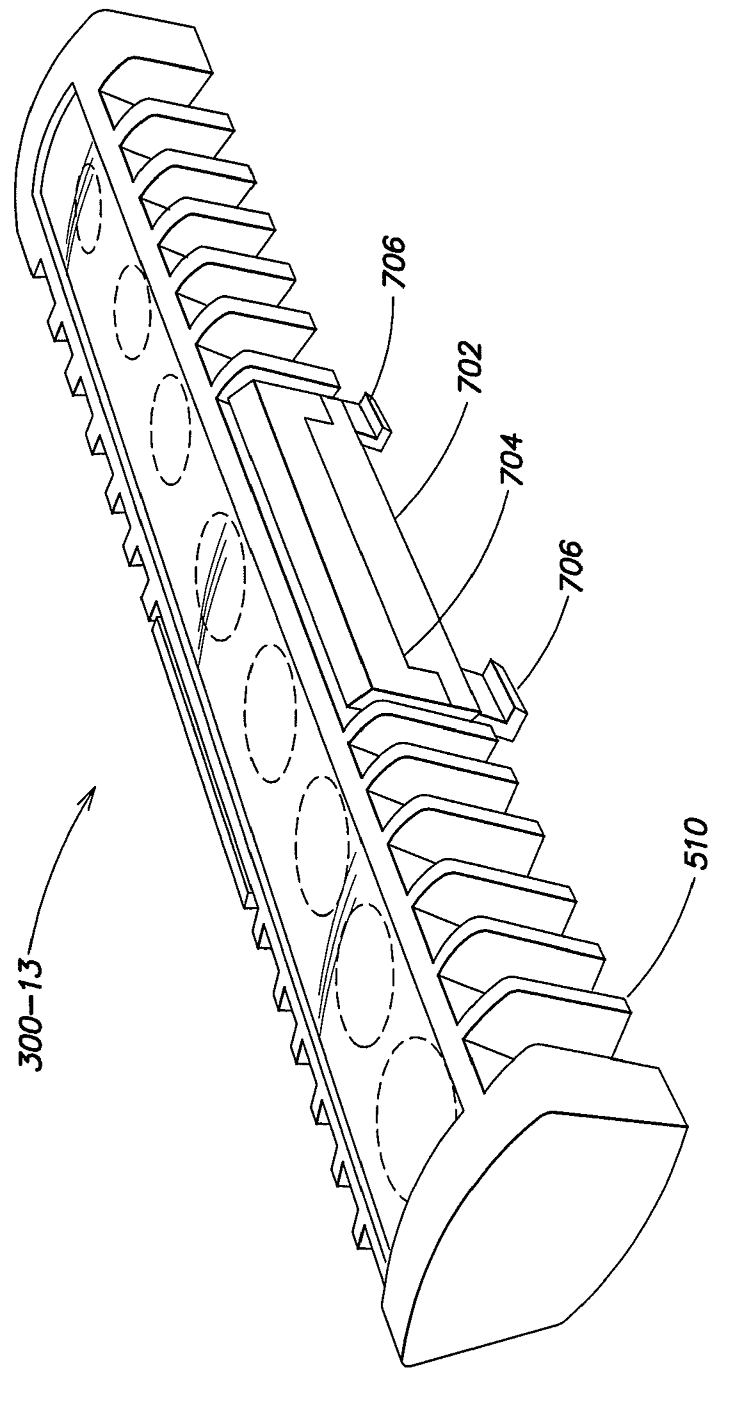
FIG. 52 is a perspective view of a light-generating module according to another embodiment of the disclosure.

One embodiment of a tool-free light-generating module 300-13 is illustrated in FIG. 52. The light-generating module 300-13 has an over-center latch 702 on one side. When a latch handle 704 is pulled, hooks 706 release from corresponding grooves in a socket (not shown). The latch 702 is configured to permit grasping by a user such that the light-generating module 300-13 may be installed and removed with a single hand and without any tools. In an alternative embodiment, a similar light-generating module may have no latch, but instead include flanges at the longitudinal ends for bolting to a socket or fixture housing.

Figure 53:
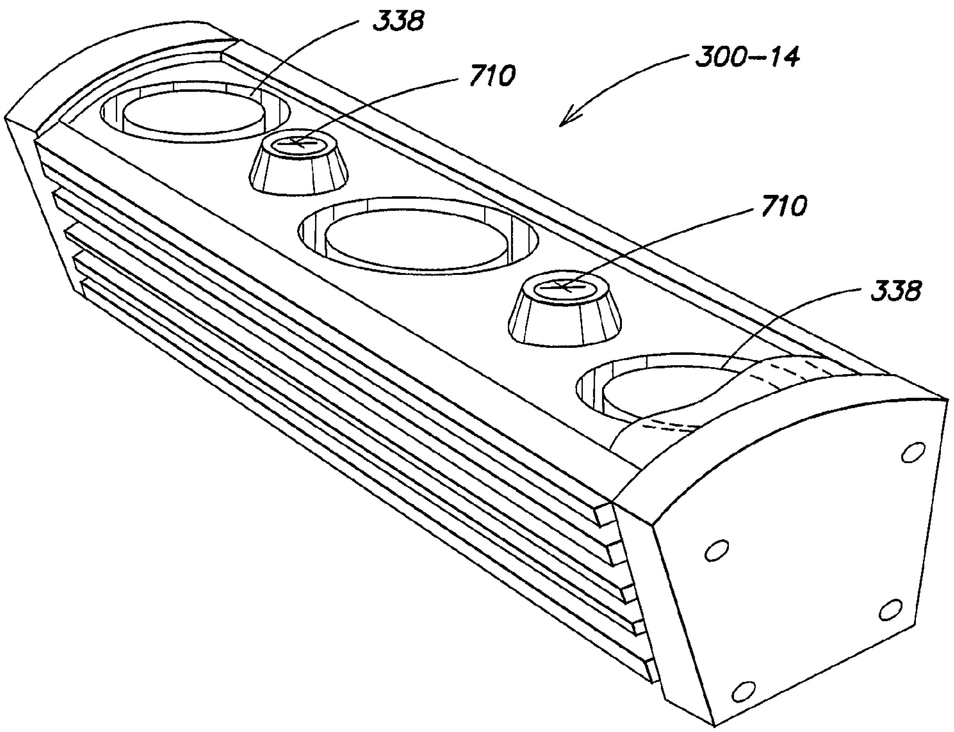
FIG. 53 is a perspective view of a light-generating module configured to be upwardly facing.

An embodiment that uses mounting hardware to attach a light-generating module 300-14 to a socket or lighting fixture is illustrated in FIG. 53. The light-generating module 300-14 includes two through-holes within the module for inserting screws 710 or other hardware. The through-holes may be located between LED assemblies 338. The screws 710 are fastened to threaded holes in the base of a socket or elsewhere on a lighting fixture.

Figure 54:
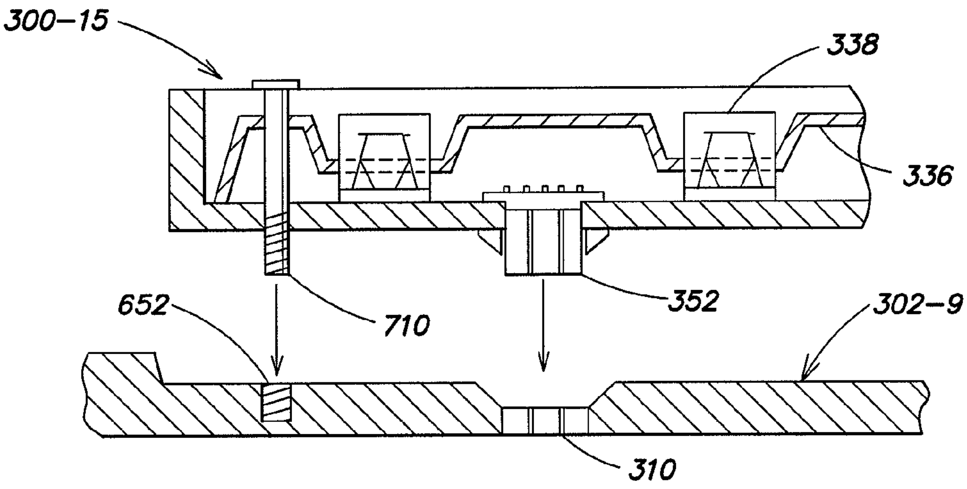
FIG. 54 is a cross-sectional view of the light-generating module of FIG. 53 and an associated socket.
Figure 55:
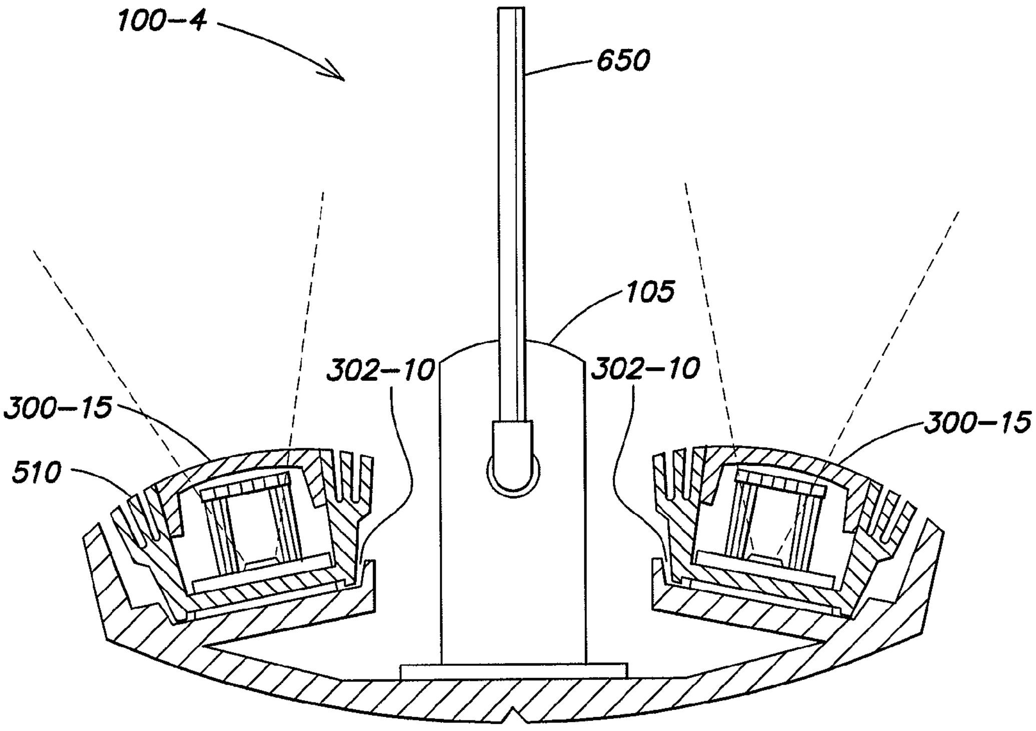
FIG. 55 is cross-sectional view of a lighting fixture including two upwardly-facing light-generating modules.
Figure 56C:
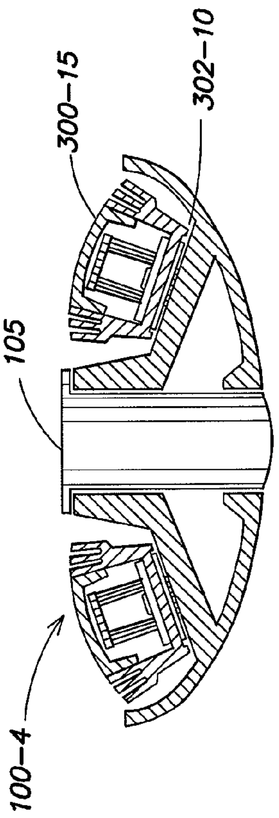
FIGS. 56A-56E illustrate various embodiments of upwardly-facing light-generating modules.
Figure 56D:
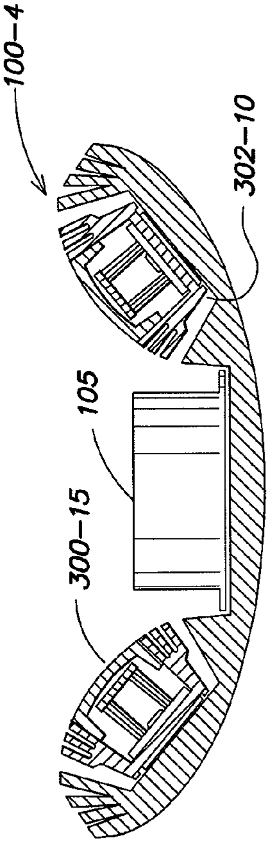
Figure 56E:
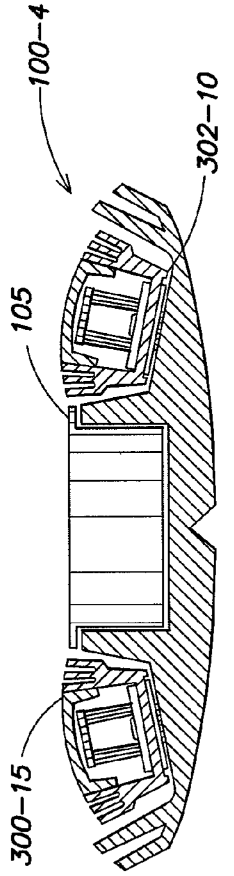
Figure 56A:
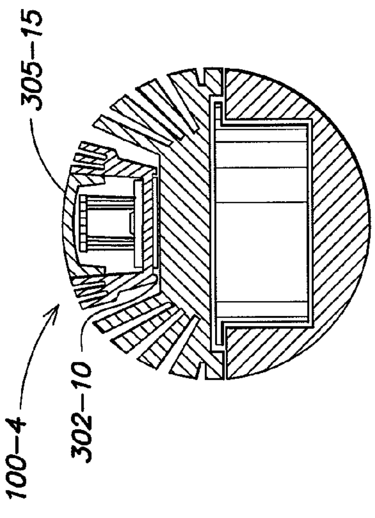
Figure 56B:
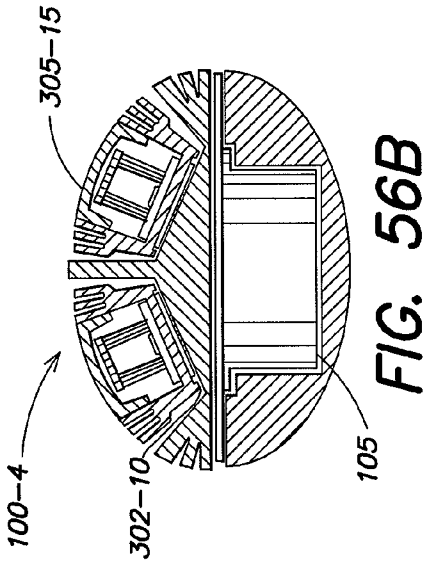

Referring now to FIG. 54, one embodiment of a light-generating module 300-15 being attached to a socket 302-9 is illustrated. The base of the socket 302-9 includes a threaded hole 652 for receiving a screw 710 that passes through a through-hole in the light-generating module 300-15. The base of the socket 302-9 also includes a electrical connector 352 for receiving a corresponding electrical connector of the light-generating module 300-15.

FIGS. 55 and 56A-56E show various embodiments of lighting fixtures 100-4 which provide light in an upward direction using removable light-generating modules 300-15 that are attached to sockets 302-10 in the lighting fixtures. Electrical connectors are provided in the socket bases and on the bottom of the light-generating modules 300-15. It should be evident from the figures that the controller module 105 may be in any one of a number of configurations.

Figure 57:
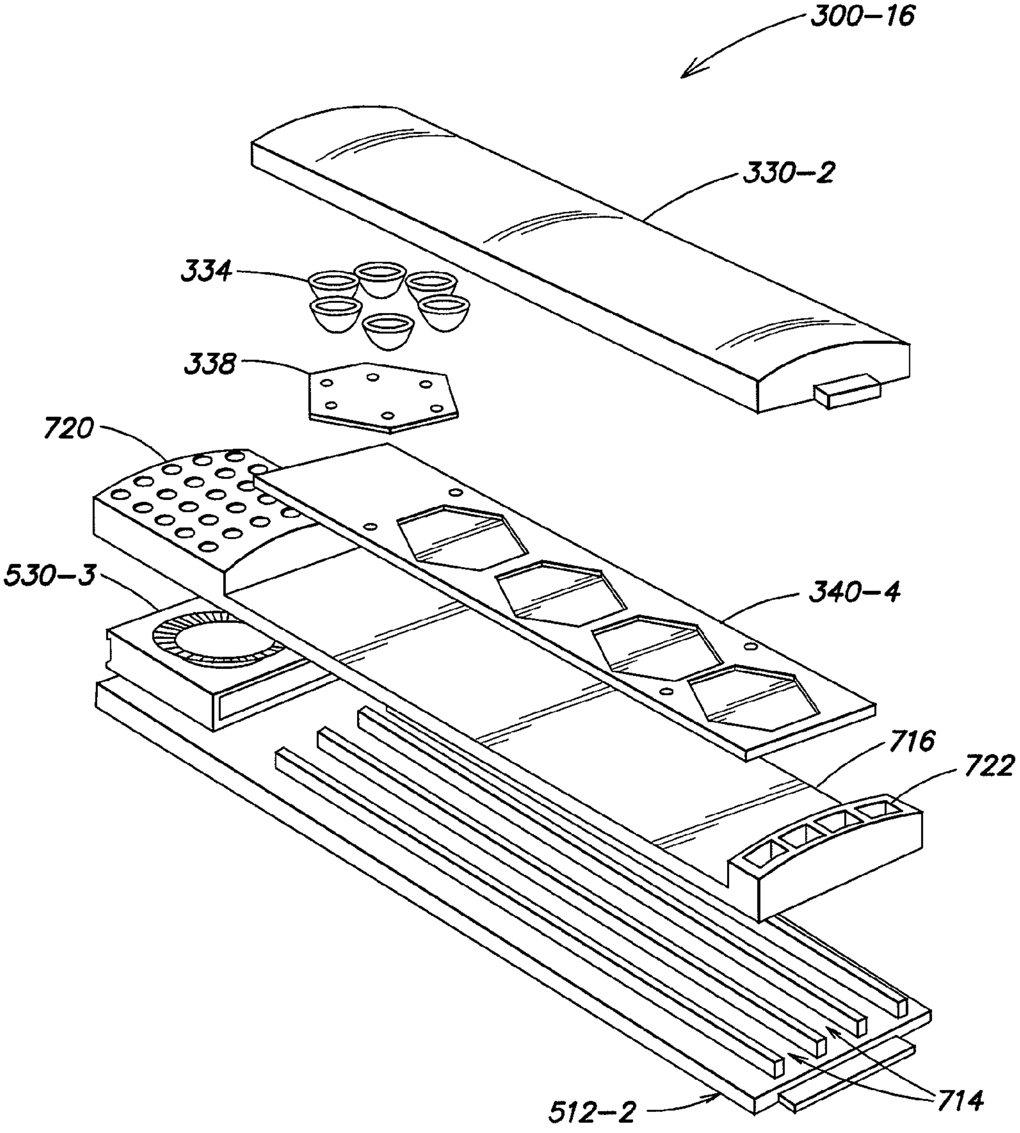
FIG. 57 is a perspective exploded view of a light-generating module according to one embodiment of the disclosure.

FIG. 57 illustrates an exploded view of one embodiment of a rectangular light-generating module 300-16 which includes a fan 530-3 for thermal dissipation. The light-generating module 300-16 includes an acrylic face plate 330-2, secondary optical components 334, a set of LED assemblies 338, a die-cast aluminum module housing 512-2 including thermal dissipation channels 714, and a cover 716 for the fan 530-3 and the thermal dissipation channels 714. The fan 530-3 is a flat, unidirectional fan which draws air into the module housing 512-2 through intake vents 720, moves the air through the thermal dissipation channels 714 and ejects the air from the module housing 512-2 through exhaust vents 722. A metal core printed circuit board 346 may be used as part of each LED assembly 338 to aid in the transference of heat from the LED assemblies 338 to a thermally conductive base plate 340-4, and in turn to the thermal dissipation channels 714.

Figure 58:
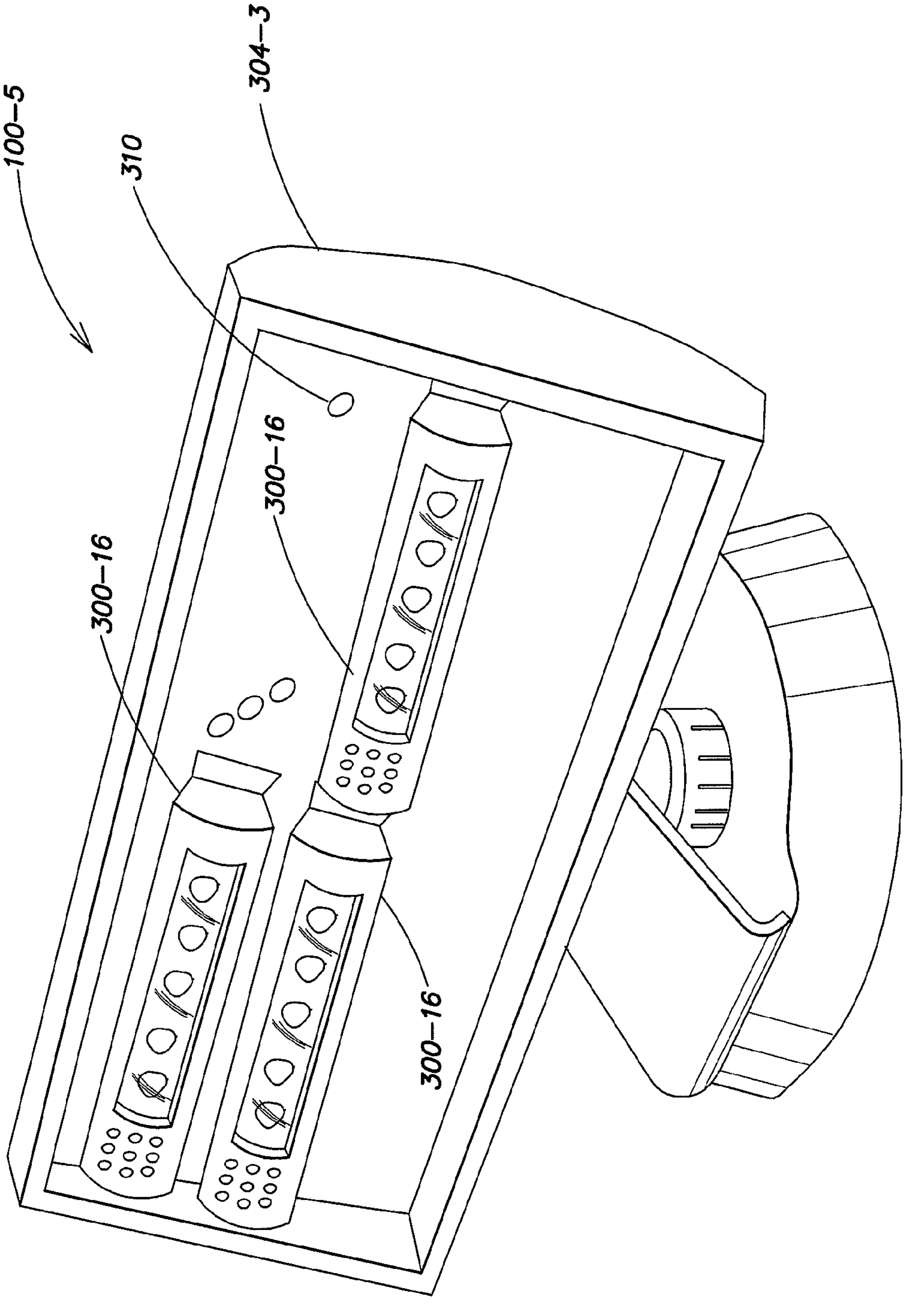
FIG. 58 is a perspective view of a lighting fixture according to one embodiment of the disclosure.

FIG. 58 illustrates one embodiment of a lighting fixture 100-5 including a housing 304-3 which can accommodate up to six light-generating modules 300-16. In this embodiment, the light-generating modules 300-16 are snap-fit into the lighting fixture 100-5 and operating power and control signal connections are made through connectors on the base of the light-generating modules 300-16 which engage with connectors 310 that are positioned on the housing 304-3.

In some embodiments of the present disclosure, a modular lighting fixture is configured such that the housing may be installed through an aperture in an architectural feature, such as a hole in a ceiling or a wall for example. In this regard, the lighting fixture may be installed as a recessed fixture in existing construction; that is, the unit may be installed in an aperture in an existing architectural surface or feature without having to cut the ceiling, wall or other architectural surface all the way to joists or other support elements.

Figure 59:
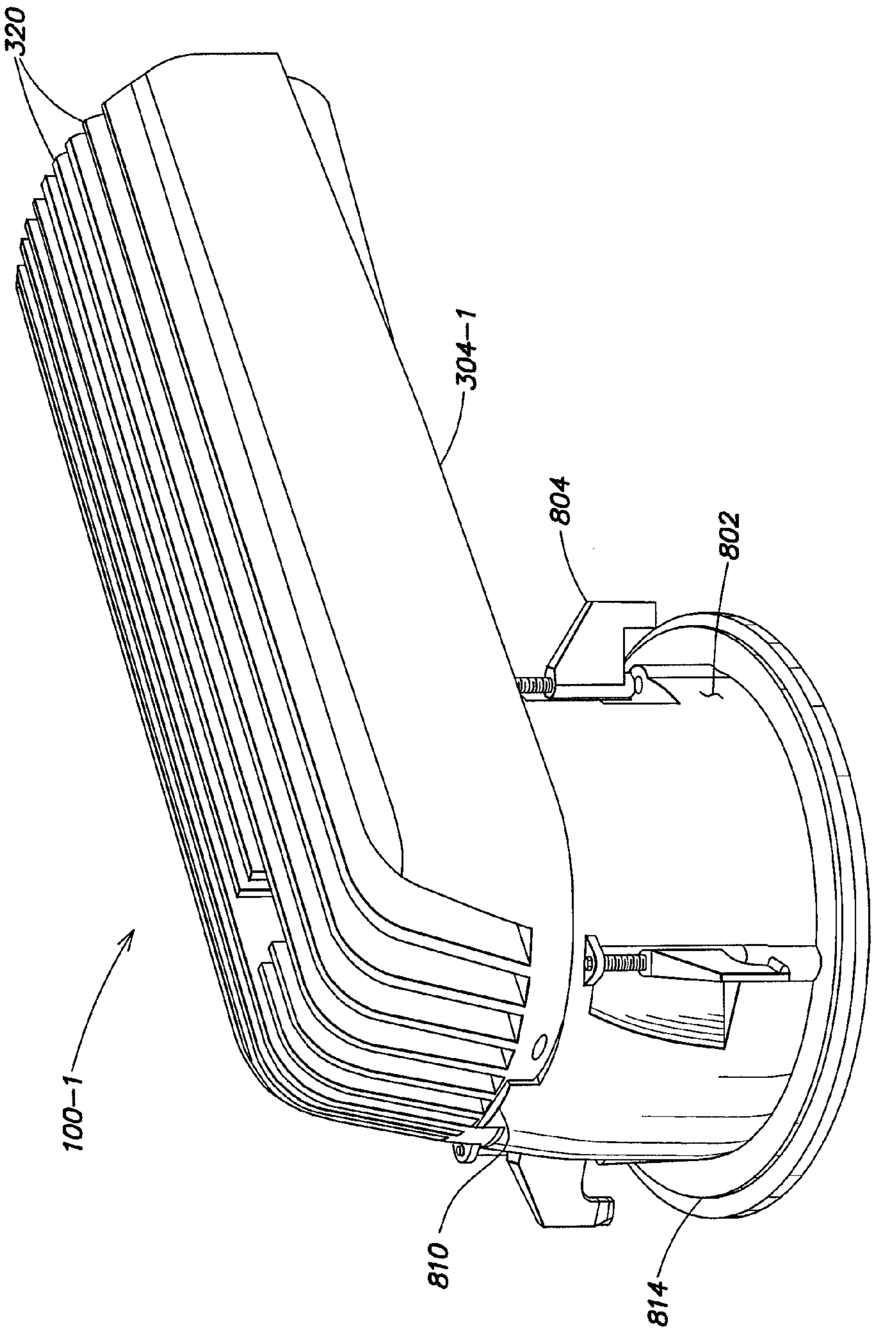
FIG. 59 is a perspective view of a lighting fixture according to one embodiment of the disclosure.

In one embodiment, as illustrated in FIG. 59, a lighting fixture 100-1 is somewhat L-shaped and configured for mounting in an architectural surface such as a ceiling. A mounting cone 802 includes mounting feet 804 for supporting and securing the lighting fixture 100-1 to the ceiling (or other architectural surface). A housing 304-1 extends longitudinally away from the mounting cone 802 in one direction. The housing 304-1 may include thermal dissipation elements 320 (e.g., fins). Further details of embodiments of the lighting fixture 100-1 are described below.

Figure 60:
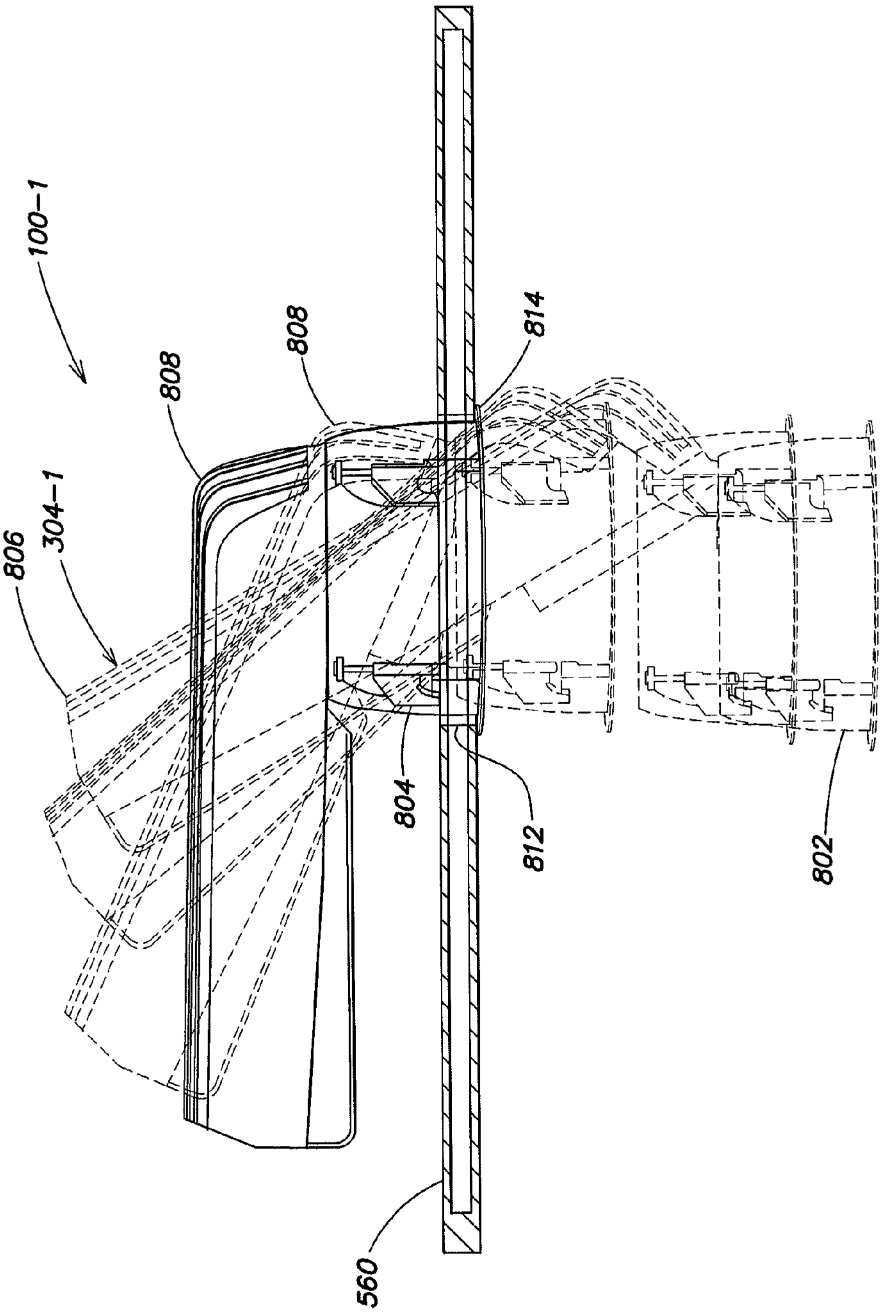
FIG. 60 shows a series of lighting fixture positions as the lighting fixture is installed in an architectural feature.

A sequence of installing the lighting fixture 100-1 in a ceiling 560 is illustrated in FIG. 60. To start, a distal end 806 of the housing 304-1 is moved either vertically or at an angle somewhat off of vertical though an aperture 812 in the ceiling 560. As the distal end progresses further into the space behind the ceiling, the housing 304-1 is rotated to bring the housing 304-1 closer to a horizontal orientation. A proximal end 808 of the housing 304-1 is rounded in some embodiments to help with fitting though the aperture 812 as the housing 304-1 is rotated. The mounting cone 802 is connected to the housing with a hinge 810 so that the mounting cone 802 remains substantially clear of the aperture 812 while the housing 304-1 is being rotated into place (FIG. 60 shows the mounting cone 802 maintaining the same orientation throughout the placement of the lighting fixture 100-1). After the housing 304-1 reaches a horizontal orientation, the mounting cone 802 is pushed upwardly until a flange 814 of the mounting cone 802 engages with an exposed surface of the ceiling 560. When initially placing the lighting fixture 100-1 in the ceiling 560, the mounting feet 804 are pivoted such that they do not inhibit insertion of the mounting cone 802 into the aperture 812. Once the flange 814 of the mounting cone 802 is engaged with the exposed surface of the ceiling 560, a screwdriver is used to rotate the mounting feet 804 and then urge them downwardly so that the mounting cone flange 814 and the mounting feet 804 sandwich the ceiling 516.

Figure 61:
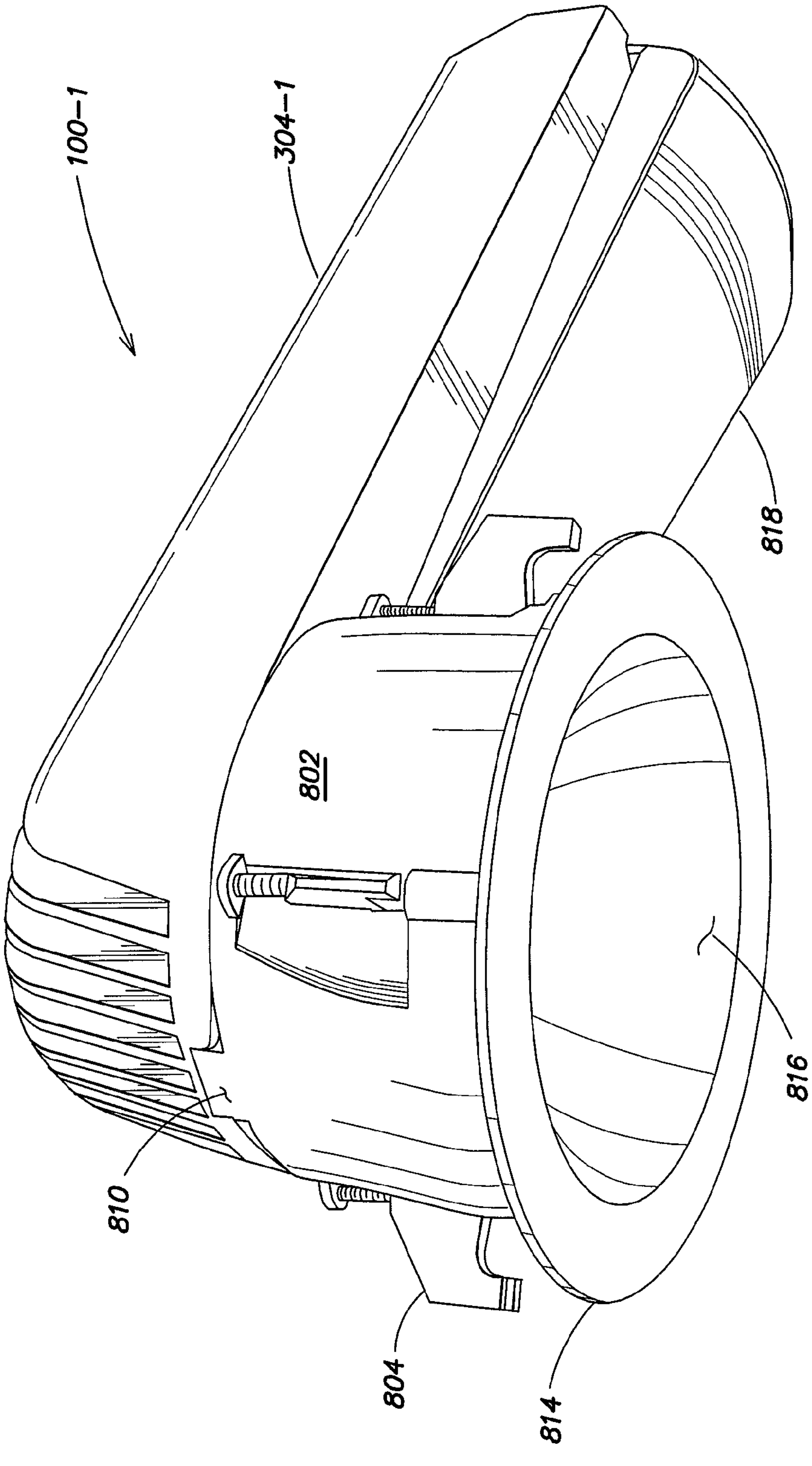
FIGS. 61, 62 and 63 are perspective views of the lighting fixture of FIG. 59.

FIG. 61 shows a perspective view from below of the lighting fixture 100-1 of FIGS. 59 and 60. The mounting flange 814 may include a clear matte alzak reflector 816 or other suitable reflector in some embodiments. The hinge 810 that connects the mounting cone 802 and the housing 304-1 is visible at the proximal end 808 of the housing 304-1. A controller housing 818 is integrated into the housing 304-1 along a bottom portion of the housing in this embodiment. In some embodiments, the controller housing 818 and thus the controller module are thermally isolated from the housing 304-1.

Figure 62:
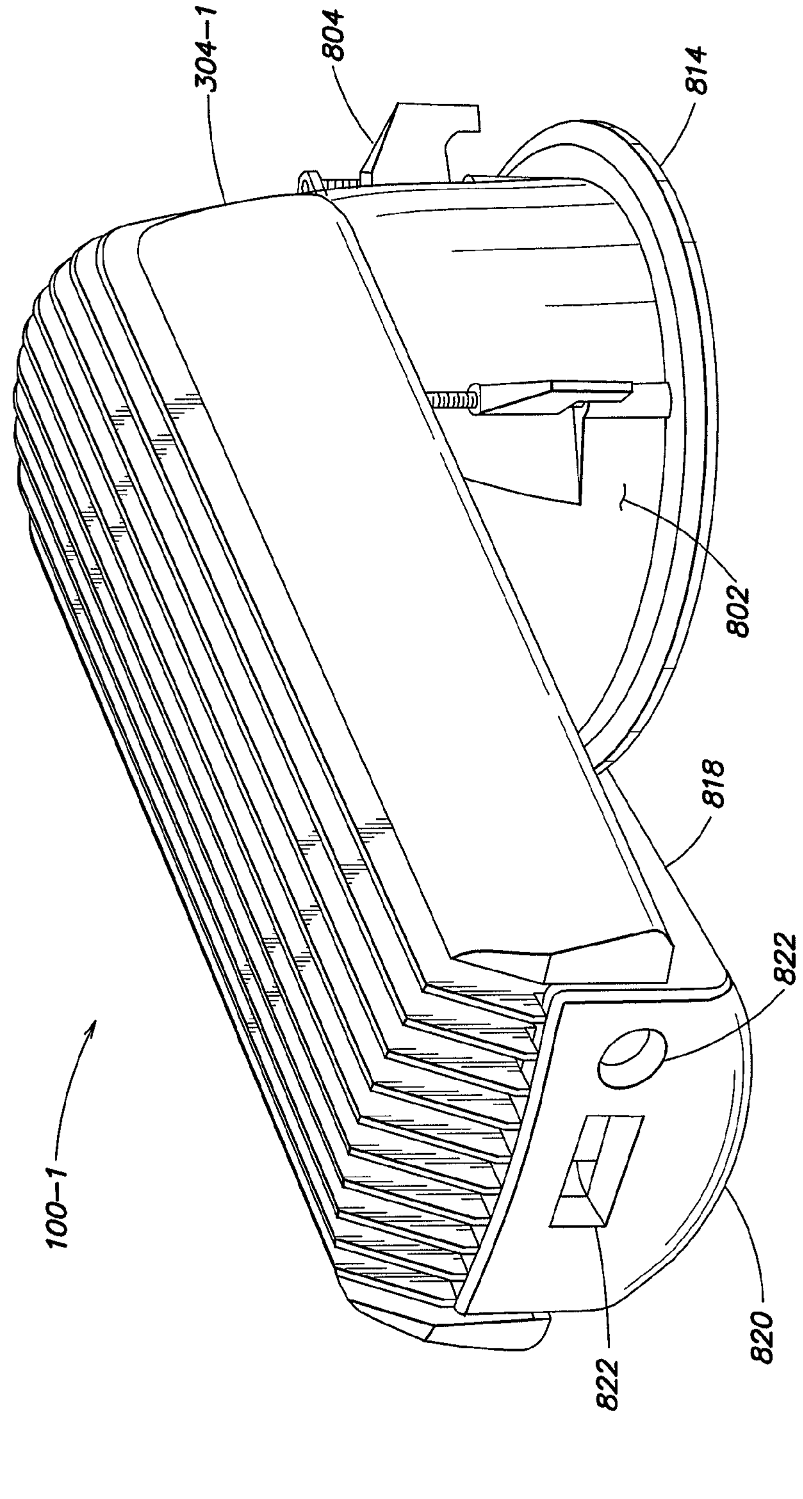

In some embodiments, as in the embodiment illustrated in FIGS. 59-62, the housing 304-1 may be extruded. As shown in FIG. 62, through-holes 822 for positioning operating power and control input connectors may be positioned at a distal end 820 of the controller housing 818.

Figure 63:
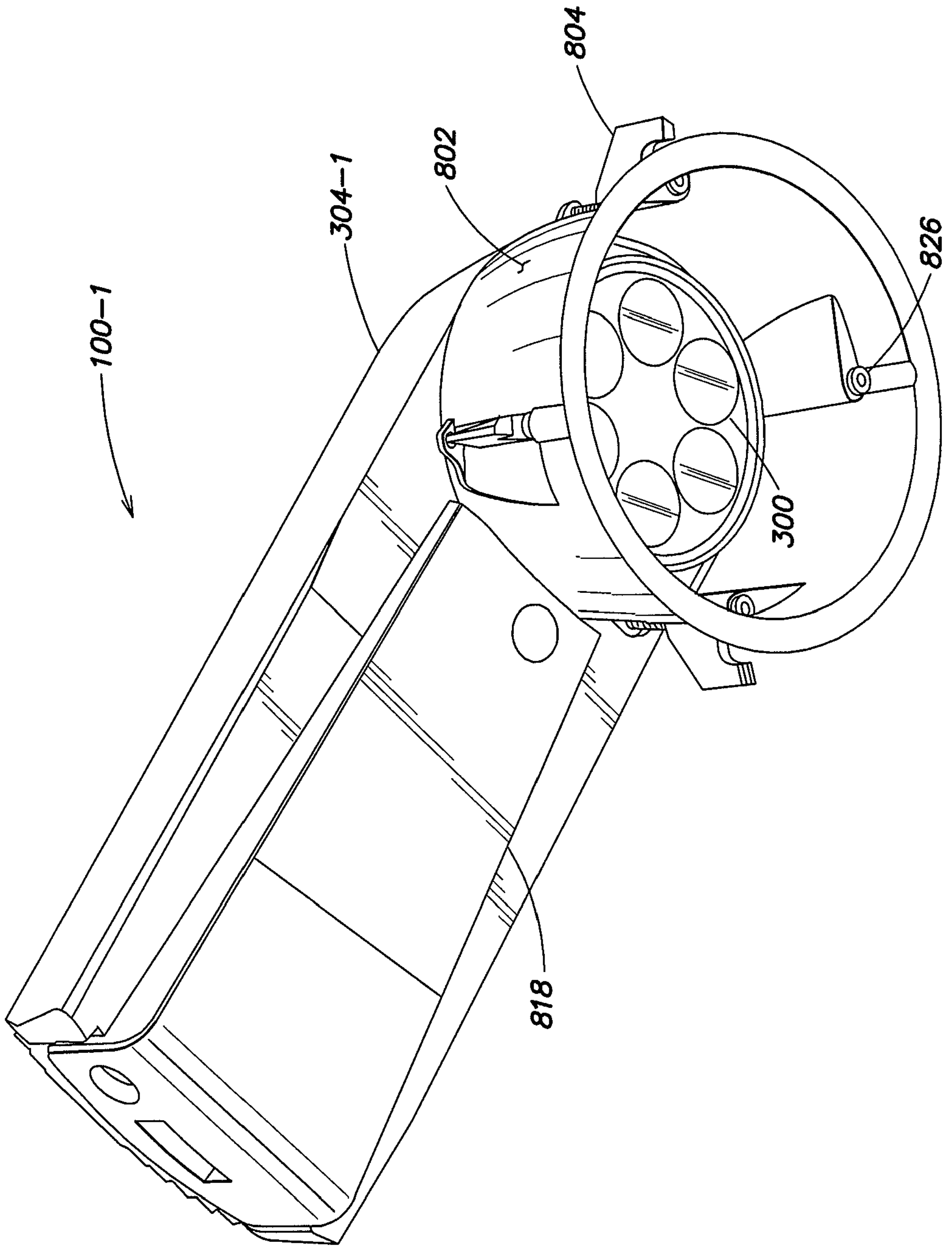

Mounting hardware 826 for adjusting the mounting feet 804 is illustrated in FIG. 63. Also visible in FIG. 63 is a user-replaceable light-generating module 300. As with some other embodiments disclosed herein, the light-generating module 300 may be installed and removed by turning a grip ring which interacts with a socket. In this regard, once the lighting fixture 100-1 is installed in the aperture of the ceiling (or other architectural surface or feature), the lighting fixture 100-1 provides the capability of tool-free light-generating module interchangeability. In some embodiments, the mounting hardware 826 may be configured to allow tool-free operation as well such that both installation of the lighting fixture 100-1 and replacement of the light-generating module 300 are tool-free.

Figure 64:
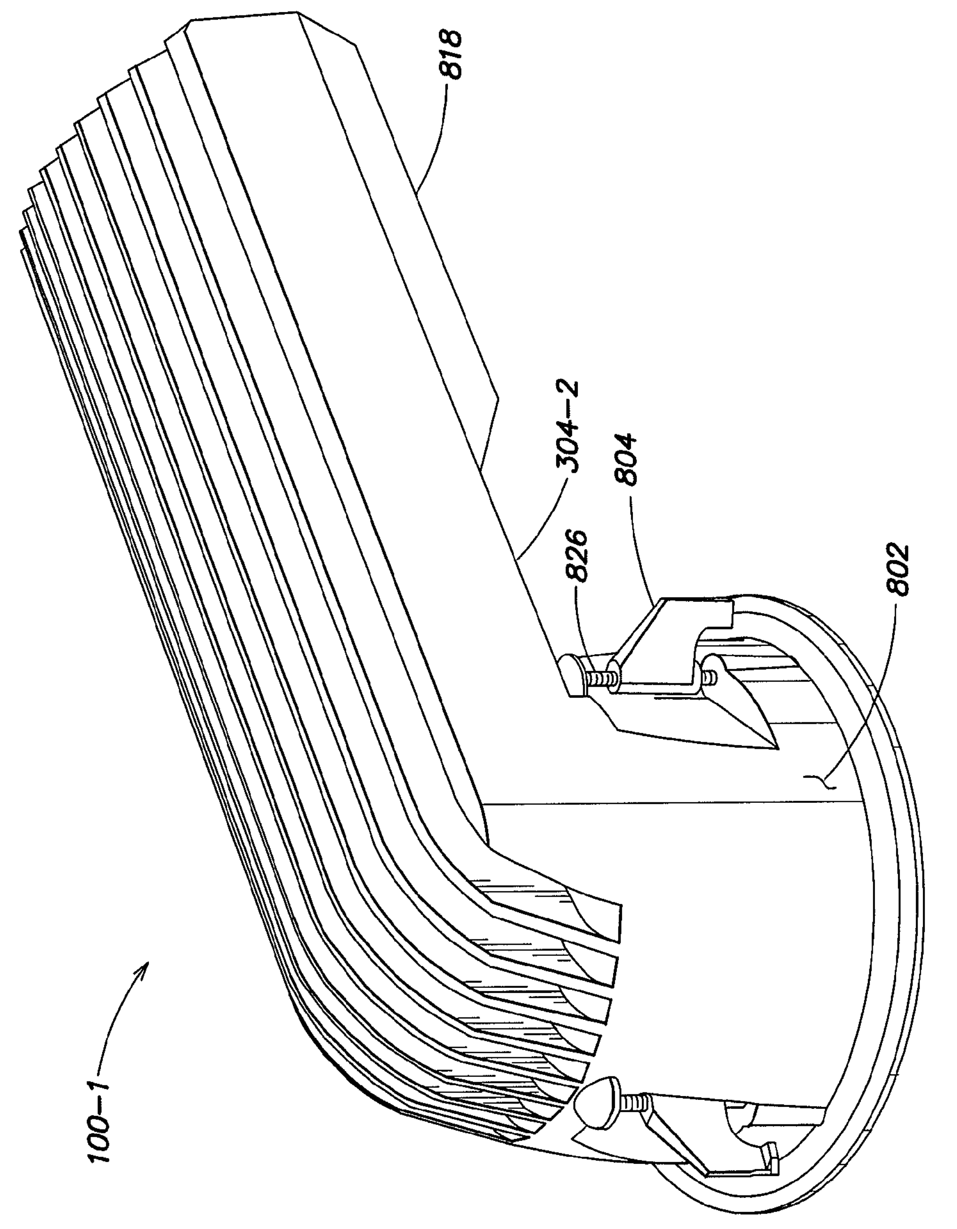
FIG. 64 is a perspective view of another embodiment of a lighting fixture.
Figure 65:
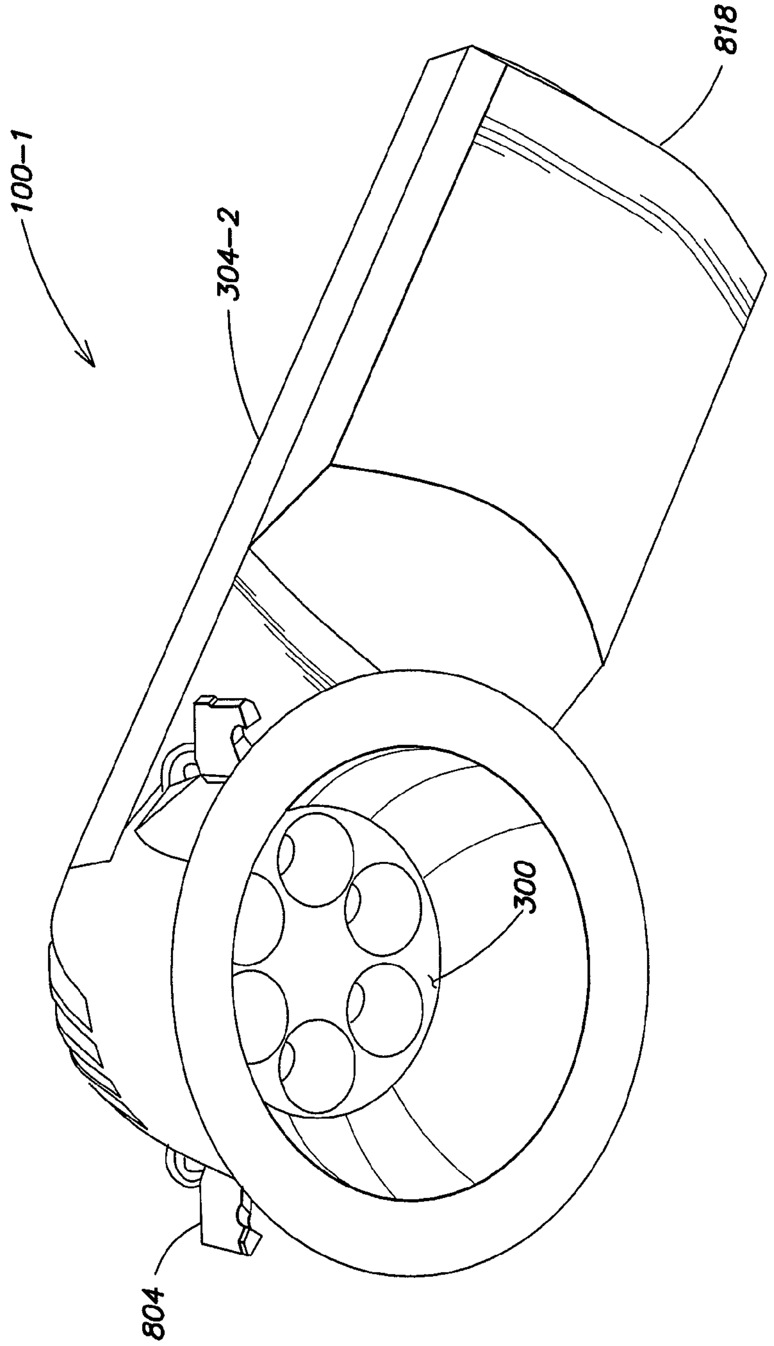
FIGS. 65, 66 and 67 are perspective views of the lighting fixture of FIG. 64.
Figure 66:
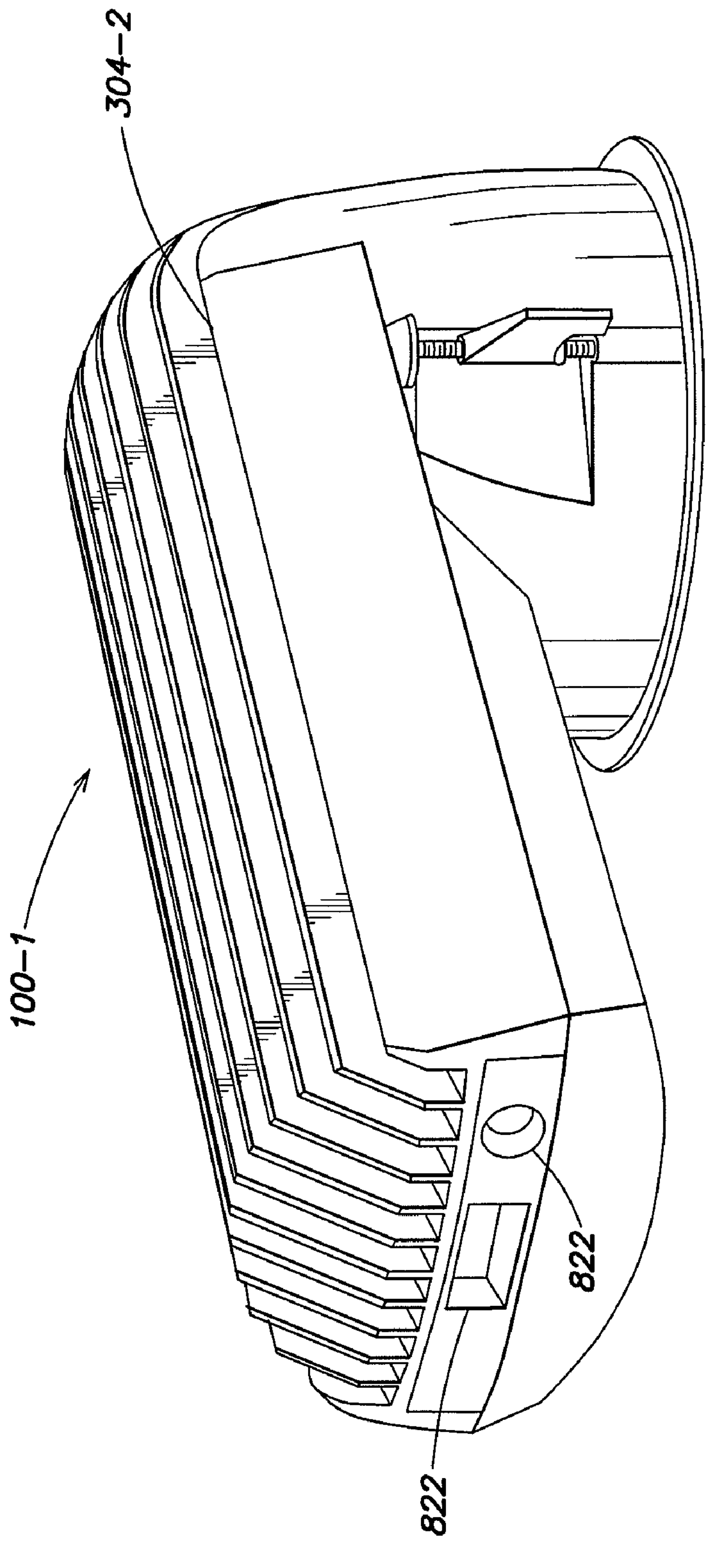
Figure 67:
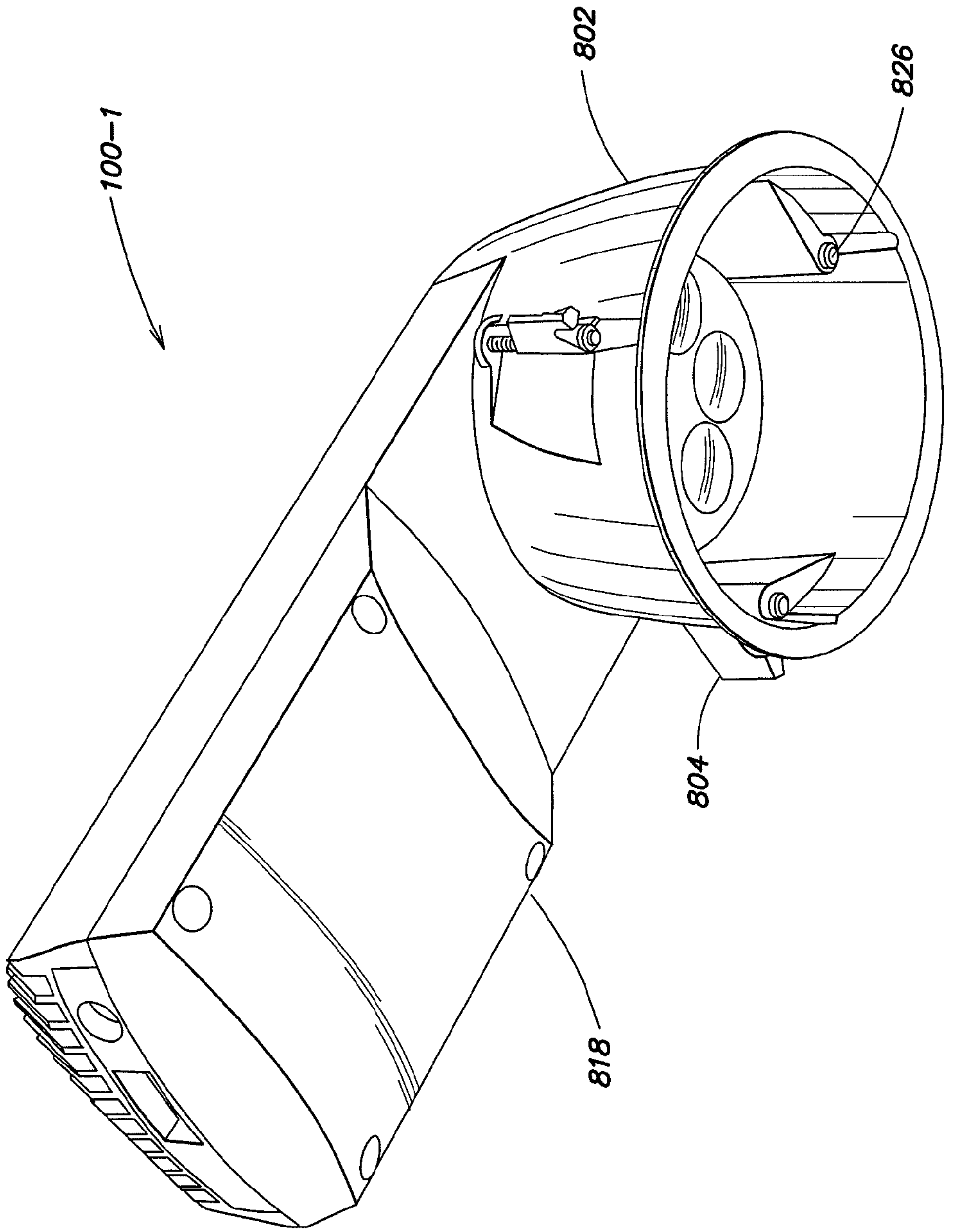

Instead of including an extruded fixture housing, in some embodiments a lighting fixture 100-1 includes a die-cast fixture housing 304-2. As illustrated in FIG. 64, the housing 304-2 and the mounting cone 802 are not hingedly connected in some embodiments. Mounting hardware 826 and mounting feet 804 similar to the embodiment illustrated in FIG. 59 may be used, although any suitable mounting hardware and mounting feet may be employed. A controller housing 818 may be positioned below and thermally isolated from the fixture housing 304-2. In some embodiments, the controller module and/or the controller housing 818 are thermally coupled to the fixture housing 304-2. In some embodiments the controller and/or the controller housing 818 are thermally coupled to a separate heat sink (not shown). Additional views of the embodiment of FIG. 64 are illustrated in FIGS. 65-67.

Figure 69A:
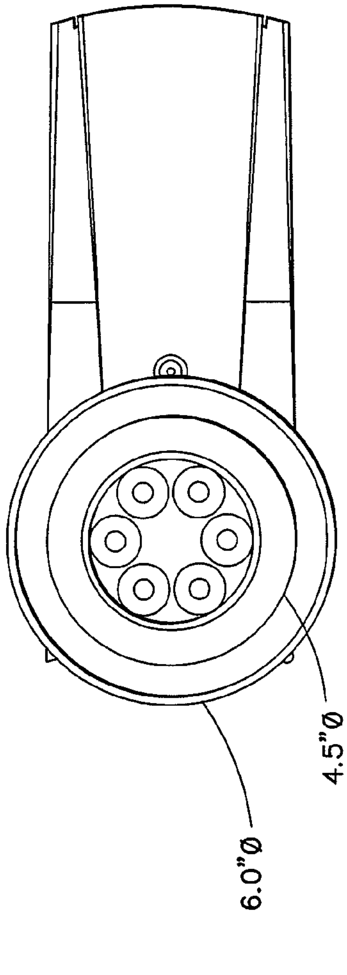
FIGS. 69A, 69B and 69C show three orthogonal views of the lighting fixture of FIG. 68.
Figure 69B:
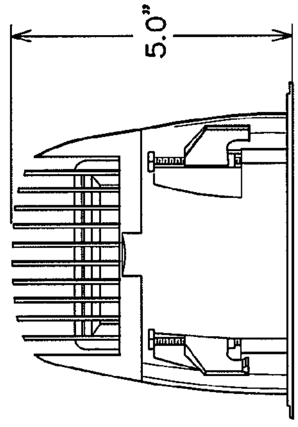
Figure 69C:
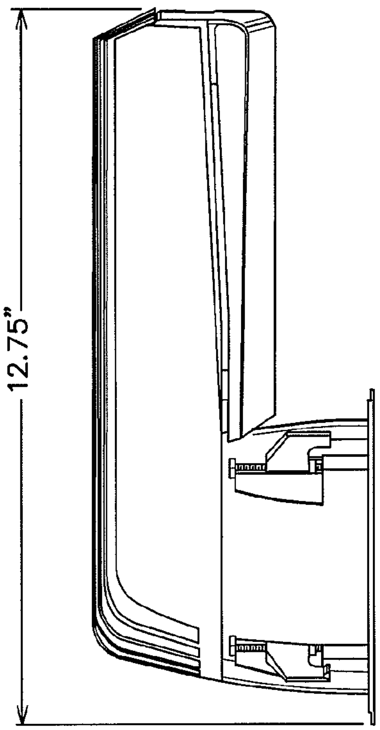

FIG. 68 illustrates a frame-in kit and lighting fixture for new construction installation. Joist hangers 830 support a support plane 832, a junction box 834, and a hanging brackets 316. Instead of being positioned on the bottom surface of the fixture housing, a controller module (not shown) may be placed in the junction box 834 in some embodiments. Dimensions of one embodiment of a lighting fixture 100-1 for use in new construction installations are shown in FIGS. 69A, 69B and 69C. These dimensions are provided by way of example only and other dimensions are possible.

Figure 70:
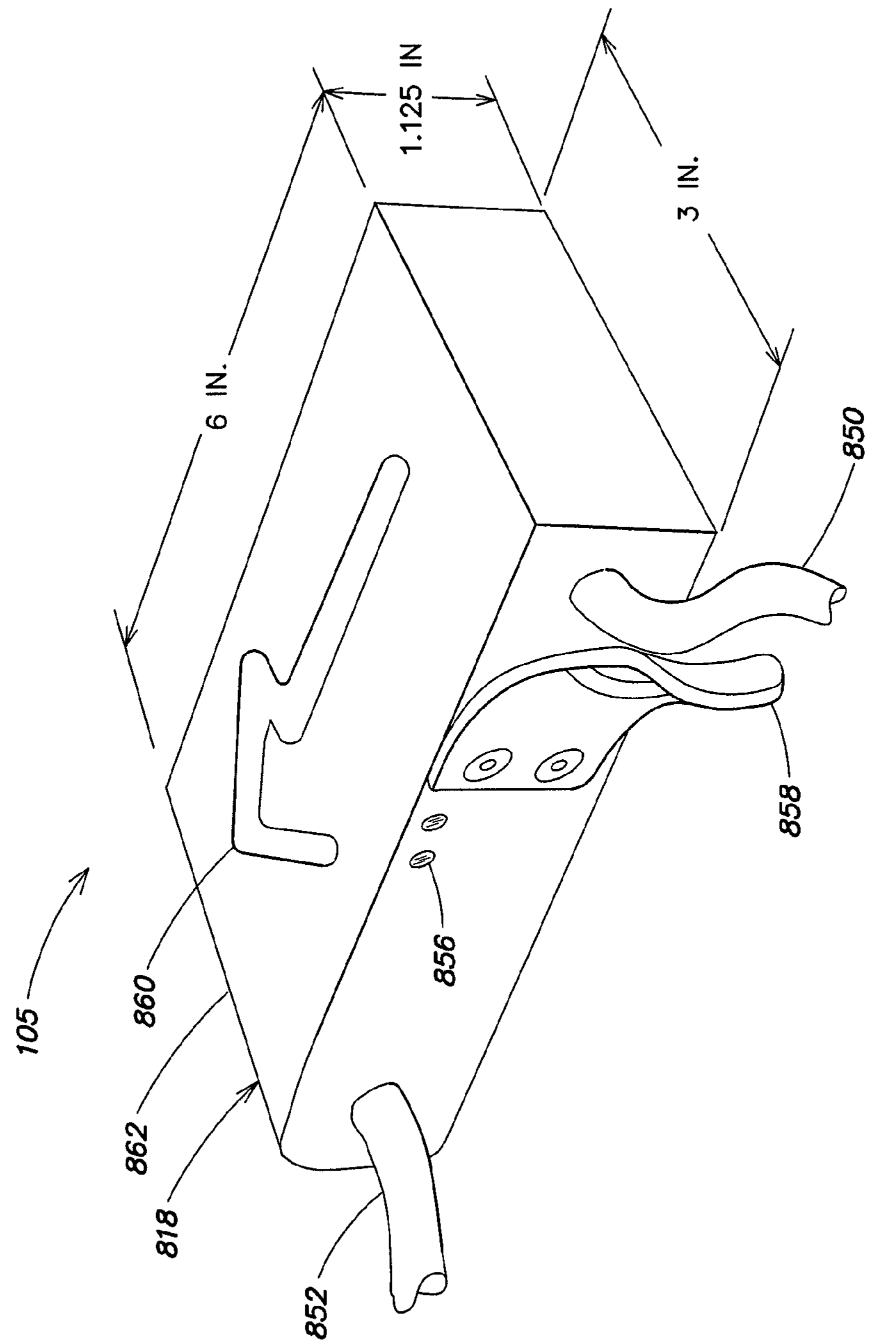
FIG. 70 shows a controller module for a lighting fixture according to one embodiment of the disclosure.

One embodiment of a controller module 105 for modular lighting fixtures disclosed herein and other suitable lighting fixtures is illustrated in FIG. 70. The controller module 105 receives, through input wiring 850, input operating power such as "wall power" (e.g., 110V AC or 220V AC). Data and/or input control signals also are provided to the controller module 105, and may be provided through the input wiring 850 as well. As outputs, the controller module provides low DC voltage and one or more control signals to the LED assemblies of the light-generating module through output wiring 852. As discussed above, the controller module 105 additionally may receive or exchange information with circuitry, memory or processing capabilities that may be present on the light-generating module. For example, the controller module 105 may receive identification information from the light-generating module.

One embodiment of a controller module 105 is illustrated with its structural packaging (controller housing 818) in FIG. 70. The configuration and dimensions illustrated are by way of example only, and other sizes, shapes and configurations may be used. In this embodiment, the controller housing 818 is constructed of stamped sheet steel or stamped sheet aluminum, although other construction materials and methods are possible. In addition to the input wiring 850 and the output wiring 852, the controller module may include indicator lights 856, a flexible elastomer pull tab 858 attached to a side of the controller housing 818, and a visual indicator 860 to aid the user in properly orienting the controller module when installing it in a housing. The controller housing 818 may have a curved front end 862 to facilitate insertion and removal of the controller housing 818. In some embodiments, the controller housing 818 may have a certain shape and/or elements that prevent insertion of the controller housing 818 in the incorrect orientation.

Figure 71C:
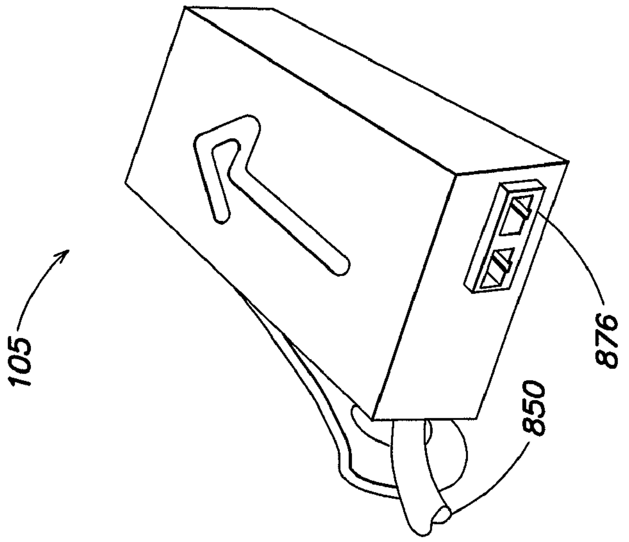
FIGS. 71A, 71B, 71C are perspective views of a controller module with various connectors.
Figure 71B:
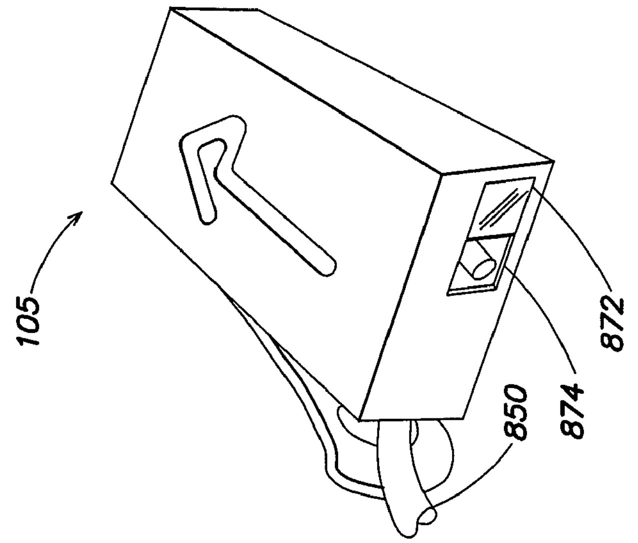
Figure 71A:
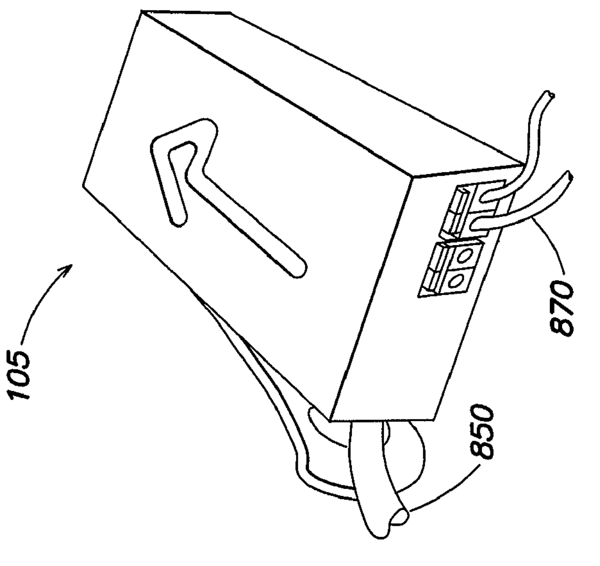

FIGS. 71A-71C illustrate various input interfaces for the controller module 105 which may be interchanged to select the manner of receiving control signal input. In FIG. 71A, the controller module 105 includes input and output spring clips 870 which allow for zero-10 volt control that can be linked from controller module to controller module for multiple units. In each of the embodiments of FIGS. 71A-71C, input operating power is provided to the controller module 105 through the input wiring 850. FIG. 71B shows the controller module having an RF receiver 872 and a zone selector 874. In this configuration, the controller 105 is wirelessly controllable using radio frequency signals. The zone selector 874 allows for group control and facilitates remapping. In FIG. 71C, the controller module includes RJ-45 jacks 876 which allow Ethernet-based control signals to be used for input. By using two jacks, linking of multiple controller modules is possible.

FIGS. 72, 73, 74 and 75 show four steps in a method of installing a controller module 105 in a recessed lighting fixture 100 which has already been installed in an architectural feature (for example, a ceiling 560).

Figure 72:
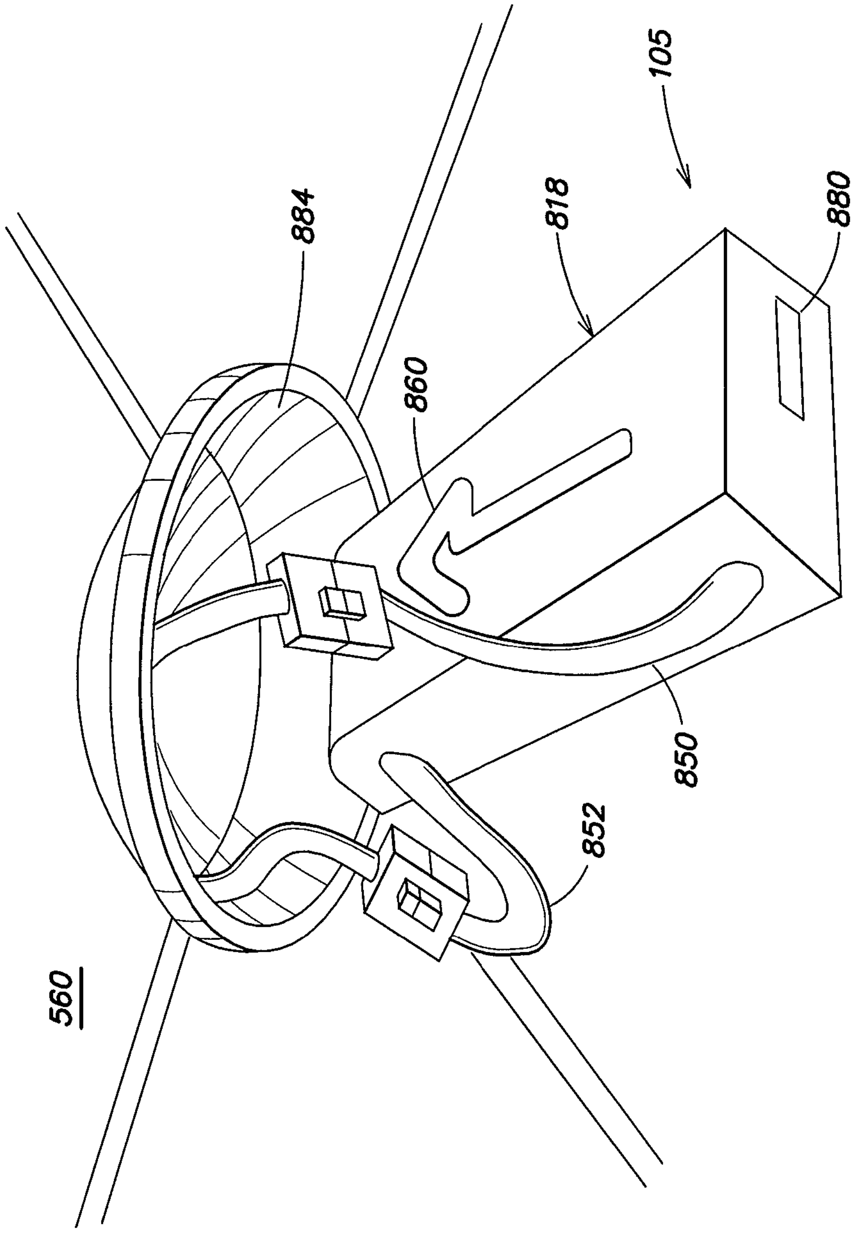
FIGS. 72, 73, 74, and 75 illustrate steps of installing a controller module in a housing according to one embodiment of the disclosure.
Figure 73:
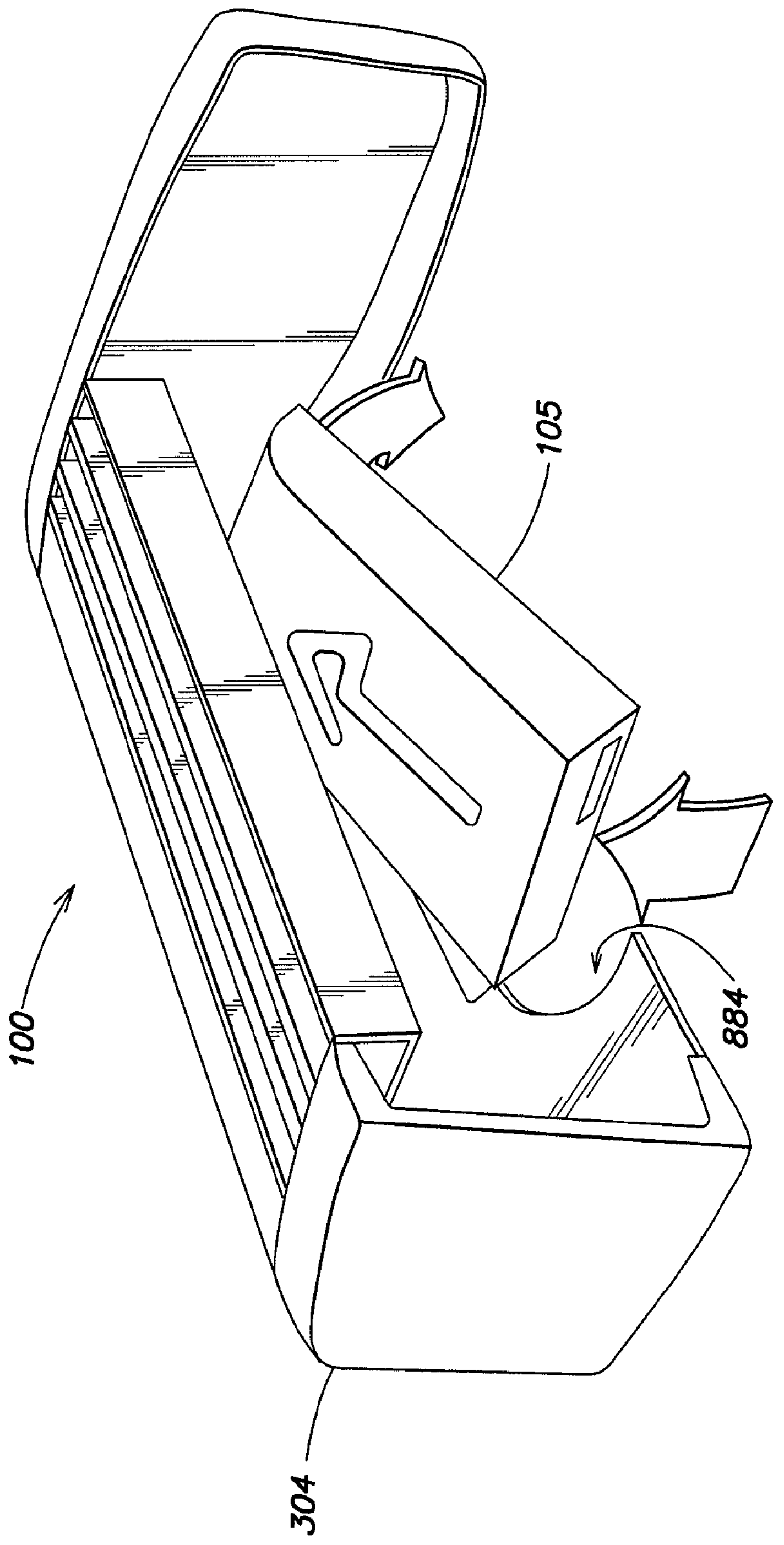
Figure 74:
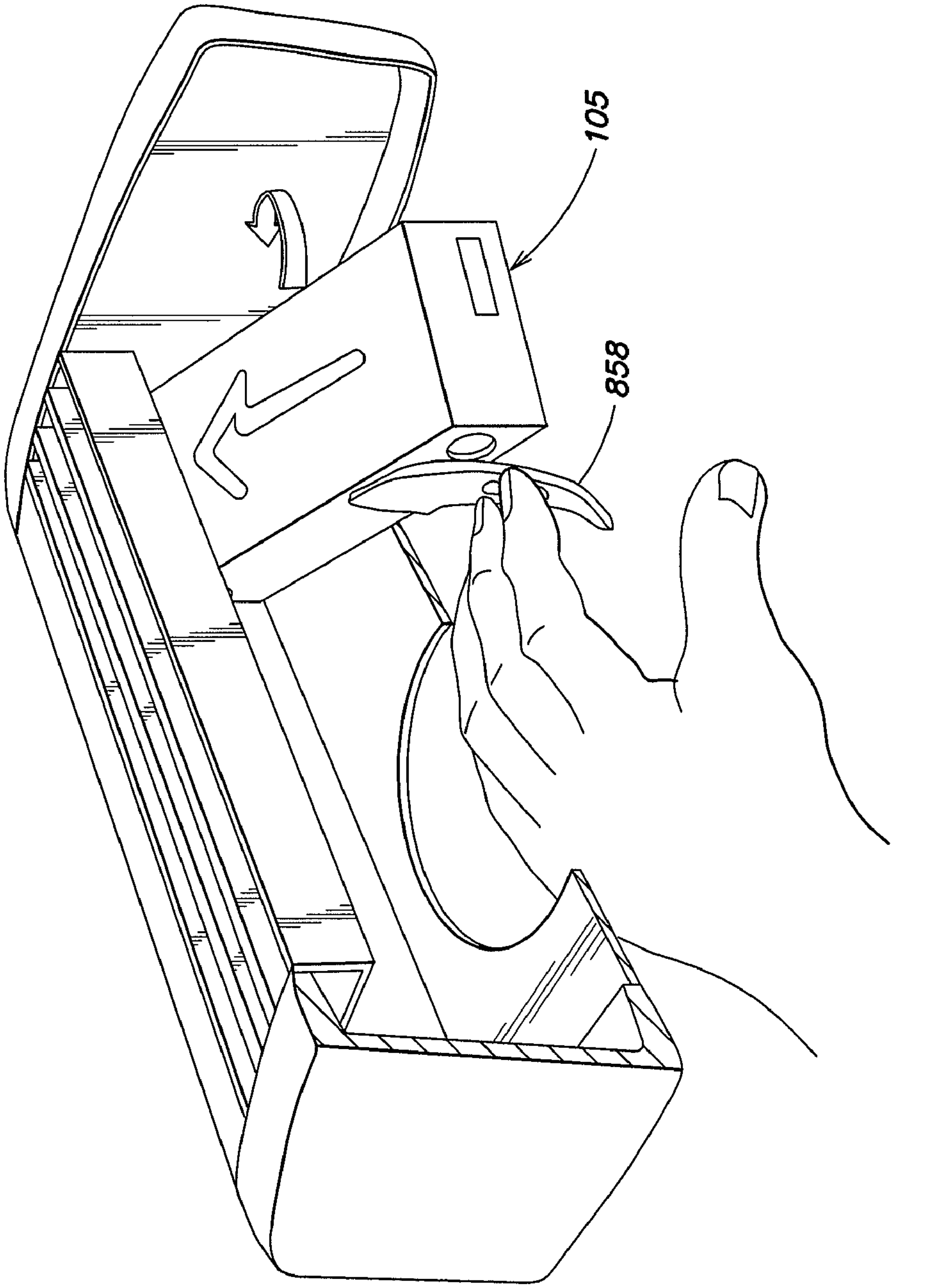
Figure 75:
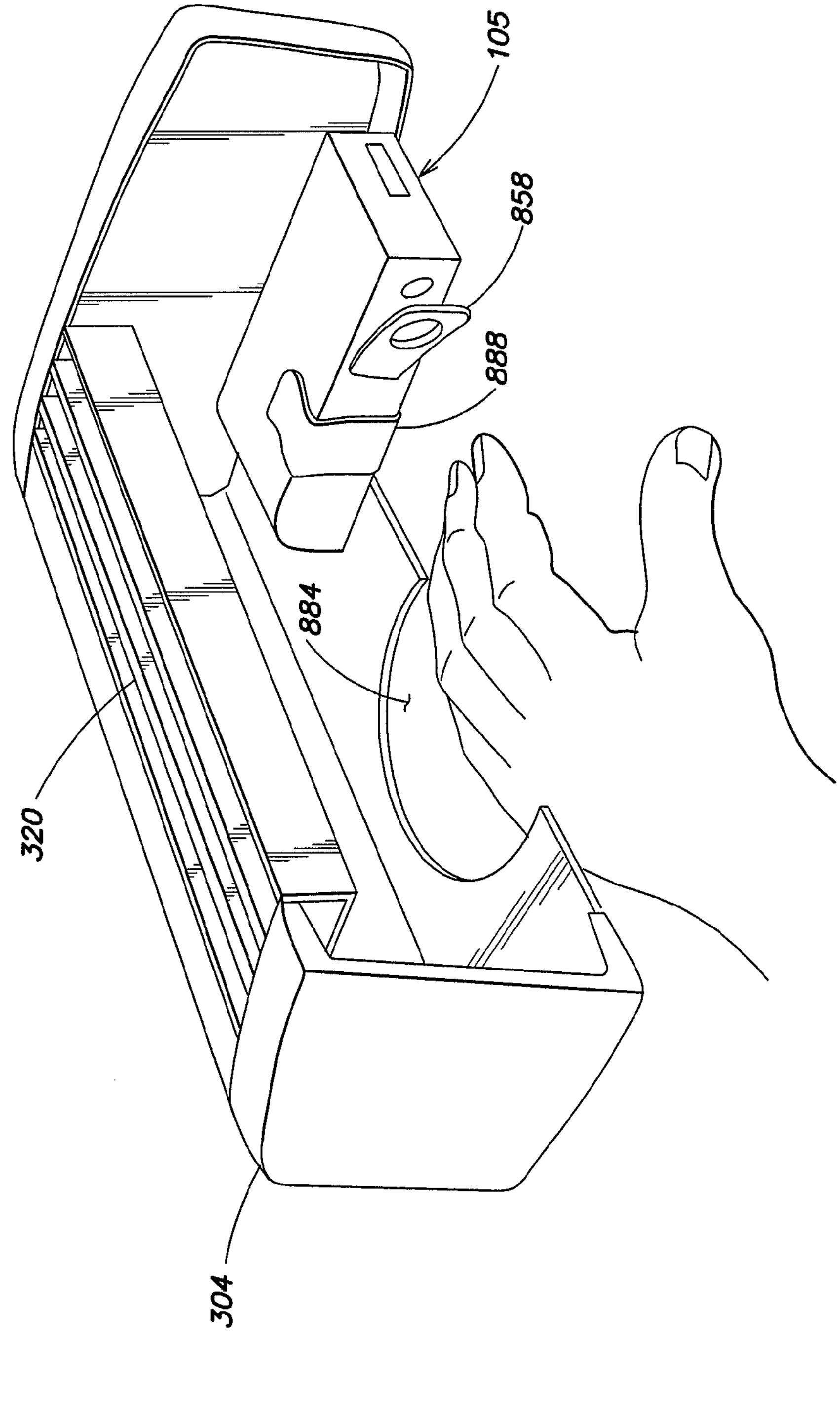

In a first step, as shown in FIG. 72, the output wiring 852 and the input wiring 850 of the controller module are connected to the associated wiring of the lighting fixture and wall power. Although not shown, a control input wire may be connected to a control input connector 880. The controller housing 818 is oriented with the aid of the visual indicator 860. In a second step, as shown in FIG. 73, the controller module 105 is moved through an aperture 884 of the fixture housing 304 (e.g., a light exit aperture) and rotated to a horizontal orientation. Once in a horizontal orientation, the controller module 105 is rotated about a vertical axis into an operating orientation, as shown in FIG. 74. A clamping element 888 is then used to lock the controller module into place as shown in FIG. 75. To remove the controller module, the process is reversed and the pull-tab 858 is used to pull the controller module 105 away from the housing wall and toward the aperture 884.

Figure 76:
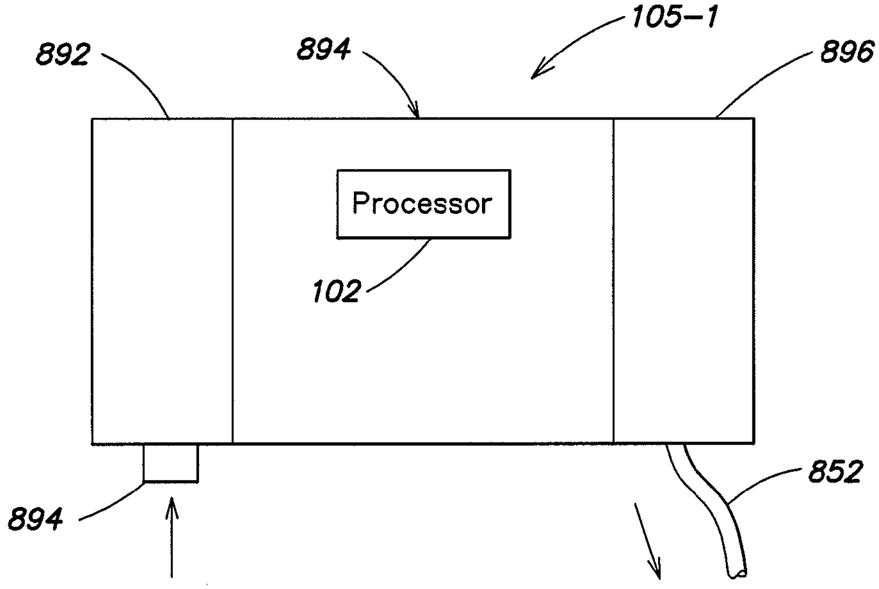
FIG. 76 illustrates a controller module including internal modular input and output interfaces.

In some embodiments, the controller modular may itself be configured to be modular in terms of the input and output interfaces. One embodiment of a modular controller module 105-1 is schematically illustrated in FIG. 76. The controller module 105-1 includes a processor 102 (see FIG. 1) which may which processes the input signals and determines and/or delivers output power and/or drive signals for controlling the LED-based light sources. In some embodiments, the processor 102 is disposed on a motherboard. More generally, the controller module may include at least one connection mechanism 894 configured to permit a modular installation and removal of at least a first circuit board including input circuitry 892 configured to receive at least one input signal including information relating to lighting, and a second circuit board including output circuitry 896 configured to output at least one lighting control signal that is based at least in part on the information included in the at least one input signal. In one aspect, the connection mechanism 894 provides at least one electrical connection between the first circuit board and the second circuit board when both the first and second circuit boards are coupled to the at least one connection mechanism. In one exemplary implementation, as mentioned above, this connection mechanism may be provided by a motherboard. In another aspect, a processor 102 may be disposed on the mother board to process the at least one input signals and provide the at least one lighting control signal (e.g., one or more PWM drive signals).

More specifically, an interchangeable "front-end" interface, or input interface 892, provides flexibility to the user in configuring the controller module 105 for receiving control signals. For example, the user may use various input interface boards and/or connectors 894 to allow for input information to be provided via Ethernet, DMX, Dali, wireless connection, analog control, or any other suitable connection. An interchangeable "back-end," or output interface 896 provides flexibility to the user in terms of the number of LED channels to be driven and/or the type of channels to be driven. For example, depending on the type of light-generating module being used, an output interface board could provide for a single channel/single color driving capability, or a different output interface board may be used to drive multiple channels for multiple colors or multiple color temperatures. In particular, in some embodiments, an output interface board may be used to drive multiple color temperature white LEDs. The output power may be sent to the LED-based light sources via output wiring 852.

Figure 77:
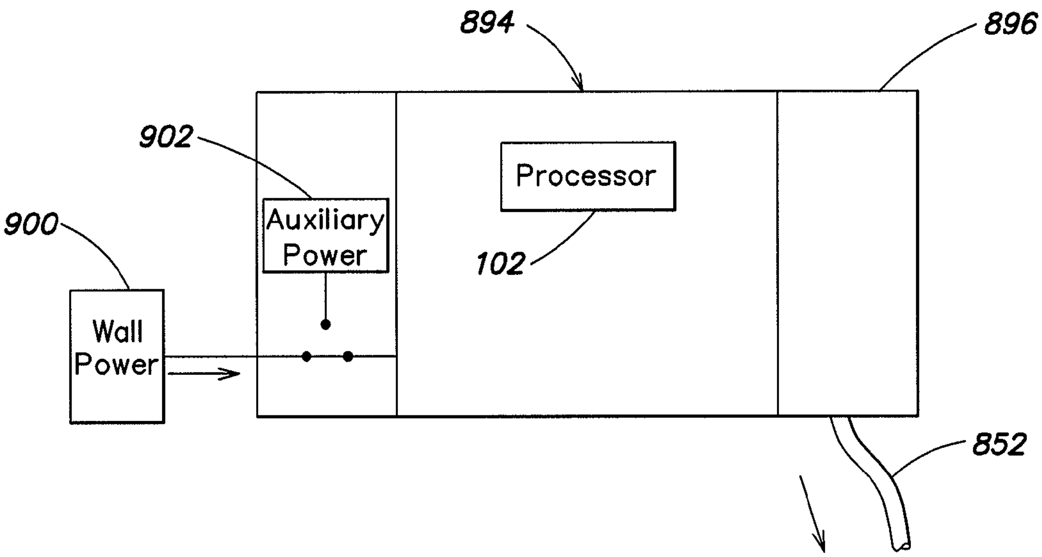
FIG. 77 illustrates a schematic view of an auxiliary power supply.

According to another aspect of the disclosure, a battery or other auxiliary power source is provided in an LED lighting fixture such that the LED lighting fixture may be used for emergency lighting in addition to its primary lighting purpose. For example, as shown in FIG. 77, the controller module 105 may normally be coupled to a primary power source such as wall power 900, but in the event of a power loss, may couple instead to an auxiliary power source 902 such as a rechargeable battery or a large capacity capacitor. In some embodiments, a connection to an auxiliary source of line power may be used as an auxiliary power source. The controller module may be configured to automatically change over to using the auxiliary power source 902 as a power source for an LED lighting fixture when the primary power source is interrupted for a threshold amount of time.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A modular lighting fixture, comprising:

a fixture housing having at least one thermally conductive portion;

a socket mounted to the at least one thermally conductive portion of the fixture housing; and a light-generating module including a removable ring configured to engage the socket, and an LED assembly;

wherein the socket is configured to facilitate formation of a thermal conduction path between the LED assembly and the at least one thermally conductive portion of the fixture housing with the light-generating module installed in the socket, wherein the removable ring in combination with the socket is further configured to apply a mechanical force to assist in retaining the LED assembly within the socket and to facilitate an electrical connection between the LED assembly and the socket, wherein the mechanical force is applied in an axial direction relative to the socket and is provided by rotationally engaging the removable ring with the socket with the LED assembly remaining in a substantially constant rotational position.

2. The fixture of claim 1, wherein the at least one thermally conductive portion of the fixture housing constitutes a majority of a surface area of the fixture housing.

3. The fixture of claim 1, wherein the at least one thermally conductive portion of the fixture housing includes a plurality of surface deformations to facilitate heat dissipation from the fixture housing.

4. The fixture of claim 3, wherein the plurality of surface deformations include a plurality of fins.

5. The fixture of claim 1, wherein the fixture housing is configured to be disposed primarily behind an architectural surface.

6. The fixture of claim 5, wherein the architectural surface is a ceiling.

7. The fixture of claim 6, further comprising a reflector cone coupled to the thermally conductive housing and configured to provide a light exit aperture for the lighting fixture, wherein the reflector cone is recessed in the ceiling.

8. The fixture of claim 1, wherein the socket includes an essentially round collar forming a space therein in which the light-generating module is installed in the socket.

9. The fixture of claim 8, wherein the collar is formed of a thermally conductive material.

10. The fixture of claim 9, wherein the collar is formed of die-cast metal.

11. The fixture of claim 8, wherein the collar is formed of molded plastic.

12. The fixture of claim 8, wherein the collar includes a plurality of flanges to facilitate coupling of the socket to the fixture housing.

13. The fixture of claim 12, wherein each of the plurality of flanges includes a hole to facilitate a fixed coupling of the socket to the fixture housing via a plurality of screws.

14. The fixture of claim 8, wherein the collar includes at least one exterior feature to facilitate an interlocking mechanical engagement with the socket.

15. The fixture of claim 14, wherein the at least one exterior feature includes an embossed spiral path.

16. The fixture of claim 14, wherein the at least one exterior feature includes an exterior thread to facilitate a screw-type connection with the socket.

17. The fixture of claim 14, wherein the collar includes at least one interior feature to facilitate a straight docking path for the light-generating module when installed in the socket.

18. The fixture of claim 17, further including at least one first electrical connector portion coupled to the fixture housing and located within an area delineated by the collar, wherein the at least one interior feature of the collar facilitates engagement of the at least one first electrical connector portion with at least one complimentary second electrical connector portion associated with the light-generating module when the light-generating module is installed in the space formed by the collar.

19. The fixture of claim 14, wherein the removable ring includes an essentially circular grip ring having at least one interior feature complementary to the at least one exterior feature of the collar such that the grip ring forms the interlocking mechanical connection with the socket.

20. The fixture of claim 19, further comprising the light-generating module installed in the socket, wherein the grip ring is configured to fit over at least a portion of a perimeter of the light-generating module and hold the light-generating module in the socket via the interlocking mechanical connection.

21. The fixture of claim 20, wherein the light-generating module includes a thermally conductive base that is placed in contact with the at least one thermally conductive portion of the fixture housing to form the thermal conduction path when the grip ring forms the interlocking mechanical connection with the socket.

22. The fixture of claim 19, wherein the at least one exterior feature of the collar and the at least one interior feature of the grip ring include complementary threads to facilitate a screw-type interlocking mechanical connection as the grip ring is placed on and rotated relative to the socket.

23. The fixture of claim 22, further comprising the light-generating module installed in the socket, wherein the grip ring is configured to fit over at least a portion of a perimeter of the light-generating module and hold the light-generating module in the socket via the screw-type interlocking mechanical connection.

24. The fixture of claim 8, further including at least one first electrical connector portion coupled to the fixture housing and located within an area delineated by the collar, wherein the at least one first electrical connector portion is configured to engage with at least one complimentary second electrical connector portion associated with the light-generating module when the light-generating module is installed in the space formed by the collar.

25. The fixture of claim 24, wherein the at least one first electrical connector portion is located at a center of the area delineated by the collar.

26. The fixture of claim 24, wherein the collar includes at least one exterior feature to facilitate an interlocking mechanical engagement with the socket.

27. The fixture of claim 26, wherein the collar includes at least one interior feature to facilitate a straight docking path for the light-generating module when installed in the socket.

28. The fixture of claim 27, wherein the at least one interior feature of the collar facilitates engagement of the at least one first electrical connector portion with the at least one complimentary second electrical connector portion associated with the light-generating module when the light-generating module is installed in the space formed by the collar.

29. The fixture of claim 28, wherein the removable ring includes an essentially circular grip ring having at least one interior feature complementary to the at least one exterior feature of the collar such that the grip ring forms the interlocking mechanical connection with the socket.

30. The fixture of claim 1, further comprising at least one first electrical connector portion coupled to the fixture housing.

31. The fixture of claim 30, wherein the at least one first electrical connector portion forms part of the socket.

32. The fixture of claim 31, wherein the socket is formed of a thermally conductive material and includes an essentially flat base portion that is at least partially contiguous with the at least one thermally conductive portion of the fixture housing, and wherein the essentially flat base portion includes the at least one first electrical connector portion.

33. The fixture of claim 30, further comprising the at least one light-generating module installed in the socket, the at least one light-generating module including at least one complimentary second electrical connector portion electrically connected to the at least one first electrical connector portion.

34. The fixture of claim 33, wherein: the socket includes an essentially round collar forming a space therein in which the light-generating module is installed in the socket; and the light-generating module is formed so as to have a shape resembling a hockey puck.

35. A modular lighting fixture, comprising:

a fixture housing having at least one light exit aperture;

a socket mounted to the fixture housing and accessible via the at least one light exit aperture;

a light-generating module installed in and removable from the socket via the at least one light exit aperture; and a controller module to control the light-generating module, the controller module disposed within the fixture housing and accessible via the at least one light exit aperture to facilitate installation and removal of the controller module, respectively, via the at least one light exit aperture.

36. The fixture of claim 35, wherein: the fixture housing includes at least one thermally conductive portion; the socket is mounted to the at least one thermally conductive portion of the fixture housing; and the socket is configured to facilitate a thermal conduction path between the light-generating module and the at least one thermally conductive portion of the fixture housing.

37. The fixture of claim 35, wherein the fixture housing is configured to be disposed primarily behind an architectural surface.

38. The fixture of claim 37, wherein the architectural surface is a ceiling.

39. The fixture of claim 35, wherein: the fixture housing includes at least first and second thermally conductive portions; the first and second thermally conductive portions are substantially thermally isolated from each other; the socket is mounted to the first thermally conductive portion; and the controller module is thermally coupled to the second thermally conductive portion.

40. The fixture of claim 35, wherein: the light-generating module is configured to provide information to the controller module relating to at least one characteristic of the light generating module; and the controller module is configured to control the light-generating module based at least in part on the information provided by the light-generating module.

41. The fixture of claim 35, wherein the socket is configured such that the light-generating module is installed in and removed from the socket via a rotating motion.

42. The fixture of claim 41, further comprising a grip ring configured to fit over at least a portion of a perimeter of the light-generating module, the grip ring further configured to hold the light-generating module in the socket via a rotational interlocking mechanical connection between the grip ring and the socket.

43. The fixture of claim 41, wherein: the socket includes an essentially round collar forming a space therein in which the light-generating module is installed in the socket; and the light-generating module is formed so as to have a shape resembling a hockey puck.

44. The fixture of claim 41, wherein the LED-based light-generating module is configured to generate colored light.

45. The fixture of claim 44, wherein: the LED-based light-generating module includes multiple channels, each channel configured to generate radiation having a different spectrum; and the controller module is configured to independently control each channel of the multiple channels so as to generate the colored light as variable color light.

46. The fixture of claim 35, wherein the light-generating module is an LED-based light-generating module.

47. The fixture of claim 46, wherein the LED-based light-generating module is configured to generate essentially white light.

48. The fixture of claim 47, wherein: the LED-based light-generating module includes multiple channels, each channel configured to generate radiation having a different spectrum; and the controller module is configured to independently control each channel of the multiple channels so as to generate the essentially white light as variable color temperature white light.

49. The fixture of claim 48, wherein at least a first channel of the multiple channels includes at least one first white LED.

50. The fixture of claim 49, wherein at least a second channel of the multiple channels includes at least one second white LED.

51. The fixture of claim 48, wherein at least one channel of the multiple channels includes at least one colored LED.

52. A modular lighting fixture, comprising:

a fixture housing; a socket mounted to the fixture housing;

a light-generating module installed in and removable from the socket; and a controller module to control the light-generating module, the controller module disposed in or proximate to the fixture housing, wherein:

the light-generating module is configured to provide information to the controller module relating to at least one characteristic of the light generating module; and the controller module is configured to control the light-generating module based at least in part on the information provided by the light-generating module.

53. The fixture of claim 52, wherein the light-generating module includes a memory to store the information.

54. The fixture of claim 52, wherein the information includes a unique identifier for the light-generating module.

55. The fixture of claim 54, wherein the unique identifier includes a serial number for the light-generating module.

56. The fixture of claim 52, wherein the information relates to at least one characteristic of light generated by the light-generating module.

57. The fixture of claim 52, wherein the information relates to at least one operating power requirement associated with the light-generating module.

58. The fixture of claim 52, wherein the information includes at least one calibration parameter associated with the light-generating module.

59. The fixture of claim 52, wherein the information relates to an operating temperature associated with the light-generating module.

60. The fixture of claim 59, wherein the controller module is configured to adjust an operating power of the light-generating module based at least in part on the operating temperature associated with the light-generating module.

61. The fixture of claim 52, wherein the information relates to an operating history associated with the light-generating module.

62. The fixture of claim 61, wherein the information relates to an operating temperature history associated with the light-generating module.

63. The apparatus of claim 61, wherein the information relates to an operating time history associated with the light-generating module.

* * * * *